(12) United States Patent
Erol et al.

(10) Patent No.: US 8,156,115 B1
(45) Date of Patent: Apr. 10, 2012

(54) DOCUMENT-BASED NETWORKING WITH MIXED MEDIA REALITY

(75) Inventors: Berna Erol, San Jose, CA (US);
Jonathan J. Hull, San Carlos, CA (US);
Hidenobu Kishi, Cupertino, CA (US);
Qifa Ke, Cupertino, CA (US); Jorge Moraleda, Menlo Park, CA (US)

(73) Assignee: Ricoh Co. Ltd., Tokyo (JP)

( * ) Notice: Subject to any disclaimer, the term of this patent is extended or adjusted under 35 U.S.C. 154(b) by 414 days.

(21) Appl. No.: 12/060,194

(22) Filed: Mar. 31, 2008

Related U.S. Application Data

(60) Provisional application No. 60/949,050, filed on Jul. 11, 2007.

(51) Int. Cl.
*G06F 17/30* (2006.01)
(52) U.S. Cl. ......... 707/728; 707/899; 382/181; 382/190
(58) Field of Classification Search .................. 707/608
See application file for complete search history.

(56) References Cited

U.S. PATENT DOCUMENTS

| | | | |
|---|---|---|---|
| 1,915,993 | A | 6/1933 | Handel |
| 4,759,075 | A | 7/1988 | Lipkie et al. |
| 5,027,421 | A | 6/1991 | Kanno |
| 5,035,302 | A | 7/1991 | Thangavelu |
| 5,077,805 | A | 12/1991 | Tan |
| 5,109,439 | A | 4/1992 | Froessl |
| 5,263,100 | A | 11/1993 | Kim et al. |
| 5,392,447 | A | 2/1995 | Schlack et al. |
| 5,416,892 | A | 5/1995 | Loken-Kim |
| 5,432,864 | A | 7/1995 | Lu et al. |
| 5,465,353 | A | 11/1995 | Hull et al. |
| 5,493,689 | A | 2/1996 | Waclawsky et al. |
| 5,546,502 | A | 8/1996 | Hart et al. |
| 5,553,217 | A | 9/1996 | Hart et al. |
| 5,555,556 | A | 9/1996 | Ozaki |
| 5,579,471 | A | 11/1996 | Barber et al. |
| 5,706,097 | A | 1/1998 | Schelling et al. |
| 5,752,055 | A | 5/1998 | Redpath et al. |
| 5,761,344 | A | 6/1998 | Al-Hussein |
| 5,764,277 | A | 6/1998 | Loui et al. |
| 5,806,005 | A | 9/1998 | Hull et al. |
| 5,832,474 | A | 11/1998 | Lopresti et al. |

(Continued)

FOREIGN PATENT DOCUMENTS

CN 1245935 3/2000

(Continued)

OTHER PUBLICATIONS

U.S. Appl. No. 10/813,901, filed Mar. 30, 2004, Erol et al.

(Continued)

*Primary Examiner* — Hung Q Pham
(74) *Attorney, Agent, or Firm* — Patent Law Works LLP

(57) ABSTRACT

A Mixed Media Reality (MMR) system and associated techniques are disclosed. The MMR system provides mechanisms for forming a mixed media document that includes media of at least two types (e.g., printed paper as a first medium and digital content and/or web link as a second medium). The present invention provides a system, method, and computer program product for modifying tie strength between members of an existing network using captured digital images of documents. Documents associated with the captured images are recognized and other members associated with the document are determined. Using this information, ties between members or the network are modified.

24 Claims, 22 Drawing Sheets

U.S. PATENT DOCUMENTS

| | | |
|---|---|---|
| 5,832,530 A | 11/1998 | Paknad et al. |
| 5,842,194 A | 11/1998 | Arbuckle |
| 5,873,077 A | 2/1999 | Kanoh et al. |
| 5,892,843 A | 4/1999 | Zhou et al. |
| 5,899,999 A | 5/1999 | De Bonet |
| 5,905,502 A | 5/1999 | Deering |
| 5,918,012 A | 6/1999 | Astiz et al. |
| 5,956,468 A | 9/1999 | Ancin |
| 5,968,175 A | 10/1999 | Morishita et al. |
| 5,999,915 A | 12/1999 | Nahan et al. |
| 6,035,055 A | 3/2000 | Wang et al. |
| 6,104,834 A | 8/2000 | Hull |
| 6,121,969 A | 9/2000 | Jain et al. |
| 6,138,129 A | 10/2000 | Combs |
| 6,192,157 B1 | 2/2001 | Prebble |
| 6,208,771 B1 | 3/2001 | Jared et al. |
| 6,813,381 B2 | 3/2001 | Ohnishi et al. |
| 6,223,171 B1 | 4/2001 | Chaudhuri et al. |
| 6,253,201 B1 | 6/2001 | Abdel-Mottaleb et al. |
| 6,301,386 B1 | 10/2001 | Zhu et al. |
| 6,332,039 B1 | 12/2001 | Bando et al. |
| 6,345,274 B1 | 2/2002 | Zhu et al. |
| 6,353,822 B1 | 3/2002 | Lieberman |
| 6,363,381 B1 | 3/2002 | Lee et al. |
| 6,393,142 B1 | 5/2002 | Swain et al. |
| 6,397,213 B1 | 5/2002 | Cullen et al. |
| 6,405,172 B1 | 6/2002 | Baker et al. |
| 6,408,257 B1 | 6/2002 | Harrington et al. |
| 6,411,953 B1 | 6/2002 | Ganapathy et al. |
| 6,448,979 B1 | 9/2002 | Schena et al. |
| 6,457,026 B1 | 9/2002 | Graham et al. |
| 6,460,036 B1 * | 10/2002 | Herz ............................ 707/748 |
| 6,470,264 B2 | 10/2002 | Bide |
| 6,504,571 B1 | 1/2003 | Narayanaswami et al. |
| 6,537,324 B1 | 3/2003 | Tabata et al. |
| 6,567,799 B2 | 5/2003 | Sweet et al. |
| 6,574,375 B1 | 6/2003 | Cullen et al. |
| 6,574,644 B2 | 6/2003 | Hsu et al. |
| 6,584,223 B1 | 6/2003 | Shiiyama |
| 6,611,862 B2 | 8/2003 | Reisman |
| 6,732,915 B1 | 5/2004 | Nelson et al. |
| 6,751,343 B1 | 6/2004 | Ferrell et al. |
| 6,753,883 B2 | 6/2004 | Schena et al. |
| 6,766,363 B1 | 7/2004 | Rothschild |
| 6,791,605 B2 | 9/2004 | Reele et al. |
| 6,799,201 B1 | 9/2004 | Lee et al. |
| 6,804,332 B1 | 10/2004 | Miner et al. |
| 6,804,659 B1 | 10/2004 | Graham et al. |
| 6,824,057 B2 | 11/2004 | Rathus et al. |
| 6,827,267 B2 | 12/2004 | Rathus et al. |
| 6,830,187 B2 | 12/2004 | Rathus et al. |
| 6,834,804 B2 | 12/2004 | Rathus et al. |
| 6,842,755 B2 | 1/2005 | Maslov |
| 6,843,411 B2 | 1/2005 | Rathus et al. |
| 6,859,909 B1 | 2/2005 | Lerner et al. |
| 6,865,302 B2 | 3/2005 | Chang |
| 6,866,196 B1 | 3/2005 | Rathus et al. |
| 6,922,699 B2 | 7/2005 | Schuetze et al. |
| 6,929,182 B2 | 8/2005 | Rathus et al. |
| 6,940,491 B2 | 9/2005 | Incertis Carro |
| 6,963,358 B2 | 11/2005 | Cohen et al. |
| 6,964,374 B1 | 11/2005 | Djuknic et al. |
| 6,980,962 B1 | 12/2005 | Arganbright et al. |
| 6,981,224 B1 | 12/2005 | Gardner et al. |
| 6,993,573 B2 | 1/2006 | Hunter |
| 7,013,309 B2 | 3/2006 | Chakraborty et al. |
| 7,031,965 B1 | 4/2006 | Moriya et al. |
| 7,051,086 B2 | 5/2006 | Rhoads et al. |
| 7,089,487 B2 | 8/2006 | Tsai |
| 7,092,953 B1 | 8/2006 | Haynes |
| 7,134,095 B1 | 11/2006 | Smith et al. |
| 7,150,399 B2 | 12/2006 | Barrus et al. |
| 7,167,574 B2 | 1/2007 | Kim |
| 7,174,031 B2 | 2/2007 | Rhoads et al. |
| 7,185,274 B1 | 2/2007 | Rubin et al. |
| 7,206,820 B1 | 4/2007 | Rhoads et al. |
| 7,232,057 B2 | 6/2007 | Rathus et al. |
| 7,236,632 B2 | 6/2007 | Erol et al. |
| 7,240,279 B1 | 7/2007 | Chartier et al. |
| 7,249,123 B2 | 7/2007 | Elder et al. |
| 7,251,689 B2 | 7/2007 | Wesley |
| 7,263,205 B2 | 8/2007 | Lev |
| 7,305,435 B2 | 12/2007 | Hamynen |
| 7,310,769 B1 | 12/2007 | Dash |
| 7,310,779 B2 | 12/2007 | Carro |
| 7,337,175 B2 | 2/2008 | Comps et al. |
| 7,359,094 B1 | 4/2008 | Sayuda |
| 7,363,580 B2 | 4/2008 | Tabata et al. |
| 7,366,979 B2 | 4/2008 | Spielberg et al. |
| 7,386,789 B2 | 6/2008 | Chao et al. |
| 7,392,287 B2 | 6/2008 | Ratcliff, III |
| 7,406,214 B2 | 7/2008 | Rhoads et al. |
| 7,421,153 B1 | 9/2008 | Ronca et al. |
| 7,421,155 B2 | 9/2008 | King et al. |
| 7,437,023 B2 | 10/2008 | King et al. |
| 7,450,760 B2 | 11/2008 | Molnar et al. |
| 7,458,014 B1 | 11/2008 | Rubin et al. |
| 7,489,415 B2 | 2/2009 | Furuta et al. |
| 7,509,386 B2 | 3/2009 | Miyashita |
| 7,546,524 B1 | 6/2009 | Bryar et al. |
| 7,567,262 B1 | 7/2009 | Clemens et al. |
| 7,593,605 B2 | 9/2009 | King et al. |
| 7,593,961 B2 | 9/2009 | Eguchi et al. |
| 7,613,686 B2 | 11/2009 | Rui |
| 7,644,078 B2 | 1/2010 | Sastry et al. |
| 7,653,238 B2 | 1/2010 | Stentiford |
| 7,668,405 B2 | 2/2010 | Gallagher |
| 7,680,850 B2 | 3/2010 | Oda |
| 7,707,039 B2 * | 4/2010 | King et al. ..................... 705/1.1 |
| 7,746,376 B2 | 6/2010 | Mendoza et al. |
| 7,761,436 B2 | 7/2010 | Norton et al. |
| 7,765,231 B2 | 7/2010 | Rathus et al. |
| 7,812,986 B2 | 10/2010 | Graham et al. |
| 7,872,669 B2 | 1/2011 | Darrell et al. |
| 7,882,113 B2 | 2/2011 | Yaeger |
| 7,882,177 B2 | 2/2011 | Wei et al. |
| 7,930,292 B2 | 4/2011 | Nakajima |
| 7,946,491 B2 | 5/2011 | Burian et al. |
| 2001/0011276 A1 | 8/2001 | Durst Jr. et al. |
| 2001/0013546 A1 | 8/2001 | Ross |
| 2001/0024514 A1 | 9/2001 | Matsunaga |
| 2001/0042030 A1 | 11/2001 | Ito et al. |
| 2001/0042085 A1 | 11/2001 | Peairs et al. |
| 2001/0043741 A1 | 11/2001 | Mahoney et al. |
| 2001/0049700 A1 | 12/2001 | Ichikura |
| 2002/0038430 A1 | 3/2002 | Edwards et al. |
| 2002/0052872 A1 | 5/2002 | Yada |
| 2002/0054059 A1 | 5/2002 | Schneiderman |
| 2002/0063709 A1 | 5/2002 | Gilbert et al. |
| 2002/0073236 A1 | 6/2002 | Helgeson et al. |
| 2002/0102966 A1 | 8/2002 | Lev et al. |
| 2002/0118379 A1 | 8/2002 | Chakraborty et al. |
| 2002/0146176 A1 | 10/2002 | Meyers |
| 2002/0154148 A1 | 10/2002 | Inoue et al. |
| 2002/0157028 A1 | 10/2002 | Koue et al. |
| 2002/0159640 A1 | 10/2002 | Vaithilingam et al. |
| 2002/0191003 A1 | 12/2002 | Hobgood et al. |
| 2002/0191848 A1 | 12/2002 | Boose et al. |
| 2002/0194264 A1 | 12/2002 | Uchiyama et al. |
| 2003/0025714 A1 | 2/2003 | Ebersole et al. |
| 2003/0030835 A1 | 2/2003 | Yoshida et al. |
| 2003/0098877 A1 | 5/2003 | Boegelund |
| 2003/0110130 A1 | 6/2003 | Pelletier |
| 2003/0110216 A1 | 6/2003 | Althin et al. |
| 2003/0112930 A1 | 6/2003 | Bosik et al. |
| 2003/0121006 A1 | 6/2003 | Tabata et al. |
| 2003/0122922 A1 | 7/2003 | Saffer et al. |
| 2003/0126147 A1 | 7/2003 | Essafi et al. |
| 2003/0128375 A1 | 7/2003 | Ruhl et al. |
| 2003/0151674 A1 | 8/2003 | Lin |
| 2003/0152293 A1 | 8/2003 | Bresler et al. |
| 2003/0187886 A1 | 10/2003 | Hull et al. |
| 2003/0190094 A1 | 10/2003 | Yokota |
| 2003/0193530 A1 | 10/2003 | Blackman et al. |
| 2003/0212585 A1 | 11/2003 | Kyoya et al. |
| 2003/0229857 A1 | 12/2003 | Sayuda et al. |
| 2004/0017482 A1 | 1/2004 | Weitman |

| | | |
|---|---|---|
| 2004/0027604 A1 | 2/2004 | Jeran et al. |
| 2004/0036679 A1 | 2/2004 | Emerson |
| 2004/0042667 A1 | 3/2004 | Lee et al. |
| 2004/0102898 A1 | 5/2004 | Yokota et al. |
| 2004/0122811 A1 | 6/2004 | Page |
| 2004/0133582 A1 | 7/2004 | Howard et al. |
| 2004/0139391 A1 | 7/2004 | Stumbo et al. |
| 2004/0143644 A1 | 7/2004 | Berton et al. |
| 2004/0198396 A1 | 10/2004 | Fransioli |
| 2004/0199531 A1 | 10/2004 | Kim et al. |
| 2004/0201706 A1 | 10/2004 | Shimizu et al. |
| 2004/0205347 A1 | 10/2004 | Erol et al. |
| 2004/0215689 A1 | 10/2004 | Dooley et al. |
| 2004/0221244 A1 | 11/2004 | Baldino |
| 2004/0233235 A1 | 11/2004 | Rubin et al. |
| 2004/0238621 A1 | 12/2004 | Beenau et al. |
| 2004/0243514 A1 | 12/2004 | Wankmueller |
| 2004/0260625 A1 | 12/2004 | Usami et al. |
| 2004/0260680 A1 | 12/2004 | Best et al. |
| 2005/0012960 A1 | 1/2005 | Eden et al. |
| 2005/0080693 A1 | 4/2005 | Foss et al. |
| 2005/0086188 A1 | 4/2005 | Hillis et al. |
| 2005/0086224 A1 | 4/2005 | Franciosa et al. |
| 2005/0089246 A1 | 4/2005 | Luo |
| 2005/0100219 A1 | 5/2005 | Berkner et al. |
| 2005/0114325 A1 | 5/2005 | Liu et al. |
| 2005/0125390 A1 | 6/2005 | Hurst-Hiller et al. |
| 2005/0129293 A1 | 6/2005 | Acharya et al. |
| 2005/0135483 A1 | 6/2005 | Nair |
| 2005/0160115 A1 | 7/2005 | Starkweather |
| 2005/0160258 A1 | 7/2005 | O'Shea et al. |
| 2005/0165747 A1 | 7/2005 | Bargeron et al. |
| 2005/0165784 A1 | 7/2005 | Gomez et al. |
| 2005/0169520 A1 | 8/2005 | Chen et al. |
| 2005/0182773 A1 | 8/2005 | Feinsmith et al. |
| 2005/0185060 A1 | 8/2005 | Neven |
| 2005/0185225 A1 | 8/2005 | Brawn et al. |
| 2005/0190273 A1 | 9/2005 | Toyama et al. |
| 2005/0190972 A1 | 9/2005 | Thomas et al. |
| 2005/0198095 A1 | 9/2005 | Du et al. |
| 2005/0216257 A1 | 9/2005 | Tanabe et al. |
| 2005/0234851 A1 | 10/2005 | King et al. |
| 2005/0240381 A1 | 10/2005 | Seiler et al. |
| 2005/0261990 A1 | 11/2005 | Gocht et al. |
| 2005/0273812 A1 | 12/2005 | Sakai |
| 2005/0288859 A1 | 12/2005 | Golding et al. |
| 2005/0288911 A1 | 12/2005 | Porikli |
| 2005/0289182 A1 | 12/2005 | Pandian et al. |
| 2005/0289447 A1 | 12/2005 | Hadley et al. |
| 2006/0002607 A1 | 1/2006 | Boncyk et al. |
| 2006/0012677 A1 | 1/2006 | Neven et al. |
| 2006/0020630 A1 | 1/2006 | Stager et al. |
| 2006/0023945 A1 | 2/2006 | King et al. |
| 2006/0026140 A1 | 2/2006 | King et al. |
| 2006/0041605 A1 | 2/2006 | King et al. |
| 2006/0043188 A1 | 3/2006 | Kricorissian |
| 2006/0048059 A1 | 3/2006 | Etkin |
| 2006/0053097 A1 | 3/2006 | King et al. |
| 2006/0056696 A1 | 3/2006 | Jun et al. |
| 2006/0056697 A1 | 3/2006 | Jun et al. |
| 2006/0061806 A1 | 3/2006 | King et al. |
| 2006/0070120 A1 | 3/2006 | Aoki et al. |
| 2006/0074828 A1 | 4/2006 | Heumann et al. |
| 2006/0082438 A1 | 4/2006 | Bazakos et al. |
| 2006/0085477 A1 | 4/2006 | Phillips et al. |
| 2006/0085735 A1 | 4/2006 | Shimizu |
| 2006/0104515 A1* | 5/2006 | King et al. .................... 382/190 |
| 2006/0112092 A1 | 5/2006 | Ziou et al. |
| 2006/0116555 A1 | 6/2006 | Pavlidis et al. |
| 2006/0119880 A1 | 6/2006 | Danekar et al. |
| 2006/0122884 A1 | 6/2006 | Graham et al. |
| 2006/0122983 A1 | 6/2006 | King et al. |
| 2006/0123347 A1 | 6/2006 | Hewitt et al. |
| 2006/0140475 A1 | 6/2006 | Chin et al. |
| 2006/0140614 A1 | 6/2006 | Kim et al. |
| 2006/0143176 A1 | 6/2006 | Mojsilovic et al. |
| 2006/0150079 A1 | 7/2006 | Albornoz et al. |
| 2006/0190812 A1 | 8/2006 | Ellenby et al. |
| 2006/0200480 A1 | 9/2006 | Harris et al. |
| 2006/0206335 A1 | 9/2006 | Thelen et al. |
| 2006/0218225 A1 | 9/2006 | Hee Voon et al. |
| 2006/0227992 A1 | 10/2006 | Rathus et al. |
| 2006/0240862 A1 | 10/2006 | Neven et al. |
| 2006/0251292 A1 | 11/2006 | Gokturk et al. |
| 2006/0251339 A1 | 11/2006 | Gokturk et al. |
| 2006/0253439 A1 | 11/2006 | Ren et al. |
| 2006/0253491 A1 | 11/2006 | Gokturk et al. |
| 2006/0262352 A1 | 11/2006 | Hull et al. |
| 2006/0262962 A1 | 11/2006 | Hull et al. |
| 2006/0262976 A1 | 11/2006 | Hart et al. |
| 2006/0285172 A1 | 12/2006 | Hull et al. |
| 2006/0285755 A1 | 12/2006 | Hager et al. |
| 2006/0285772 A1 | 12/2006 | Hull et al. |
| 2006/0286951 A1 | 12/2006 | Nagamoto et al. |
| 2006/0294049 A1 | 12/2006 | Sechrest et al. |
| 2007/0003166 A1 | 1/2007 | Berkner |
| 2007/0019261 A1 | 1/2007 | Chu |
| 2007/0036469 A1 | 2/2007 | Kim et al. |
| 2007/0041668 A1 | 2/2007 | Todaka |
| 2007/0047819 A1 | 3/2007 | Hull et al. |
| 2007/0050341 A1* | 3/2007 | Hull et al. .................... 707/3 |
| 2007/0053513 A1 | 3/2007 | Hoffberg |
| 2007/0076922 A1 | 4/2007 | Living et al. |
| 2007/0115373 A1 | 5/2007 | Gallagher et al. |
| 2007/0150466 A1 | 6/2007 | Brave et al. |
| 2007/0165904 A1 | 7/2007 | Nudd et al. |
| 2007/0174269 A1 | 7/2007 | Jing et al. |
| 2007/0175998 A1 | 8/2007 | Lev |
| 2007/0233613 A1 | 10/2007 | Barrus et al. |
| 2007/0271247 A1 | 11/2007 | Best et al. |
| 2007/0276845 A1 | 11/2007 | Geilich |
| 2008/0010605 A1 | 1/2008 | Frank |
| 2008/0071767 A1 | 3/2008 | Grieselhuber et al. |
| 2008/0078836 A1 | 4/2008 | Tomita |
| 2008/0267504 A1 | 10/2008 | Schloter et al. |
| 2008/0275881 A1 | 11/2008 | Conn et al. |
| 2008/0288476 A1 | 11/2008 | Kim et al. |
| 2008/0296362 A1 | 12/2008 | Lubow |
| 2008/0310717 A1 | 12/2008 | Saathoff et al. |
| 2009/0067726 A1 | 3/2009 | Erol et al. |
| 2009/0152357 A1 | 6/2009 | Lei et al. |
| 2009/0235187 A1 | 9/2009 | Kim et al. |
| 2010/0013615 A1 | 1/2010 | Hebert et al. |
| 2010/0174783 A1 | 7/2010 | Zarom |
| 2011/0121069 A1 | 5/2011 | Lindahl et al. |

FOREIGN PATENT DOCUMENTS

| | | |
|---|---|---|
| EP | 0706283 A | 4/1996 |
| EP | 1229496 A2 | 8/2002 |
| EP | 1555626 A2 | 7/2005 |
| EP | 1662064 A1 | 5/2006 |
| EP | 1783681 | 5/2007 |
| JP | 10-228468 A | 8/1998 |
| JP | 2000-165645 A | 6/2000 |
| JP | 200268179 | 9/2000 |
| JP | 2001211359 | 8/2001 |
| JP | 2001230916 | 8/2001 |
| JP | 2002513480 | 5/2002 |
| JP | 2005286395 | 10/2005 |
| JP | 2006053568 | 2/2006 |
| JP | 2006059351 | 3/2006 |
| JP | 2006215756 | 8/2006 |
| WO | WO 99/05658 A1 | 2/1999 |
| WO | WO 2004/072897 A2 | 8/2004 |
| WO | WO 2005/043270 A2 | 5/2005 |
| WO | WO 2007/073347 A1 | 6/2007 |
| WO | 2008129373 | 10/2008 |

OTHER PUBLICATIONS

Aggarwal, M et al, "On Cosine-fourth and Vignetting Effects in Real Lenses," ICCV Proceedings, IEEE, 2001, vol. 1, pp. 472-479, [online] Retrieved from the Internet<URL: http://www.metaverselab.org/classis/635/reading/aggarwal-iccv.pdf>.

Akenine-Moller, T. et al., "Real-Time Rendering," A.K. Peters, Natick, MA, $2^{nd}$ Edition, 2002, pp. 70-84.

Archive of "Barcodepedia.com—the online barcode database," [online] [Archived by http://archive.org on Jul. 9, 2006; Retrieved on Aug. 18, 2008] Retrieved from the Internet<http://web.archive.org/web/20060709101455/http://en.barcodepedia.com/>.

Baba, M. et al., "Shadow Removal from a Real Image Based on Shadow Density," Poster at SIGGRAPH2004, Updated Aug. 16, 2004, 4 pages, [online] Retrieved from the Internet<URL:http://www.cv.its.hiroshima.cu.ac.jp/baba/Shadow/poster04-02.pdf>.

Baird, H.S., "Document Image Defect Models and Their Uses," Proc., IAPR 2$^{nd}$ International Conference on Document Analysis and Recognition, Tsukuba Science City, Japan, Oct. 20-22, 1993, 7 pages.

Baird, H., "Document Image Defect Models," In Proc. of IAPR Workshop on Syntactic and Structural Pattern Recognition, Murray Hill, NJ, Jun. 1990, Structured Document Image Analysis, Springer-Verlag, pp. 546-556.

Baird, H., "The State of the Art of Document Image Degradation Modeling," In Proc. of the 4$^{th}$ IAPR International Workshop on Document Analysis Systems, Rio de Janeiro, Brazil, 2000, pp. 1-16, [online] Retrieved from the Internet<URL:http://www2.parc.xerox.com/istl/members/baird/das00.pas.gz>.

Barney Smith, E.H. et al., "Text Degradations and OCR Training," International Conference on Document Analysis and Recognition 2005, Seoul, Korea, Aug. 2005, 5 pages, [online] Retrieved from the Internet<URL:http://coen.boisestate.edu/EBarneySmith/Papers/ICDAR05_submit.pdf>.

Bouget, J., "Camera Calibration Toolbox for Matlab," Online Source, Updated Jul. 24, 2006, 6 pages, [online] Retrieved from the Internet<URL:http:www.vision.caltech.edu/bougetj/calib_doc/index.html#ref>.

Boukraa, M. et al., "Tag-Based Vision: Assisting 3D Scene Analysis with Radio-Frequency Tags," Jul. 8, 2002, Proceedings of the Fifth International Conference on Information Fusion, Piscataway, N.J., IEEE, Jul. 8-11, 2002, pp. 412-418.

Boyd, S., "EE263: Introduction to Linear Dynamical Systems," Online Lecture Notes, Stanford University, Spring Quarter, 2006-2007, Accessed on Sep. 11, 2006, 4 pages, [online] Retrieved from the Internet<URL:http://www.standford/edu/class/ee263/#lectures>.

Brassil, J. et al., "Hiding Information in Document Images," Proc. Conf. Information Sciences and Systems (CISS-95), Mar. 1995, Johns Hopkins University, Baltimore, MD, pp. 482-489.

"Call for Papers: ICAT 2007," 17$^{th}$ International Conference on Artificial Reality and Telexistence, 2007, [Online] [Retrieved on Nov. 4, 2008] Retrieved from the Internet<URL:http://www.idemployee.id.tue.nl/g.w.m.rauterberg/conferences/ICAT2007-CfP.pdf>.

Constantini, R. et al., "Virtual Sensor Design," Proceedings of the SPIE, vol. 5301, 2004, pp. 408-419, Retrieved from the Internet<URL:http://ivrgwww.epfl.ch/publications/cs04.pdf>.

Cover, T.M. et al., "Nearest Neighbor Pattern Classification," IEEE Transactions on Information Theory, Jan. 1967, pp. 21-27, vol. IT-13, No. 1.

Davis, M. et al., "Towards Context-Aware Face Recognition," Proceedings of the 13th Annual ACM International Conference on Multimedia, Nov. 6-11, 2005, pp. 483-486, vol. 13.

Doermann, D. et al., "Progress in Camera-Based Document Image Analysis," Proceedings of the Seventh International Conference on Document Analysis and Recognition, ICDAR 2003, 11 pages, [online] Retrieved from the Internet<URL:http://www.cse.salford.ac.uk/prima/ICDAR2003/Papers/0111_keynote_III_doermann_d.pdf>.

Erol, B. et al., "Linking Multimedia Presentations with Their Symbolic Source Documents: Algorithm and Applications," Nov. 2-8, 2003, pp. 498-507, [Online] [Retreived on Oct. 15, 2008] Retrieved from the Internet<URL:http://rii.ricoh.com/{hull/pubs/p225_erol.pdf>.

Esposito, F. et al., "Machine Learning Methods for Automatically Processing Historical Documents: from Paper Acquisition to XML Transformation," Proceedings of the First International Workshop on Document Image Analysis for Libraries (DIAL '04), IEEE, 2004, pp. 1-8.

European Partial Search Report, European Application No. EP07015093.3, Dec. 17, 2007, 7 pages.

European Search Report, European Application No. 08160125.4, Oct. 13, 2008, 5 pages.

European Search Report, European Application No. 06796845.3, Oct. 30, 2008, 12 pages.

European Search Report, European Application No. 06796844.6, Oct. 30, 2008, 12 pages.

European Search Report, European Application No. 06796848.7, Oct. 31, 2008, 12 pages.

European Search Report, European Application No. 06796846.1, Nov. 5, 2008, 11 pages.

European Search Report, European Application No. 08159971.4, Nov. 14, 2008, 6 pages.

European Search Report, European Application No. 08160115.5, Nov. 12, 2008, 6 pages.

European Search Report, European Application No. 08160130.4, Nov. 12, 2008, 7 pages.

European Search Report, European Application No. 08160112.2, Nov. 10, 2008, 7 pages.

European Search Report, European Application No. 07252397, Oct. 15, 2007, 7 pages.

Ho, T.K. et al., "Decision Combination in Multiple Classifier Systems," IEEE Transactions on Pattern Analysis and Machine Intelligence, Jan. 1994, pp. 66-75, vol. 16, No. 1.

Ho, T.K. et al., "Evaluation of OCT Accuracy Using Synthetic Data," Proceedings of the 4$^{th}$ Annual Symposium on Document Analysis and Information Retrieval, Apr. 24-26, 1995, pp. 413-422. [online] Retrieved from the Internet<URL:http://citeseer.ist.psu.edu/cache/papers/cs/2303/http:zSzzSzcm.bell-labs.comzSzcmzSzcszSzwhozSzhsbzSzeoasd.pdf/ho95evaluation.pdf>.

Hull, J.J., "Document Image Matching and Retrieval with Multiple Distortion-Invariant Descriptors," International Association for Pattern Recognition Workshop on Document Analysis Systems, Jan. 1, 1995, pp. 375-396.

Hull, J.J. et al., "Document Image Matching Techniques," Apr. 30, 1997, pp. 31-35, [Online] [Retrieved on May 2, 1997] Retrieved from the Internet<URL:http://rii.ricoch.com/hull/pubs/hull_sdiut97.pdf>.

Hull, J. J., "Document Image Similarity and Equivalence Detection," International Journal on Document Analysis and Recognition, 1998, pp. 37-42, Springer-Verlag.

Hull, J., "Document Image Skew Detection: Survey and Annotated Bibliography," Document Analysis Systems II, World Scientific, 1998, pp. 40-64.

Hull, J.J. et al., "Paper-Based Augmented Reality," 17$^{th}$ International Conference on Artificial Reality and Telexistence, Nov. 1, 2007, pp. 205-209.

Kanungo, T. et al., "A Downhill Simplex Algorithm for Estimating Morphological Degradation Model Parameters," University of Maryland Technical Report, LAMP-RT-066, Feb. 2001, 15 pages, [online] Retrieved from the Internet<URL: http://lampsrv01.umiacs.umd.edu/pubs/TechReports/LAMP_066/LAMP_066.pdf>.

Kanungo, T. et al., "Global and Local Document Degradation Models," Document Analysis and Recognition, 1993, Proceedings of the Second International Conference on Volume, Oct. 20-22, 1993, pp. 730-734.

Khoubyari, S. et al., "Font and Funct on Word Ident ficat on n Document Recogn t on," Computer Vision and Image Understanding, Jan. 1996, pp. 66-74, vol. 63, No. 1.

Khoubyari, S. et al., "Keyword Location and Noisy Document Images," Second Annual Symposium on Document Analysis and Information Retrieval, Las Vegas, NV, Apr. 26-28, 1993, pp. 217-231.

Kopec, G.E. et al., "Document Image Decoding Using Markov Source Models," IEEE Transactions on Pattern Analysis and Machine Intelligence, Jun. 1994, pp. 602-617, vol. 16, No. 6.

Li, Y. et al., "Validation of Image Defect Models for Optical Character Recognition," IEEE Trans. Pattern Anal. Mach. Intell. 18, 2, Feb. 1996, pp. 99-108, [online] Retrieved from the I nternet<URL: http://www.cs.cmu.edu/afs/cs/usr/andrewt/papers/Validate/journal.ps.gz>.

Liang, J. et al., "Flattening Curved Documents in Images," in Proc. of the IEEE Conf. on Computer Vision and Pattern Recognition (CVPR), 2005, 8 pages, [online] Retrieved from the Internet<URL:http://www.cfar.umd.edu/~daniel/daniel_papersfordownload/liang-j_cpvr2005.pdf>.

Lu, Y. et al., "Document Retrieval from Compressed Images," Pattern Recognition, 2003, pp. 987-996, vol. 36.

McDonald, G., "Third Voice: Invisible Web Graffiti," PC World, May 18, 1999, [online] [Retrieved on Nov. 14, 2006] Retrieved from the Internet<URL:http://www.pcworld.com/news/article/0,aid,11016,00.asp>.

Microsoft Computer Dictionary (5th ed.), 2002, "Hyperlink" Definition, pp. 260-261.

"Mobile Search Engines," Sonera MediaLab, Nov. 15, 2002, pp. 1-12.

"Mobile Video Managed Service," Vidiator, 2008, [online] [Retrieved on Aug. 29, 2008] Retrieved from the Internet<URL:http://www.vidiator.com/services/managed_mobile_video.aspx>.

Mukherjea, S. et al., "AMORE: A World Wide Web Image Retrieval Engine," C&C Research Laboratories, NEC USA Inc., Baltzer Science Publishers BV, World Wide Web 2, 1999, pp. 115-132.

Pavlidis, T., "Effects of Distortions on the Recognition Rate of a Structural OCR System," In Pro. Conf. on Comp. Vision and Pattern Recog., IEEE, Washington, DC, 1983, pp. 303-309.

PCT International Search Report and Written Opinion, PCT/JP2006/316810, Oct. 10, 2006, 9 pages.

PCT International Search Report and Written Opinion, PCT/JP2006/316811, Oct. 10, 2006, 9 pages.

PCT International Search Report and Written Opinion, PCT/JP2006/316812, Oct. 10, 2006, 9 pages.

PCT International Search Report and Written Opinion, PCT/JP2006/316814, Oct. 10, 2006, 11 pages.

Sato, T. et al., "High Resolution Video Mosaicing for Documents and Photos by Estimating Camera Motion," Proceedings of the SPIE 5299, 246, 2004, 8 pages, [online] Retrieved from the Internet<URL:http://yokoya.naist.jp/paper/datas/711/spie2004.pdf>.

Schalkoff, R.J., "Syntactic Pattern Recognition (SYNTPR) Overview," Pattern Recognition: Statistical, Structural and Neural Approaces, Jan. 1, 1992, pp. 127-150, vol. 3, Wiley.

Sivic, J. et al., "Video Google: A Text Retrieval Approach to Object Matching in Videos," Proceedings of the Ninth International Conference on Computer Vision (ICCV 2003), 2-Volume Set, 2003, IEEE, pp. 1-8.=.

Stoyanov, D., "Camera Calibration Tools," Online Source, Updated Aug. 24, 2006, Accessed Aug. 31, 2006, 12 pages, [online] Retrieved from the Internet<URL:http://ubimon.doc.ic.ac.uk/dvs/index.php?m=581>.

Veltkamp, R. et al., "Content-Based Image Retrieval Systems: A Survey," Department of Computing Science, Utrecht University, Oct. 28, 2002, pp. 1-62.

Wikipedia Online Definition, "Optical Character Recognition," Sep. 14, 2008, pp. 1-7, [online] [Retrieved on Sep. 14, 2008] Retrieved from the Internet<URL:http://en.wikipedia.org/wiki/Optical_character_recognition>.

Wikipedia Online Encyclopedia, "Automatic Identification and Data Capture," Jul. 21, 2008, pp. 1-2, [Online] [Retrieved on Sep. 27, 2008] Retrieved from the Internet<URL:http://en.wikipedia.org/wiki/Automatic_identification_and_data_capture>.

Zhang, Z., "A Flexible New Technique for Camera Calibration," IEEE Transactions on Pattern Analysis and Machine Intelligence, Nov. 2000, pp. 1330-1334, vol. 22, No. 11.

Zheng, Q.-F. et al., "Effective and Efficient Object-Based Image Retrieval Using Visual Phases," Proceedings of the 14th Annual ACM International Conference on Multimedia, MM'06, Oct. 23-27, 2006, Santa Barbara, CA, pp. 77-80.

Zi, G., "Groundtruth Generation and Document Image Degradation," University of Maryland Language and Media Processing Laboratory Technical report (LAMP-TR-121), May 2005, 72 pages, [online] Retrieved from the Internet<URL:http://lampsrv01.umiacs.umd.edu/pubs/TechReports/LAMP_121/LAMP_121.pdf>.

European Search Report, European Application No. 09170045.0, Nov. 24, 2009, 4 pages.

Roth, M.T. et al., "The Garlic Project," Proc. of the 1996 ACM SIGMOD International Conference on Management of Data, Montreal, Quebec, Canada, Jun. 4, 1996, pp. 557.

Archive of Scanbuy Solutions | Optical Intelligence for your Mobile Devices, Scanbuy® Inc., www.scanbuy.com/website/solutions_summary.htm, [Online] [Archived by http://archive.org on Jun. 19, 2006; Retrieved on Mar. 3, 2009] Retrieved from the Internet<URL:http://web.archive.org/web/20060619172549/http://www.scanbuy.com/website/solutions_su...>.

Canny, J., "A Computational Approach to Edge Detection," IEEE Transactions on Pattern Analysis and Machine Intelligence, Nov. 1986, pp. 679-714, vol. PAMI-8, No. 6.

Di Stefano, L. et al., "A Simple and Efficient Connected Components Labeling Algorithm," International Conference on Image Analysis and Processing, 1999, pp. 322-327.

Duda, R. O. et al., "Use of the Hough Transformation to Detect Lines and Curves in Pictures," Communications of the ACM, Jan. 1972, pp. 11-15, vol. 15, No. 1.

Erol, B. et al., "Prescient Paper: Multimedia Document Creation with Document Image Matching," 17th International Conference on Pattern Recognition, Aug. 23-26, 2004, Cambridge, UK.

Erol, B. et al., "Retrieval of Presentation Recordings with Digital Camera Images," IEEE Conference on Computer Vision and Pattern Recognition, Jun. 27-Jul. 2, 2004.

Ezaki, N. et al., "Text Detection from Natural Scene Images: Towards a System for Visually Impaired Persons," Proc. of 17th Int. Conf. on Pattern Recognition (ICPR 2004), IEEE Computer Society, Aug. 23-26, 2004, Cambridge, UK, pp. 683-686, vol. II.

Fadoua, D. et al., "Restoring Ink Bleed-Through Degraded Document Images Using a Recursive Unsupervised Classification Technique," Lecture Notes in Computer Science 3872, Document Analysis Systems VII, 7th International Workshop, DAS 2006, Feb. 13-15, 2006, Nelson, New Zealand, Bunke, H. et al. (eds.), pp. 38-49.

Freund, Y. et al., "A Short Introduction to Boosting," Journal of Japanese Society for Artificial Intelligence, Sep. 1999, pp. 771-780, vol. 14, No. 5.

Hjelmas, E. et al., "Face Detection: A Survey," Computer Vision and Image Understanding, 2001, pp. 236-274, vol. 83.

Hull, J.J., "Document Image Matching on CCITT Group 4 Compressed Images," SPIE Conference on Document Recognition IV, Feb. 8, 1997, pp. 82-87.

Jagannathan, L. et al., Perspective Correction Methods for Camera Based Document Analysis, Proc. First Int. Workshop on Camera-based Document Analysis and Recognition, 2005, pp. 148-154.

Jain, A.K. et al., "An Introduction to Biometric Recognition," IEEE Transactions on Circuits and Systems for Video Technology, Jan. 2004, pp. 4-20, vol. 14, No. 1.

Po, L-M. et al., "A Novel Four-Step Search Algorithm for Fast Block Motion Estimation," IEEE Transactions on Circuits and Systems for Video Technology, Jun. 1996, pp. 313-317, vol. 6, Issue 3.

Rangarajan, K. et al. "Optimal Corner Detector," 1988, IEEE, pp. 90-94.

Rosin, P.L. et al., "Image Difference Threshold Strategies and Shadow Detection," Proceedings of the 6th British Machine Vision Conference, 1995, 10 pages.

Sezgin, M. et al., "Survey Over Image Thresholding Techniques and Quantitative Performance Evaluation," Journal of Electronic Imaging, Jan. 2004, pp. 146-165, vol. 13, No. 1.

Triantafyllidis, G.A. et al., "Detection of Blocking Artifacts of Compressed Still Images," Proceedings of the 11th International Conference on Image Analysis and Processing (ICIAP '01), IEEE, 2001, pp. 1-5.

U.S. Appl. No. 10/696,735, filed Oct. 28, 2003, Erol, B. et al., "Techniques for Using a Captured Image for the Retrieval of Recorded Information," 58 pages.

Zanibbi, R. et al. "A Survey of Table Recognition," International Journal on Document Analysis and Recognition, 2004, pp. 1-33.

Zhao, W. et al., Face Recognition: A Literature Survey, ACM Computing Surveys (CSUR), 2003, pp. 399-458, vol. 35, No. 4.

Liu, Y. et al., "Automatic Texture Segmentation for Texture-Based Image Retrieval," IEEE, Jan. 5-7, 2004, pp. 285-288.

Liu, T. et al., "A Fast Image Segmentation Algorithm for Interactive Video Hotspot Retrieval," IEEE, 2001, pp. 3-8.

Wikipedia Online Encyclopedia, "Image Scanner," Last Modified Feb. 9, 2010, pp. 1-9, [Online] [Retrieved on Feb. 13, 2010] Retrieved from the Internet<URL:http://en.wikipedia.org/wiki/Image_scanner>.

Wikipedia Online Encyclopedia, "Waypoint," Last Modified Feb. 13, 2010, pp. 1-4, [Online] Retrieved on Feb. 13, 2010] Retrieved from the Internet<URL:http://en.wikipedia.org/wiki/Waypoint>.

Erol, B. et al., "Linking Presentation Documents Using Image Analysis," IEEE, Nov. 9-12, 2003, pp. 97-101, vol. 1.

Hull, J.J. et al., "Visualizing Multimedia Content on Paper Documents: Components of Key Frame Selection for Video Paper," Proceedings of the Seventh International Conference on Document Analysis and Recognition (ICDAR'03), IEEE, 2003, 4 pages.

United States Office Action, U.S. Appl. No. 11/624,466, Jun. 8, 2010, 29 pages.

United States Office Action, U.S. Appl. No. 11/827,530, Jun. 9, 2010, 35 pages.

United States Office Action, U.S. Appl. No. 11/461,294, Jun. 11, 2010, 19 pages.

United States Office Action, U.S. Appl. No. 11/461,300, Jun. 11, 2010, 20 pages.

United States Office Action, U.S. Appl. No. 11/461,024, Jul. 14, 2010, 29 pages.

United States Office Action, U.S. Appl. No. 11/461,049, Jul. 28, 2010, 27 pages.

United States Office Action, U.S. Appl. No. 11/461,279, Aug. 5, 2010, 37 pages.

United States Office Action, U.S. Appl. No. 11/461,286, Aug. 5, 2010, 28 pages.

United States Office Action, U.S. Appl. No. 12/240,596, Aug. 6, 2010, 32 pages.

European Search Report, European Application No. 09156089.6, Jun. 19, 2009, 8 pages.

Marques, O. et al., "Content-Based Image and Video Retrieval, Video Content Representation, Indexing, and Retrieval, a Survey of Content-Based Image Retrieval Systems, CBVQ (Content-Based Visual Query)," Content-Based Image and Video Retrieval [Multimedia Systems and Applications Series], Apr. 1, 2002, pp. 15-117, vol. 21, Kluwer Academic Publishers Group, Boston, USA.

Extended European Search Report, Application No. 09178280.5-2201/2202646, Aug. 31, 2010, 6 pages.

United States Office Action, U.S. Appl. No. 11/461,143, Aug. 18, 2010, 9 pages.

United States Office Action, U.S. Appl. No. 11/461,272, Aug. 23, 2010, 31 pages.

United States Office Action, U.S. Appl. No. 11/461,126, Sep. 3, 2010, 28 pages.

United States Notice of Allowance, U.S. Appl. No. 11/461,095, Sep. 27, 2010, 29 pages.

United States Office Action, U.S. Appl. No. 11/461,294, Oct. 7, 2010, 17 pages.

United States Office Action, U.S. Appl. No. 11/461,300, Oct. 6, 2010, 20 pages.

United States Office Action, U.S. Appl. No. 11/827,530, Oct. 7, 2010, 21 pages.

United States Office Action, U.S. Appl. No. 11/624,466, Oct. 14, 2010, 11 pages.

United States Notice of Allowance, U.S. Appl. No. 11/461,091, Oct. 18, 2010, 31 pages.

United States Notice of Allowance, U.S. Appl. No. 11/461,024, Nov. 15, 2010, 10 pages.

United States Notice of Allowance, U.S. Appl. No. 11/461,049, Nov. 16, 2010, 10 pages.

United States Notice of Allowability, U.S. Appl. No. 11/461,091, Nov. 17, 2010, 22 pages.

United States Office Action, U.S. Appl. No. 11/777,142, Nov. 10, 2010, 17 pages.

U.S. Office Action, U.S. Appl. No. 11/776,520, Dec. 7, 2010, 43 pages.

U.S. Office Action, U.S. Appl. No. 12/719,437, Dec. 9, 2010, 38 pages.

U.S. Office Action, U.S. Appl. No. 11/776,510, Dec. 10, 2010, 39 pages.

U.S. Office Action, U.S. Appl. No. 11/461,126, Dec. 23, 2010, 30 pages.

U.S. Office Action, U.S. Appl. No. 11/461,279, Jan. 7, 2011, 44 pages.

U.S. Office Action, U.S. Appl. No. 12/240,596, Jan. 21, 2011, 21 pages.

U.S. Office Action, U.S. Appl. No. 11/461,286, Jan. 21, 2011, 34 pages.

U.S. Office Action, U.S. Appl. No. 11/461,143, Feb. 4, 2011, 16 pages.

Japanese Office Action, Japanese Patent Application No. 200910138044.X, Jan. 26, 2011, 6 pages.

U.S. Notice of Allowance, U.S. Appl. No. 11/624,466, Feb. 22, 2011, 12 pages.

U.S. Notice of Allowance, U.S. Appl. No. 11/461,272, Feb. 23, 2011, 28 pages.

U.S. Office Action, U.S. Appl. No. 12/879,933, Mar. 2, 2011, 7 pages.

U.S. Office Action, U.S. Appl. No. 12/210,519, Mar. 14, 2011, 38 pages.

U.S. Notice of Allowance, U.S. Appl. No. 11/461,024, Mar. 16, 2011, 12 pages.

U.S. Office Action, U.S. Appl. No. 11/461,300, Mar. 18, 2011, 25 pages.

U.S. Office Action, U.S. Appl. No. 11/777,142, Mar. 18, 2011, 21 pages.

U.S. Office Action, U.S. Appl. No. 11/461,037, Mar. 30, 2011, 29 pages.

U.S. Office Action, U.S. Appl. No. 12/210,511, Apr. 4, 2011, 49 pages.

U.S. Office Action, U.S. Appl. No. 12/247,202, Apr. 6, 2011, 37 pages.

U.S. Office Action, U.S. Appl. No. 11/461,126, Apr. 12, 2011, 27 pages.

U.S. Office Action, U.S. Appl. No. 11/461,294, Apr. 12, 2011, 23 pages.

U.S. Office Action, U.S. Appl. No. 12/210,540, Apr. 15, 2011, 45 pages.

U.S. Office Action, U.S. Appl. No. 12/340,124, Apr. 15, 2011, 48 pages.

Antonacopoulos et al., "Flexible Page Segmentation Using the Background", Proceedings of the IAPR International Conference on Pattern Recognition, Jerusalem, Oct. 9-13, 1994. Conference B: Pattern Recognition and Neural Networks; [Proceedings of the IAPR International Conference on Pattern Recognition], Los Alamitos, IEE, vol. 2, Oct. 9, 1994, pp. 339-344, XP000509905, ISBN: 978-0-8186-6272-0.

Reniers et al., "Skeleton-based Hierarchical Shape Segmentation", IEEE International Conference on Shape Modeling and Applications. SMI'07, Jun. 1, 2007, Computer Society, pp. 179-188, XP031116745, ISBN: 978-0-7695-2815-1.

Rademacher, "View-Dependent Geometry", Computer Graphics Proceedings, Annual Conference Series, SIGGRAPH 99, Los Angeles, California Aug. 8-13, 1999, pp. 439-446, XP001024743.

U.S. Patent Office Action, U.S. Appl. No. 12/121,275, Apr. 20, 2011, 44 pages.

U.S. Patent Office Action, U.S. Appl. No. 11/776,520, Apr. 28, 2011, 10 pages.

Extended European Search Report, European Patent Application No. 082523770, May 2, 2011, 6 pages.

U.S. Patent Office Action, U.S. Appl. No. 11/776,510, May 12, 2011, 20 pages.

U.S. Patent Office Action, U.S. Appl. No. 12/210,519, Jun. 16, 2011, 22 pages.

United States Office Action, U.S. Appl. No. 11/461,279, Jul. 8, 2011, 46 pages.

United States Office Action, U.S. Appl. No. 11/461,286, Jul. 15, 2011, 37 pages.

United States Office Action, U.S. Appl. No. 11/461,126, Jul. 22, 2011, 35 pages.

United States Notice of Allowance, U.S. Appl. No. 12/247,202, Jul. 28, 2011, 16 pages.

United States Office Action, U.S. Appl. No. 11/461,143, Aug. 11, 2011, 20 pages.

United States Office Action, U.S. Appl. No. 11/776,530, Aug. 19, 2011, 54 pages.
United States Office Action, U.S. Appl. No. 12/253,715, Aug. 31, 2011, 58 pages.
United States Office Action, U.S. Appl. No. 12/060,198, Sep. 1, 2011, 87 pages.
United States Office Action, U.S. Appl. No. 12/060,200, Sep. 2, 2011, 65 pages.
United States Notice of Allowance, U.S. Appl. No. 11/776,510, Sep. 22, 2011, 11 pages.
United States Office Action, U.S. Appl. No. 11/777,142, Sep. 23, 2011, 22 pages.
United States Office Action, U.S. Appl. No. 12/210,511, Sep. 28, 2011, 25 pages.
United States Office Action, U.S. Appl. No. 12/247,205, Oct. 6, 2011, 56 pages.
United States Office Action, U.S. Appl. No. 12/342,330, Oct. 7, 2011, 47 pages.
Mae et al., "Object Recognition Using Appearance Models Accumulated into Environment", Proc. 15-th Intl. Conf. on Pattern Recognition, 2000, vol. 4, pp. 845-848.
EPO Summons for Oral Proceedings, European Patent Application No. 07015093.3, Sep. 16, 2011, 4 pages.
Japanese Office Action, Japanese Patent Application No. 2008-008112, Oct. 25, 2011, 3 pages.
Adobe Acrobat Advanced Elements (for both PC and Mac Computers), 2002, pp. 1-19.
U.S. Office Action, U.S. Appl. No. 12/210,540, Oct. 14, 2011, 22 pages.
U.S. Office Action, U.S. Appl. No. 12/265,502, Oct. 14, 2011, 61 pages.
U.S. Office Action, U.S. Appl. No. 11/776,520, Oct. 17, 2011, 19 pages.
U.S. Office Action, U.S. Appl. No. 12/121,275, Oct. 19, 2011, 24 pages.
U.S. Office Action, U.S. Appl. No. 12/340,124, Oct. 24, 2011, 31 pages.
U.S. Office Action, U.S. Appl. No. 11/827,530, Oct. 28, 2011, 43 pages.
U.S. Office Action, U.S. Appl. No. 12/879,933, Oct. 28, 2011, 36 pages.
U.S. Office Action, U.S. Appl. No. 12/210,532, Oct. 31, 2011, 61 pages.
U.S. Office Action, U.S. Appl. No. 11/461,037, Nov. 23, 2011, 33 pages.
U.S. Office Action, U.S. Appl. No. 11/461,126, Dec. 1, 2011, 53 pages.
U.S. Notice of Allowance, U.S. Appl. No. 11/461,143, Dec. 5, 2011, 15 pages.
United States Office Action, U.S. Appl. No. 12/060,206, Dec. 15, 2011, 55 pages.
United States Notice of Allowance, U.S. Appl. No. 11/776,530, Dec. 21, 2011, 17 pages.
United States Office Action, U.S. Appl. No. 12/210,519, Jan. 5, 2012, 29 pages.
United States Notice of Allowance, U.S. Appl. No. 11/776,520, Jan. 5, 2012, 28 pages.
United States Office Action, U.S. Appl. No. 11/461,294, Jan. 18, 2012, 38 pages.
United States Office Action, U.S. Appl. No. 11/461,286, Jan. 20, 2012, 27 pages.
United States Notice of Allowance, U.S. Appl. No. 11/777,142, Jan. 20, 2012, 29 pages.
United States Notice of Allowance, U.S. Appl. No. 12/342,330, Jan. 23, 2012, 21 pages.
United States Office Action, U.S. Appl. No. 12/059,583, Jan. 26, 2012, 78 pages.
United States Notice of Allowance, U.S. Appl. No. 12/253,815, Jan. 26, 2012, 62 pages.
United States Office Action, U.S. Appl. No. 12/240,596, Feb. 2, 2012, 44 pages.
United States Office Action, U.S. Appl. No. 11/461,300, Feb. 23, 2012, 38 pages.

* cited by examiner

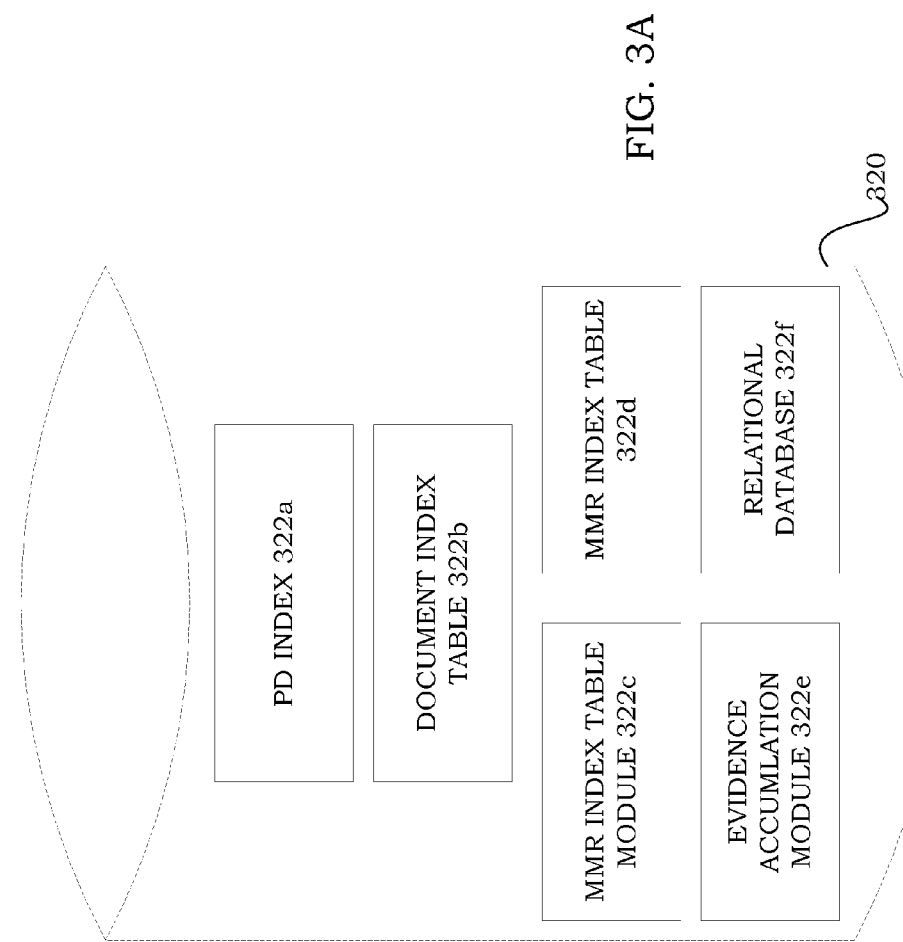

FIG. 17

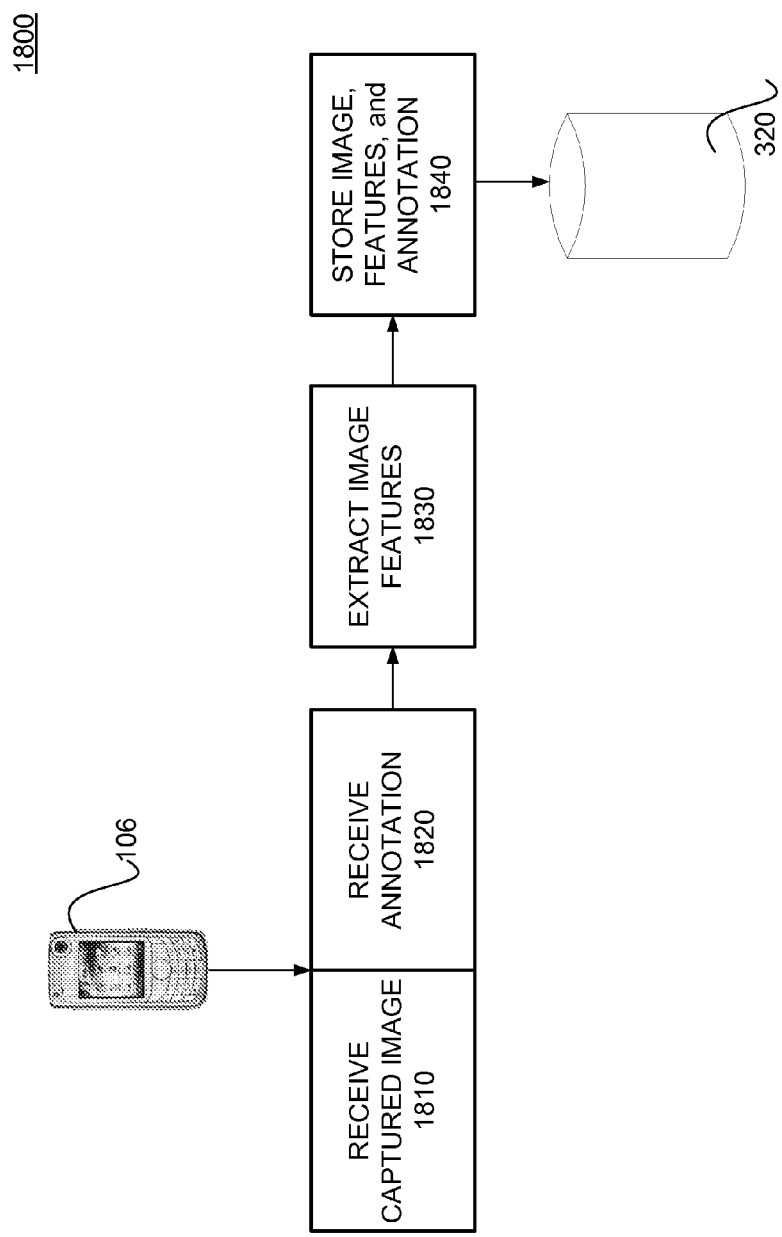

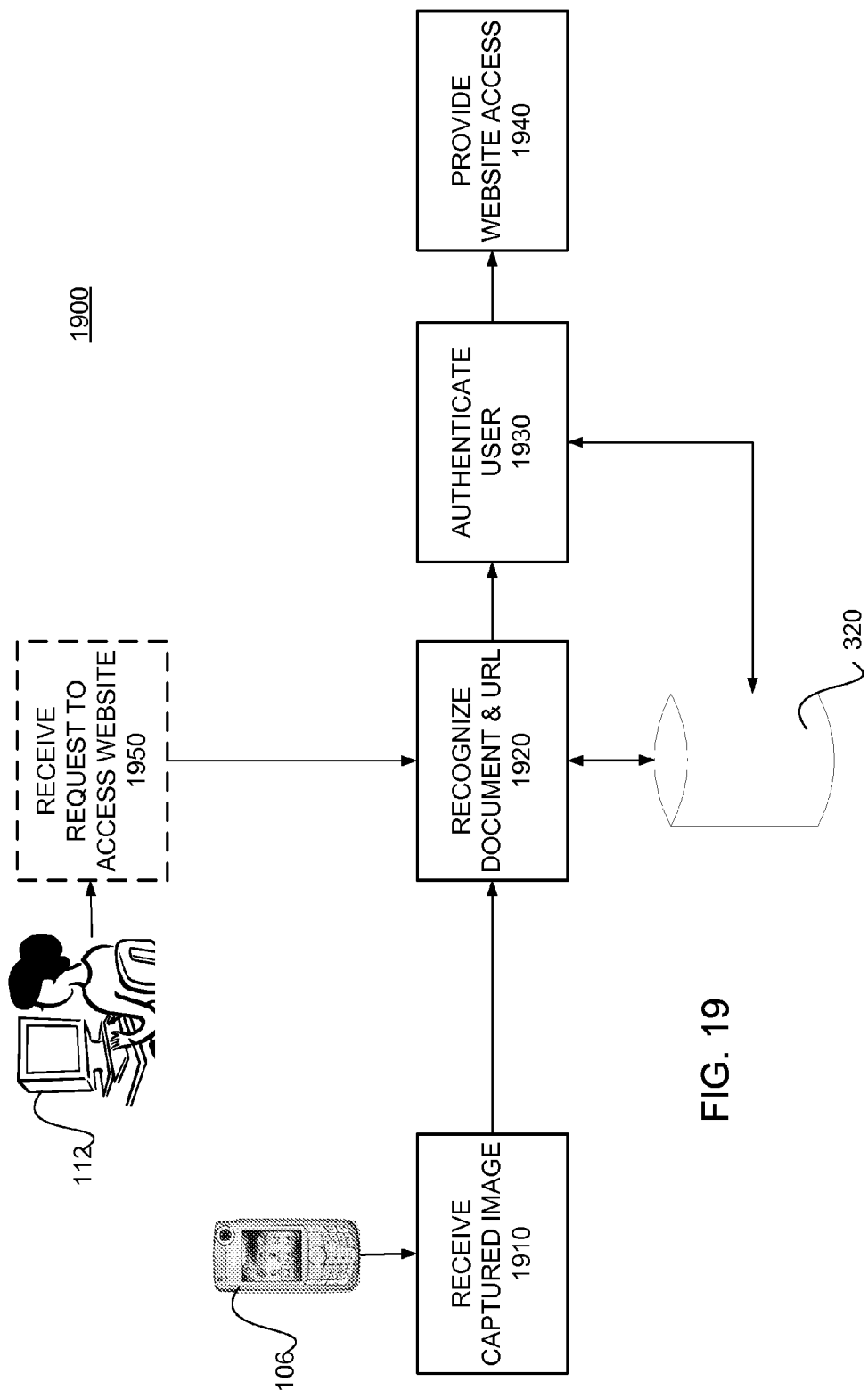

DOCUMENT-BASED NETWORKING WITH MIXED MEDIA REALITY

RELATED APPLICATIONS

The present application claims priority, under 35 U.S.C. §119(e), of U.S. Provisional Patent Application No. 60/949,050, filed on Jul. 11, 2007, entitled "Paper-base Social networking with MMR," which is hereby incorporated by reference in its entirety.

FIELD OF THE INVENTION

The invention relates to techniques for using a mixed media document that is formed from at least two media types, and more particularly, to a Mixed Media Reality (MMR) system that uses printed media in combination with electronic media to modify tie strength between members of existing networks.

BACKGROUND OF THE INVENTION

Document printing and copying technology has been used for many years in many contexts. By way of example, printers and copiers are used in private and commercial office environments, in home environments with personal computers, and in document printing and publishing service environments. However, printing and copying technology has not been thought of previously as a means to bridge the gap between static printed media (i.e., paper documents), and the "virtual world" of interactivity that includes the likes of digital communication, networking, information provision, advertising, entertainment, and electronic commerce.

Printed media has been the primary source of communicating information, such as news and advertising information, for centuries. The advent and ever-increasing popularity of personal computers and personal electronic devices, such as personal digital assistant (PDA) devices and cellular telephones (e.g., cellular camera phones), over the past few years has expanded the concept of printed media by making it available in an electronically readable and searchable form and by introducing interactive multimedia capabilities, which are unparalleled by traditional printed media.

Unfortunately, a gap exists between the virtual multimedia-based world that is accessible electronically and the physical world of print media. For example, although almost everyone in the developed world has access to printed media and to electronic information on a daily basis, users of printed media and of personal electronic devices do not possess the tools and technology required to form a link between the two (i.e., for facilitating a mixed media document).

Moreover, there are particular advantageous attributes that conventional printed media provides such as tactile feel, no power requirements, and permanency for organization and storage, which are not provided with virtual or digital media. Likewise, there are particular advantageous attributes that conventional digital media provides such as portability (e.g., carried in storage of cell phone or laptop) and ease of transmission (e.g., email).

For these reasons, a need exists for techniques that enable exploitation of the benefits associated with both printed and virtual media.

SUMMARY OF THE INVENTION

At least one aspect of one or more embodiments of the present invention provides a Mixed Media Reality (MMR) system and associated methods. The MMR system of the present invention provides mechanisms for forming a mixed media document that includes media of at least two types, such as printed paper as a first medium and text or data in electronic form, a digital picture, a digital photograph, digital movie, digital audio file, or web link as a second medium. Furthermore, the MMR system of the present invention facilitates methods that take advantage of the combination of a portable electronic device, such as a cellular camera phone, and a paper document. The MMR system of the present invention includes an MMR processor, a capture device, a communication mechanism and a memory including MMR software. The MMR processor may also be coupled to a storage or source of media types, an input device and an output device. The MMR software includes routines executable by the MMR processor for accessing MMR documents with additional digital content, creating or modifying MMR documents, and using a document to perform other operations such business transactions, data queries, reporting, etc.

The present invention provides a system, method, and computer program product for modifying tie strength between members of an existing network using captured digital images of documents. Captured digital images of document portions are received and associated documents are recognized for the captured digital image. Other members associated with the documents are determined, and ties between the network members are modified.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

FIG. 3A is a functional block diagram showing indexes in according with one embodiment of the present invention.

FIG. 17 shows an example of an annotation in the form of an audio clip added to a document at a designated location in accordance with one embodiment of the present invention.

FIG. 18 shows an example of a flow process for annotating an unindexed document for shared use in accordance with one embodiment of the present invention.

FIG. 19 shows an example of a flow process 1900 for collaborative discussion of shared documents in accordance with one embodiment of the present invention.

DETAILED DESCRIPTION OF PREFERRED EMBODIMENTS

A Mixed Media Reality (MMR) system and associated methods are described. The MMR system provides mechanisms for forming a mixed media document that includes media of at least two types, such as printed paper as a first medium and a digital photograph, digital movie, digital audio file, digital text file, or web link as a second medium. The MMR system and/or techniques can be further used to facilitate various business models that take advantage of the combination of a portable electronic device (e.g., a PDA or cellular camera phone) and a paper document to provide mixed media documents.

In one particular embodiment, the MMR system includes a content-based retrieval database that represents two-dimensional geometric relationships between objects extracted from a printed document in a way that allows look-up using a text-based index. Evidence accumulation techniques combine the frequency of occurrence of a feature with the likelihood of its location in a two-dimensional zone. Document recognition features, or simply "features," may be context-based (e.g., text-based or image-based), or format-based (e.g., paper reflectance and type font). In one such embodiment, an MMR database system includes an index table that receives a description computed by an MMR feature extraction algorithm. The index table identifies the documents, pages, and x-y locations within those pages where each feature occurs. An evidence accumulation algorithm computes a ranked set of document, page and location hypotheses given the data from the index table. A relational database (or other suitable storage facility) can be used to store additional characteristics about each document, page, and location, as desired.

The MMR database system may include other components as well, such as an MMR processor, a capture device, a communication mechanism and a memory including MMR software. The MMR processor may also be coupled to a storage or source of media types, an input device and an output device. In one such configuration, the MMR software includes routines executable by the MMR processor for accessing MMR documents with additional digital content, creating or modifying MMR documents, and using a document to perform other operations such business transactions, data queries, reporting, etc.

MMR System Overview

Figure 1A:
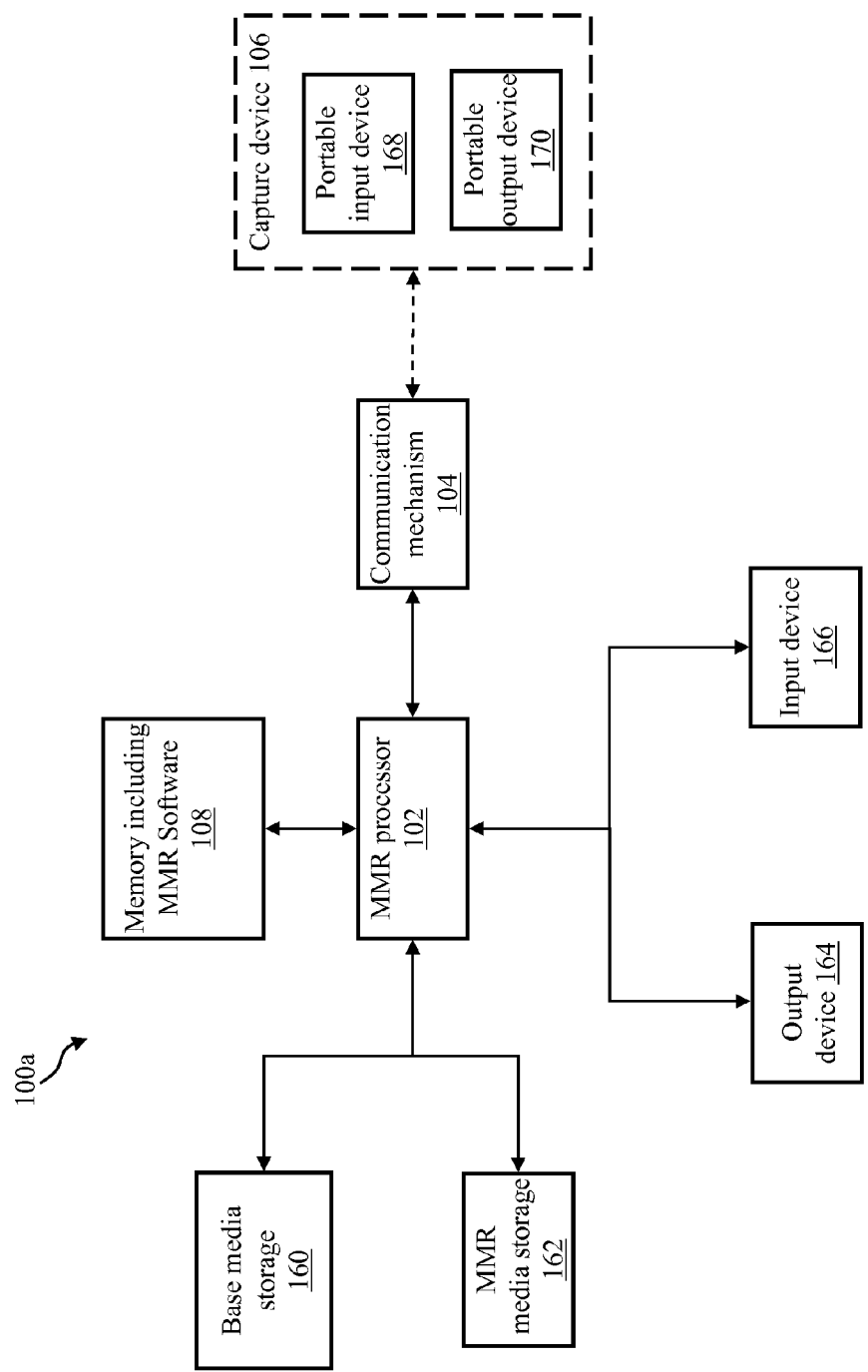
FIG. 1A illustrates a functional block diagram of a Mixed Media Reality (MMR) system configured in accordance with an embodiment of the present invention.

Referring now to FIG. 1A, a Mixed Media Reality (MMR) system 100a in accordance with an embodiment of the present invention is shown. The MMR system 100a comprises a MMR processor 102; a communication mechanism 104; a capture device 106 having a portable input device 168 and a portable output device 170; a memory including MMR software 108; a base media storage 160; an MMR media storage 162; an output device 164; and an input device 166. The MMR system 100a creates a mixed media environment by providing a way to use information from an existing printed document (a first media type) as an index to a second media type(s) such as audio, video, text, updated information and services.

The capture device 106 is able to generate a representation of a printed document (e.g., an image, drawing, or other such representation), and the representation is sent to the MMR processor 102. The MMR system 100a then matches the representation to an MMR document and other second media types. The match may identify an identical or similar MMR document and second media types. The MMR system 100a is also responsible for taking an action in response to input and recognition of a representation. The actions taken by the MMR system 100a can be any type including, for example, retrieving information, placing an order, retrieving a video or sound, storing information, creating a new document, printing a document, displaying a document or image, etc. By use of content-based retrieval database technology described herein, the MMR system 100a provides mechanisms that render printed text into a dynamic medium that provides an entry point to electronic content or services of interest or value to the user.

The MMR processor 102 processes data signals and may comprise various computing architectures including a complex instruction set computer (CISC) architecture, a reduced instruction set computer (RISC) architecture, or an architecture implementing a combination of instruction sets. In one particular embodiment, the MMR processor 102 comprises an arithmetic logic unit, a microprocessor, a general purpose computer, or some other information appliance equipped to perform the operations of the present invention. In another embodiment, MMR processor 102 comprises a general purpose computer having a graphical user interface, which may be generated by, for example, a program written in Java running on top of an operating system like WINDOWS or UNIX based operating systems. Although only a single processor is shown in FIG. 1A, multiple processors may be included. The processor is coupled to the MMR memory 108 and executes instructions stored therein.

The communication mechanism 104 is any device or system for coupling the capture device 106 to the MMR processor 102. For example, the communication mechanism 104 can be implemented using a network (e.g., WAN and/or LAN), a wired link (e.g., USB, RS232, or Ethernet), a wireless link (e.g., infrared, Bluetooth, or 802.11), a mobile device communication link (e.g., GPRS or GSM), a public switched telephone network (PSTN) link, or any combination of these. Numerous communication architectures and protocols can be used here.

The capture device 106 includes a means such as a transceiver to interface with the communication mechanism 104, and is any device that is capable of capturing an image or data digitally via an input device 168. The capture device 106 can optionally include an output device 170 and is optionally portable. For example, the capture device 106 is a standard cellular camera phone; a PDA device; a digital camera; a barcode reader; a radio frequency identification (RFID) reader; a computer peripheral, such as a standard webcam; or a built-in device, such as the video card of a PC. Several examples of capture devices 106a-d are described in more detail with reference to FIGS. 2A-2D, respectively. Additionally, capture device 106 may include a software application that enables content-based retrieval and that links capture device 106 to the infrastructure of MMR system 100a/100b. More functional details of capture device 106 are found in reference to FIG. 2E. Numerous conventional and customized capture devices 106, and their respective functionalities and architectures, will be apparent in light of this disclosure.

The memory 108 stores instructions and/or data that may be executed by MMR processor 102. The instructions and/or data may comprise code for performing any and/or all of techniques described herein. The memory 108 may be a dynamic random access memory (DRAM) device, a static random access memory (SRAM) device, or any other suitable memory device. The memory 108 is described in more detail below with reference to FIG. 4. In one particular embodiment, the memory 108 includes the MMR software suite, an operating system and other application programs (e.g., word processing applications, electronic mail applications, financial applications, and web browser applications).

The base media storage 160 is for storing second media types in their original form, and MMR media storage 162 is for storing MMR documents, databases and other information as detailed herein to create the MMR environment. While shown as being separate, in another embodiment, the base media storage 160 and the MMR media storage 162 may be portions of the same storage device or otherwise integrated. The data storage 160, 162 further stores data and instructions for MMR processor 102 and comprises one or more devices including, for example, a hard disk drive, a floppy disk drive, a CD-ROM device, a DVD-ROM device, a DVD-RAM device, a DVD-RW device, a flash memory device, or any other suitable mass storage device.

The output device 164 is operatively coupled the MMR processor 102 and represents any device equipped to output data such as those that display, sound, or otherwise present content. For instance, the output device 164 can be any one of a variety of types such as a printer, a display device, and/or speakers. Example display output devices 164 include a cathode ray tube (CRT), liquid crystal display (LCD), or any other similarly equipped display device, screen, or monitor. In one embodiment, the output device 164 is equipped with a touch screen in which a touch-sensitive, transparent panel covers the screen of the output device 164.

The input device 166 is operatively coupled the MMR processor 102 and is any one of a variety of types such as a keyboard and cursor controller, a scanner, a multifunction printer, a still or video camera, a keypad, a touch screen, a detector, an RFID tag reader, a switch, or any mechanism that allows a user to interact with MMR system 100a. In one embodiment the input device 166 is a keyboard and cursor controller. Cursor control may include, for example, a mouse, a trackball, a stylus, a pen, a touch screen and/or pad, cursor direction keys, or other mechanisms to cause movement of a cursor. In another embodiment, the input device 166 is a microphone, audio add-in/expansion card designed for use within a general purpose computer system, analog-to-digital converters, and digital signal processors to facilitate voice recognition and/or audio processing.

Figure 1B:
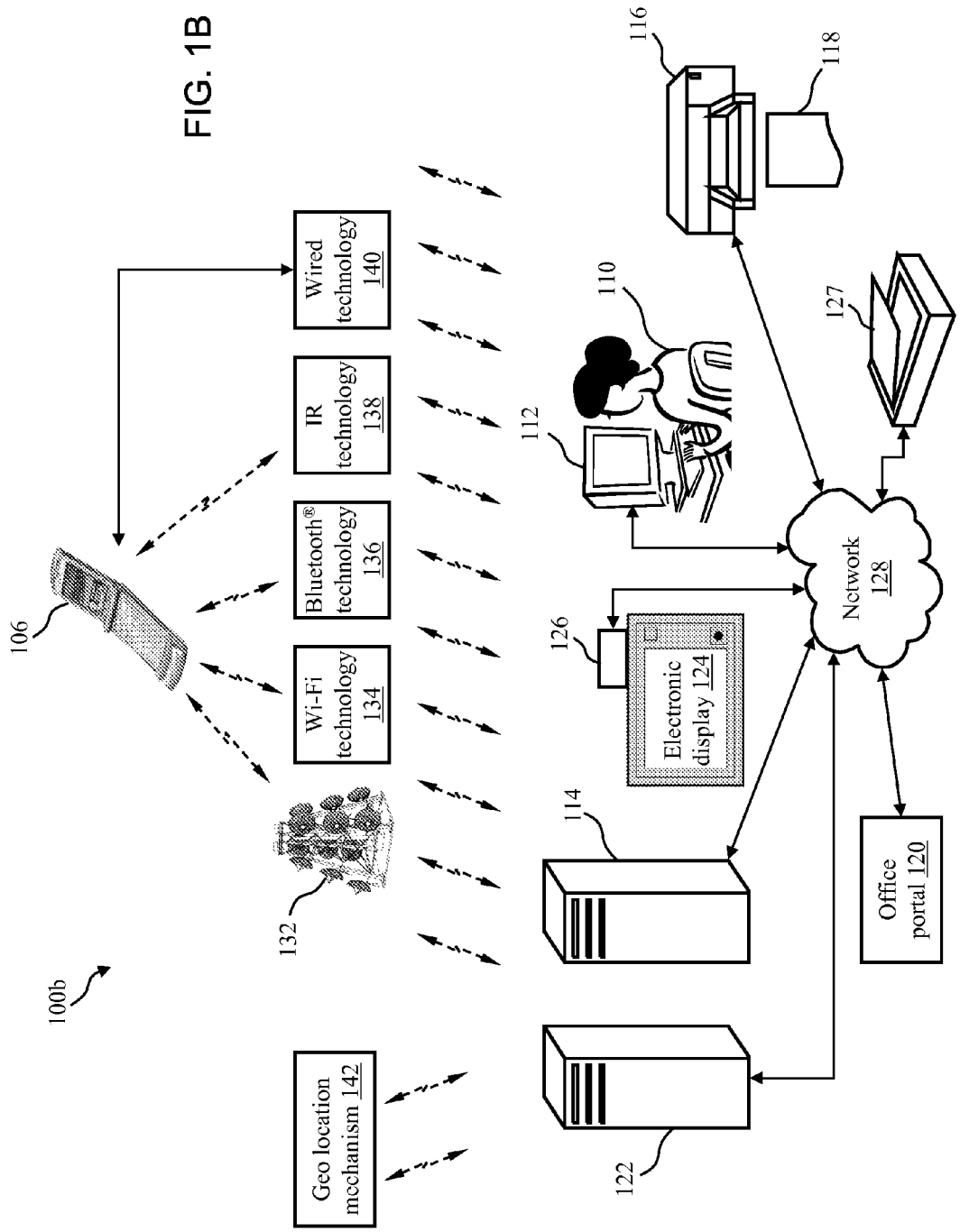
FIG. 1B illustrates a functional block diagram of an MMR system configured in accordance with another embodiment of the present invention.

FIG. 1B illustrates a functional block diagram of an MMR system 100b configured in accordance with another embodiment of the present invention. In this embodiment, the MMR system 100b includes an MMR computer 112 (operated by user 110), a networked media server 114, and a printer 116 that produces a printed document 118. The MMR system 100b further includes an office portal 120, a service provider server 122, an electronic display 124 that is electrically connected to a set-top box 126, and a document scanner 127. A communication link between the MMR computer 112, networked media server 114, printer 116, office portal 120, service provider server 122, set-top box 126, and document scanner 127 is provided via a network 128, which can be a LAN (e.g., office or home network), WAN (e.g., Internet or corporate network), LAN/WAN combination, or any other data path across which multiple computing devices may communicate.

The MMR system 100b further includes a capture device 106 that is capable of communicating wirelessly to one or more computers 112, networked media server 114, user printer 116, office portal 120, service provider server 122, electronic display 124, set-top box 126, and document scanner 127 via a cellular infrastructure 132, wireless fidelity (Wi-Fi) technology 134, Bluetooth technology 136, and/or infrared (IR) technology 138. Alternatively, or in addition to, capture device 106 is capable of communicating in a wired fashion to MMR computer 112, networked media server 114, user printer 116, office portal 120, service provider server 122, electronic display 124, set-top box 126, and document scanner 127 via wired technology 140. Although Wi-Fi technology 134, Bluetooth technology 136, IR technology 138, and wired technology 140 are shown as separate elements in FIG. 1B, such technology can be integrated into the processing environments (e.g., MMR computer 112, networked media server 114, capture device 106, etc) as well. Additionally, MMR system 100b further includes a geo location mechanism 142 that is in wireless or wired communication with the service provider server 122 or network 128. This could also be integrated into the capture device 106.

The MMR user 110 is any individual who is using MMR system 100b. MMR computer 112 is any desktop, laptop, networked computer, or other such processing environment. User printer 116 is any home, office, or commercial printer that can produce printed document 118, which is a paper document that is formed of one or more printed pages.

Networked media server 114 is a networked computer that holds information and/or applications to be accessed by users of MMR system 100b via network 128. In one particular embodiment, networked media server 114 is a centralized computer, upon which is stored a variety of media files, such as text source files, web pages, audio and/or video files, image files (e.g., still photos), and the like. Networked media server 114 is, for example, the Comcast Video-on-Demand servers of Comcast Corporation, the Ricoh Document Mall of Ricoh Innovations Inc., or the Google Image and/or Video servers of Google Inc. Generally stated, networked media server 114 provides access to any data that may be attached to, integrated with, or otherwise associated with printed document 118 via capture device 106.

Office portal 120 is an optional mechanism for capturing events that occur in the environment of MMR user 110, such as events that occur in the office of MMR user 110. Office portal 120 is, for example, a computer that is separate from MMR computer 112. In this case, office portal 120 is connected directly to MMR computer 112 or connected to MMR computer 112 via network 128. Alternatively, office portal 120 is built into MMR computer 112. For example, office portal 120 is constructed from a conventional personal computer (PC) and then augmented with the appropriate hardware that supports any associated capture devices 106. Office portal 120 may include capture devices, such as a video camera and an audio recorder. Additionally, office portal 120 may capture and store data from MMR computer 112. For example, office portal 120 is able to receive and monitor functions and events that occur on MMR computer 112. As a result, office portal 120 is able to record all audio and video in the physical environment of MMR user 110 and record all events that occur on MMR computer 112. In one particular embodiment, office portal 120 captures events, e.g., a video screen capture while a document is being edited, from MMR computer 112. In doing so, office portal 120 captures which websites that were browsed and other documents that were consulted while a given document was created. That information may be made available later to MMR user 110 through his/her MMR computer 112 or capture device 106. Additionally, office portal 120 may be used as the multimedia server for clips that users add to their documents. Furthermore, office portal 120 may capture other office events, such as conversations (e.g., telephone or in-office) that occur while paper documents are on a desktop, discussions on the phone, and small meetings in the office. A video camera (not shown) on office portal 120 may identify paper documents on the physical desktop of MMR user 110, by use of the same content-based retrieval technologies developed for capture device 106.

Service provider server 122 is any commercial server that holds information or applications that can be accessed by MMR user 110 of MMR system 100b via network 128. In particular, service provider server 122 is representative of any service provider that is associated with MMR system 100b. Service provider server 122 is, for example, but is not limited to, a commercial server of a cable TV provider, such as Comcast Corporation; a cell phone service provider, such as Verizon Wireless; an Internet service provider, such as Adelphia Communications; an online music service provider, such as Sony Corporation; and the like.

Electronic display 124 is any display device, such as, but not limited to, a standard analog or digital television (TV), a flat screen TV, a flat panel display, or a projection system. Set-top box 126 is a receiver device that processes an incoming signal from a satellite dish, aerial, cable, network, or telephone line, as is known. An example manufacturer of set-top boxes is Advanced Digital Broadcast. Set-top box 126 is electrically connected to the video input of electronic display 124.

Document scanner 127 is a commercially available document scanner device, such as the KV-S2026C full-color scanner, by Panasonic Corporation. Document scanner 127 is used in the conversion of existing printed documents into MMR-ready documents.

Cellular infrastructure 132 is representative of a plurality of cell towers and other cellular network interconnections. In particular, by use of cellular infrastructure 132, two-way voice and data communications are provided to handheld, portable, and car-mounted phones via wireless modems incorporated into devices, such as into capture device 106.

Wi-Fi technology 134, Bluetooth technology 136, and IR technology 138 are representative of technologies that facilitate wireless communication between electronic devices. Wi-Fi technology 134 is technology that is associated with wireless local area network (WLAN) products that are based on 802.11 standards, as is known. Bluetooth technology 136 is a telecommunications industry specification that describes how cellular phones, computers, and PDAs are interconnected by use of a short-range wireless connection, as is known. IR technology 138 allows electronic devices to communicate via short-range wireless signals. For example, IR technology 138 is a line-of-sight wireless communications medium used by television remote controls, laptop computers, PDAs, and other devices. IR technology 138 operates in the spectrum from mid-microwave to below visible light. Further, in one or more other embodiments, wireless communication may be supported using IEEE 802.15 (UWB) and/or 802.16 (WiMAX) standards.

Wired technology 140 is any wired communications mechanism, such as a standard Ethernet connection or universal serial bus (USB) connection. By use of cellular infrastructure 132, Wi-Fi technology 134, Bluetooth technology 136, IR technology 138, and/or wired technology 140, capture device 106 is able to communicate bi-directionally with any or all electronic devices of MMR system 100b.

Geo-location mechanism 142 is any mechanism suitable for determining geographic location. Geo-location mechanism 142 is, for example, GPS satellites which provide position data to terrestrial GPS receiver devices, as is known. In the example, embodiment shown in FIG. 1B, position data is provided by GPS satellites to users of MMR system 100b via service provider server 122 that is connected to network 128 in combination with a GPS receiver (not shown). Alternatively, geo-location mechanism 142 is a set of cell towers (e.g., a subset of cellular infrastructure 132) that provide a triangulation mechanism, cell tower identification (ID) mechanism, and/or enhanced 911 service as a means to determine geographic location. Alternatively, geo-location mechanism 142 is provided by signal strength measurements from known locations of WiFi access points or BlueTooth devices.

In operation, capture device 106 serves as a client that is in the possession of MMR user 110. Software applications exist thereon that enable a content-based retrieval operation and links capture device 106 to the infrastructure of MMR system 100b via cellular infrastructure 132, Wi-Fi technology 134, Bluetooth technology 136, IR technology 138, and/or wired technology 140. Additionally, software applications exist on MMR computer 112 that perform several operations, such as but not limited to, a print capture operation, an event capture operation (e.g., save the edit history of a document), a server operation (e.g., data and events saved on MMR computer 112 for later serving to others), or a printer management operation (e.g., printer 116 may be set up to queue the data needed for MMR such as document layout and multimedia clips). Networked media server 114 provides access to the data attached to a printed document, such as printed document 118 that is printed via MMR computer 112, belonging to MMR user 110. In doing so, a second medium, such as video or audio, is associated with a first medium, such as a paper document. More details of the software applications and/or mechanisms for forming the association of a second medium to a first medium are described in reference to FIGS. 2E, 3, 4, and 5 below.

Capture Device

Figure 2B:
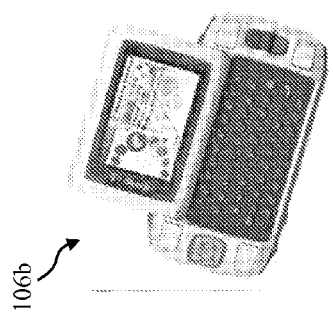
FIGS. 2A, 2B, 2C, and 2D illustrate capture devices in accordance with embodiments of the present invention.
Figure 2D:
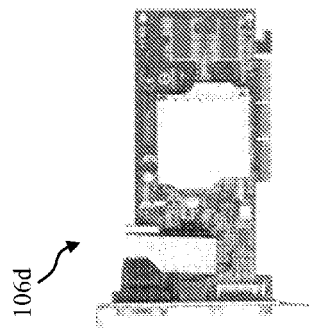
Figure 2A:
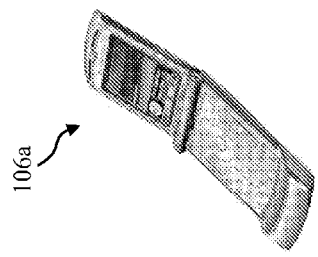
Figure 2C:
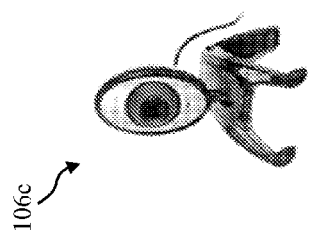

FIGS. 2A, 2B, 2C, and 2D illustrate example capture devices 106 in accordance with embodiments of the present invention. More specifically, FIG. 2A shows a capture device 106a that is a cellular camera phone. FIG. 2B shows a capture device 106b that is a PDA device. FIG. 2C shows a capture device 106c that is a computer peripheral device. One example of a computer peripheral device is any standard webcam. FIG. 2D shows a capture device 106d that is built into a computing device (e.g., such as MMR computer 112). For example, capture device 106d is a computer graphics card. Example details of capture device 106 are found in reference to FIG. 2E.

In the case of capture devices 106a and 106b, the capture device 106 may be in the possession of MMR user 110, and the physical location thereof may be tracked by geo location mechanism 142 or by the ID numbers of each cell tower within cellular infrastructure 132.

Figure 2E:
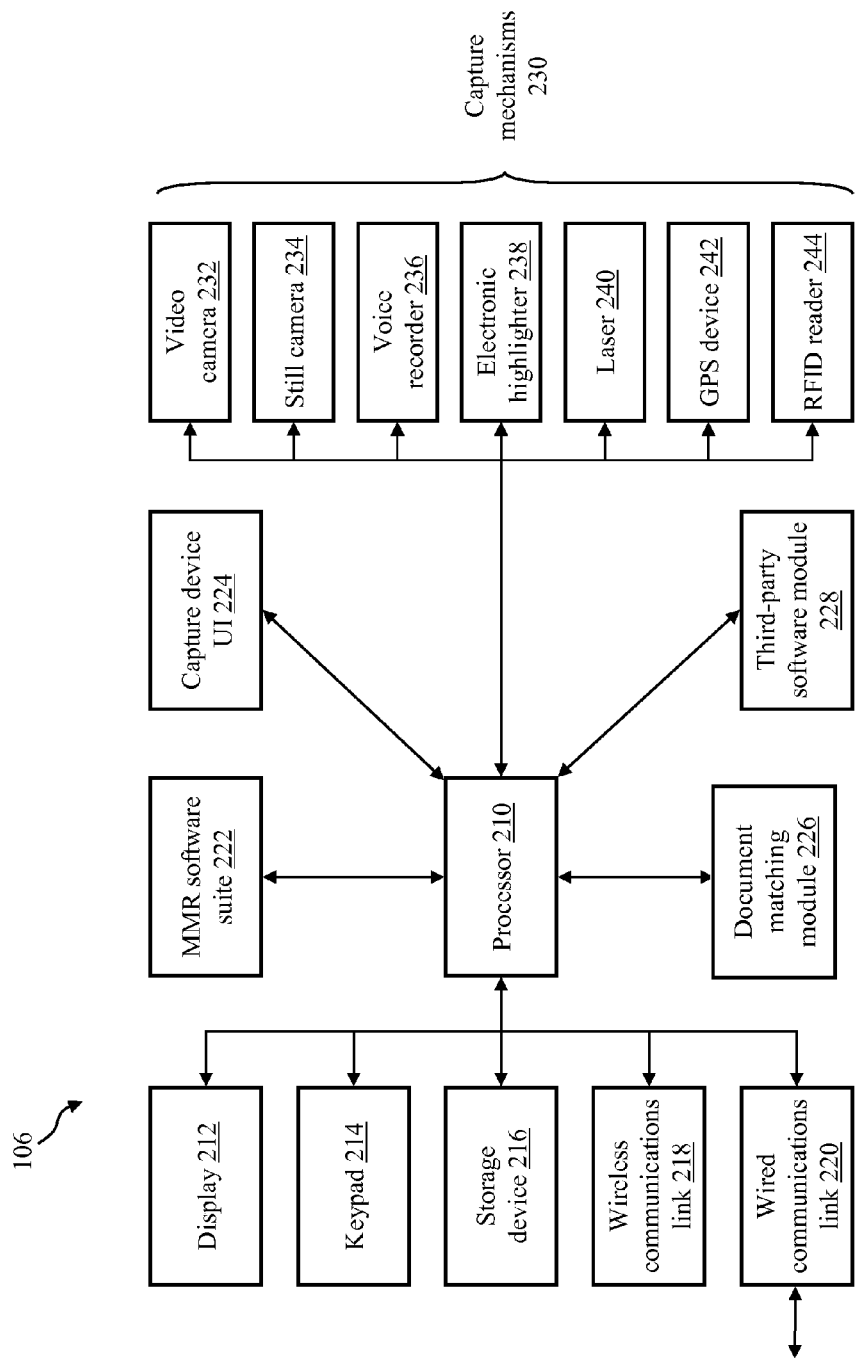
FIG. 2E illustrates a functional block diagram of a capture device configured in accordance with an embodiment of the present invention.

Referring now to FIG. 2E, a functional block diagram for one embodiment of the capture device 106 in accordance with the present invention is shown. The capture device 106 includes a processor 210, a display 212, a keypad 214, a storage device 216, a wireless communications link 218, a wired communications link 220, an MMR software suite 222, a capture device user interface (UI) 224, a document matching module 226, a third-party software module 228, and at least one of a variety of capture mechanisms 230. Example capture mechanisms 230 include, but are not limited to, a video camera 232, a still camera 234, a voice recorder 236, an electronic highlighter 238, a laser 240, a GPS device 242, and an RFID reader 244.

Processor 210 is a central processing unit (CPU), such as, but not limited to, the Pentium microprocessor, manufactured by Intel Corporation. Display 212 is any standard video display mechanism, such those used in handheld electronic devices. More particularly, display 212 is, for example, any digital display, such as a liquid crystal display (LCD) or an organic light-emitting diode (OLED) display. Keypad 214 is any standard alphanumeric entry mechanism, such as a keypad that is used in standard computing devices and handheld electronic devices, such as cellular phones. Storage device 216 is any volatile or non-volatile memory device, such as a hard disk drive or a random access memory (RAM) device, as is well known.

Wireless communications link 218 is a wireless data communications mechanism that provides direct point-to-point communication or wireless communication via access points (not shown) and a LAN (e.g., IEEE 802.11 Wi-Fi or Bluetooth technology) as is well known. Wired communications link 220 is a wired data communications mechanism that provides direct communication, for example, via standard Ethernet and/or USB connections.

MMR software suite 222 is the overall management software that performs the MMR operations, such as merging one type of media with a second type. More details of MMR software suite 222 are found with reference to FIG. 4.

Capture device User Interface (UI) 224 is the user interface for operating capture device 106. By use of capture device UI 224, various menus are presented to MMR user 110 for the selection of functions thereon. More specifically, the menus of capture device UI 224 allow MMR user 110 to manage tasks, such as, but not limited to, interacting with paper documents, reading data from existing documents, writing data into existing documents, viewing and interacting with the augmented reality associated with those documents, and viewing and interacting with the augmented reality associated with documents displayed on his/her MMR computer 112.

The document matching module 226 is a software module for extracting features from an image captured via at least one capture mechanism 230 of capture device 106. The document matching module 226 can also perform pattern matching between the captured image and a database of documents. At the most basic level, and in accordance with one embodiment, the document matching module 226 determines the position of an image patch within a larger page image wherein that page image is selected from a large collection of documents. The document matching module 226 includes routines or programs to receive captured data, to extract a representation of the image from the captured data, to perform patch recognition and motion analysis within documents, to perform decision combinations, and to output a list of x-y locations within pages where the input images are located. For example, the document matching module 226 may be an algorithm that combines horizontal and vertical content-based features that are extracted from an image of a fragment of text, in order to identify the document and the section within the document from which it was extracted. Alternatively, the features may be format-based features, such as feature vectors of the physical document such as type font, type point, and paper reflectance. Once the features are extracted, a printed document index (not shown), which resides, for example, on MMR computer 112 or networked media server 114, is queried, in order to identify the symbolic document. Under the control of capture device UI 224, document matching module 226 has access to the printed document index. The printed document index is described in more detail with reference to MMR computer 112 of FIG. 3. Note that in an alternate embodiment, the document matching module 226 could be part of the MMR computer 112 and not located within the capture device 106. In such an embodiment, the capture device 106 sends raw captured data to the MMR computer 112 for image extraction, pattern matching, and document and position recognition. In yet another embodiment, the document matching module 226 only performs feature extraction, and the extracted features are sent to the MMR computer 112 for pattern matching and recognition.

Third-party software module 228 is representative of any third-party software module for enhancing any operation that may occur on capture device 106. Example third-party software includes security software, image sensing software, image processing software, MMR database software, social networking software, third-party publisher software, etc.

As noted above, the capture device 106 may include any number of capture mechanisms 230, examples of which will now be described.

Video camera 232 is a digital video recording device, such as is found in standard digital cameras or some cell phones.

Still camera 234 is any standard digital camera device that is capable of capturing digital images.

Voice recorder 236 is any standard audio recording device (microphone and associated hardware) that is capable of capturing audio signals and outputting it in digital form.

Electronic highlighter 238 is an electronic highlighter that provides the ability to scan, store and transfer printed text, barcodes, and small images to a PC, laptop computer, or PDA device. Electronic highlighter 238 is, for example, the Quicklink Pen Handheld Scanner, by Wizcom Technologies, which allows information to be stored on the pen or transferred directly to a computer application via a serial port, infrared communications, or USB adapter.

Laser 240 is a light source that produces, through stimulated emission, coherent, near-monochromatic light, as is well known. Laser 240 is, for example, a standard laser diode, which is a semiconductor device that emits coherent light when forward biased. Associated with and included in the laser 240 is a detector that measures the amount of light reflected by the image at which the laser 240 is directed.

GPS device 242 is any portable GPS receiver device that supplies position data, e.g., digital latitude and longitude data. Examples of portable GPS devices 242 are the NV-U70 Portable Satellite Navigation System, from Sony Corporation, and the Magellan brand RoadMate Series GPS devices, Meridian Series GPS devices, and eXplorist Series GPS devices, from Thales North America, Inc. GPS device 242 provides a way of determining the location of capture device 106, in real time, in part, by means of triangulation, to a plurality of geo location mechanisms 142, as is well known.

RFID reader 244 is a commercially available RFID tag reader system, such as the TI RFID system, manufactured by Texas Instruments. An RFID tag is a wireless device for identifying unique items by use of radio waves. An RFID tag is formed of a microchip that is attached to an antenna and upon which is stored a unique digital identification number, as is well known.

In one particular embodiment, capture device 106 includes processor 210, display 212, keypad 214, storage device 216, wireless communications link 218, wired communications link 220, MMR software suite 222, capture device UI 224, document matching module 226, third-party software module 228, and at least one of the capture mechanisms 230. In doing so, capture device 106 is a full-function device. Alternatively, capture device 106 may have lesser functionality and, thus, may include a limited set of functional components. For example, MMR software suite 222 and document matching module 226 may reside remotely at, for example, MMR computer 112 or networked media server 114 of MMR system 100*b* and are accessed by capture device 106 via wireless communications link 218 or wired communications link 220.

MMR Computer

Figure 3:
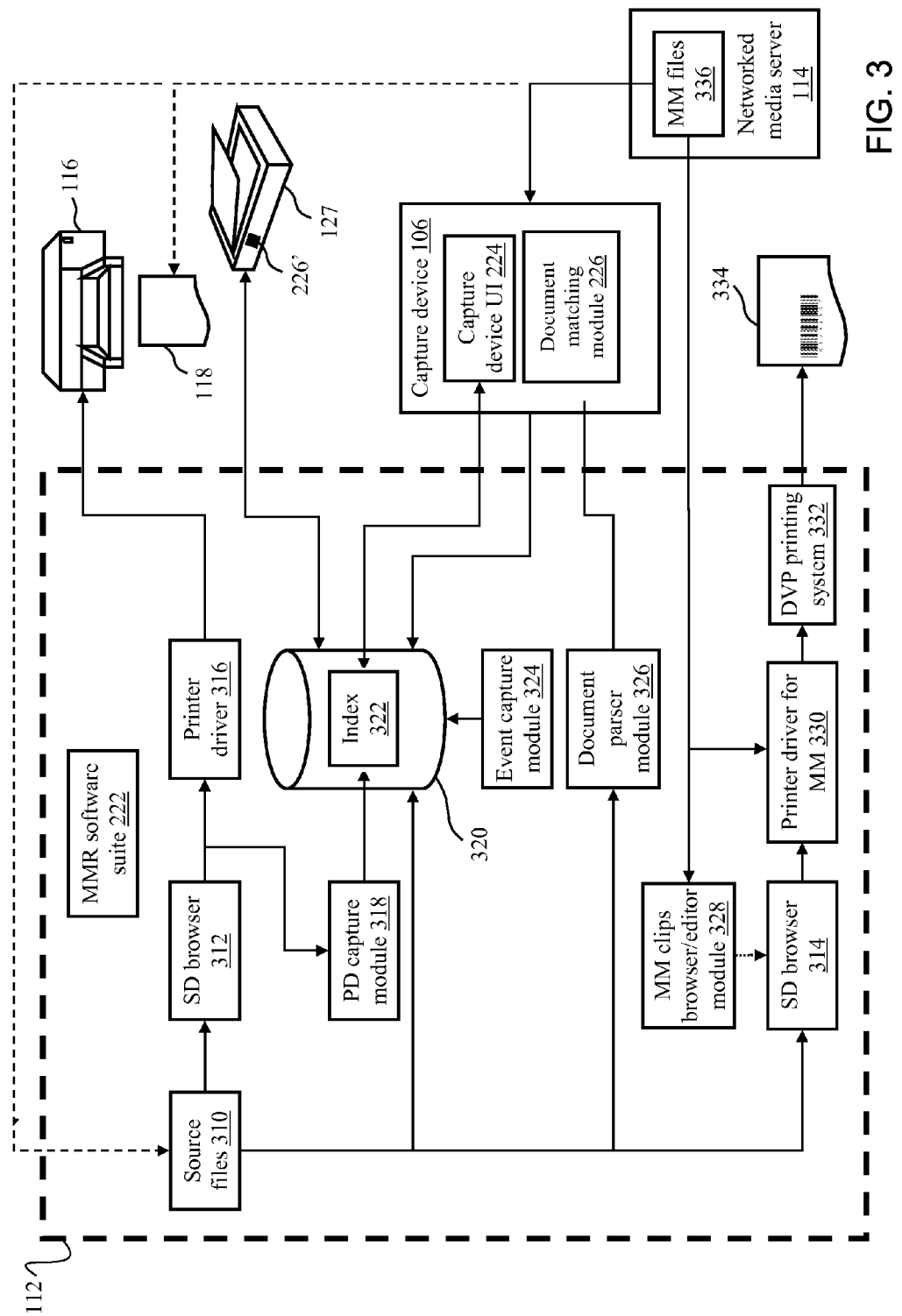
FIG. 3 illustrates a functional block diagram of a MMR computer configured in accordance with an embodiment of the present invention.

Referring now to FIG. 3, the MMR computer 112 configured in accordance with an embodiment of the present invention is shown. As can be seen, MMR computer 112 is connected to networked media server 114 that includes one or more multimedia (MM) files 336, the user printer 116 that produces printed document 118, the document scanner 127, and the capture device 106 that includes capture device UI 224 and a first instance of document matching module 226. The communications link between these components may be a direct link or via a network. Additionally, document scanner 127 includes a second instance of document matching module 226'.

The MMR computer 112 of this example embodiment includes one or more source files 310, a first source document (SD) browser 312, a second SD browser 314, a printer driver 316, a printed document (PD) capture module 318, a document database 320 storing an index 322, an event capture module 324, a document parser module 326, a multimedia (MM) clips browser/editor module 328, a printer driver for MM 330, a document-to-video paper (DVP) printing system 332, and video paper document 334.

Source files 310 are representative of any source files that are an electronic representation of a document (or a portion thereof). Example source files 310 include hypertext markup language (HTML) files, Microsoft Word files, Microsoft PowerPoint files, simple text files, portable document format (PDF) files, and the like, that are stored on the hard drive (or other suitable storage) of MMR computer 112.

The first SD browser 312 and the second SD browser 314 are either stand-alone PC applications or plug-ins for existing PC applications that provide access to the data that has been associated with source files 310. The first and second SD browser 312, 314 may be used to retrieve an original HTML file or MM clips for display on MMR computer 112.

Printer driver 316 is printer driver software that controls the communication link between applications and the page-description language or printer control language that is used by any particular printer, as is well known. In particular, whenever a document, such as printed document 118, is printed, printer driver 316 feeds data that has the correct control commands to printer 116, such as those provided by Ricoh Corporation for their printing devices. In one embodiment, the printer driver 316 is different from conventional print drivers in that it captures automatically a representation of the x-y coordinates, font, and point size of every character on every printed page. In other words, it captures information about the content of every document printed and feeds back that data to the PD capture module 318.

The PD capture module 318 is a software application that captures the printed representation of documents, so that the layout of characters and graphics on the printed pages can be retrieved. Additionally, by use of PD capture module 318, the printed representation of a document is captured automatically, in real-time, at the time of printing. More specifically, the PD capture module 318 is the software routine that captures the two-dimensional arrangement of text on the printed page and transmits this information to PD index 322. In one embodiment, the PD capture module 318 operates by trapping the Windows text layout commands of every character on the printed page. The text layout commands indicate to the operating system (OS) the x-y location of every character on the printed page, as well as font, point size, and so on. In essence, PD capture module 318 eavesdrops on the print data that is transmitted to printer 116. In the example shown, the PD capture module 318 is coupled to the output of the first SD browser 312 for capture of data. Alternatively, the functions of PD capture module 318 may be implemented directly within printer driver 316. Various configurations will be apparent in light of this disclosure.

Document database 320 is any standard database modified to store relationships between printed documents and events, in accordance with an embodiment of the present invention. For example, document database 320 stores bi-directional links from source files 310 (e.g., Word, HTML, PDF files) to events that are associated with printed document 118. Example events include the capture of multimedia clips on capture device 106 immediately after a Word document is printed, the addition of multimedia to a document with the client application of capture device 106, or annotations for multimedia clips. Additionally, other events that are associated with source files 310, which may be stored in document database 320, include logging when a given source file 310 is opened, closed, or removed; logging when a given source file 310 is in an active application on the desktop of MMR computer 112, logging times and destinations of document "copy" and "move" operations; and logging the edit history of a given source file 310. Such events are captured by event capture module 324 and stored in document database 320. The document database 320 is coupled to receive the source files 310, the outputs of the event capture module 324, PD capture module 318 and scanner 127, and is also coupled to capture devices 106 to receive queries and data, and provide output.

The document database 320 also stores one or more indexes and/or modules 322 ("index 322" herein). Some examples of such indexes are shown in FIG. 3A. In one embodiment, the document database 320 includes a PD index 322*a*, which is a software application that maps features that are extracted from images of printed documents onto their symbolic forms (e.g., scanned image to Word). In one embodiment, the PD capture module 318 provides to the PD index 322a the x-y location of every character on the printed page, as well as font, point size, and so on. The PD index 322a is constructed at the time that a given document is printed. However, all print data is captured and saved in the PD index 322a in a manner that can be interrogated at a later time. Thus, PD index 322a is organized to support a feature-based or text-based query. The contents of PD index 322a, which are electronic representations of printed documents, are generated by use of PD capture module 318 during a print operation and/or by use of document matching module 226' of document scanner 127 during a scan operation.

The document database 320 includes a document index table 322b according to one embodiment. The document index table 322b includes relevant information about each document. In one particular embodiment, this information includes the document-related fields in the XML file, including print resolution, print date, paper size, shadow file name, page image location, etc.

According to one embodiment, the document database 320 includes an MMR index table module 322c, MMR index table 322d, evidence accumulation module 322e, and relational database 322f. The index table module 322c interrogates an index table 322d that identifies the documents, pages, and x-y locations within those pages where each feature occurs. The evidence accumulation module 322e is programmed or otherwise configured to compute a ranked set of document, page and location hypotheses given the data from the index table module 322c. The relational database 322f can be used to store additional characteristics about each image patch. The MMR index table 322d may further include an inverted term index table and a document index table. Each unique term or feature points to a location in the term index table that holds a functional value of the feature (e.g., key x) that points to a list of records (e.g., Rec#1, Rec#2, etc), and each record identifies a candidate region on a page within a document. Thus, the index table 322d organization transforms the features detected in an image patch into textual terms that represent both the features themselves and the geometric relationship between them. This allows utilization of conventional text indexing and search methods. Thus, the index table module 322c operates to effectively provide an image index that enables content-based retrieval of objects (e.g., document pages) and x-y locations within those objects where a given image query occurs. The combination of such an image index and relational database 322f allows for the location of objects that match an image patch and characteristics of the patch (e.g., such as the "actions" attached to the patch, or bar codes that can be scanned to cause retrieval of other content related to the patch).

Referring again to FIG. 3, the event capture module 324 is a software application that captures on MMR computer 112 events that are associated with a given printed document 118 and/or source file 310. These events are captured during the lifecycle of a given source file 310 and saved in document database 320. In a specific example, by use of event capture module 324, events are captured that relate to an HTML file that is active in a browser, such as the first SD browser 312, of MMR computer 112. These events might include the time that the HTML file was displayed on MMR computer 112 or the file name of other documents that are open at the same time that the HTML file was displayed or printed. This event information is useful, for example, if MMR user 110 wants to know (at a later time) what documents he/she was viewing or working on at the time that the HTML file was displayed or printed. Example events that are captured by the event capture module 324 include a document edit history; video from office meetings that occurred near the time when a given source file 310 was on the desktop (e.g., as captured by office portal 120); and telephone calls that occurred when a given source file 310 was open (e.g., as captured by office portal 120).

Example functions of event capture module 324 include: 1) tracking—tracking active files and applications; 2) key stroke capturing—key stroke capture and association with the active application; 3) frame buffer capturing and indexing—each frame buffer image is indexed with the optical character recognition (OCR) result of the frame buffer data, so that a section of a printed document can be matched to the time it was displayed on the screen. Alternatively, text can be captured with a graphical display interface (GDI) shadow dll that traps text drawing commands for the PC desktop that are issued by the PC operating system. MMR user 110 may point the capture device 106 at a document and determine when it was active on the desktop of the MMR computer 112); and 4) reading history capture—data of the frame buffer capturing and indexing operation is linked with an analysis of the times at which the documents were active on the desktop of his/her MMR computer 112, in order to track how long, and which parts of a particular document, were visible to MMR user 110. In doing so, correlation may occur with other events, such as keystrokes or mouse movements, in order to infer whether MMR user 110 was reading the document.

The combination of document database 320, indexes 322, and event capture module 324 is implemented locally on MMR computer 112 or, alternatively, is implemented as a shared database. If implemented locally, less security is required, as compared with implementing in a shared fashion.

The document parser module 326 is a software application that parses source files 310 that are related to respective printed documents 118, to locate useful objects therein, such as uniform resource locators (URLs), addresses, titles, authors, times, or phrases that represent locations, e.g., Hallidie Building. In doing so, the location of those objects in the printed versions of source files 310 is determined. The output of the document parser module 326 can then be used by the receiving device to augment the presentation of the document 118 with additional information, and improve the accuracy of pattern matching. Furthermore, the receiving device could also take an action using the locations, such as in the case of a URL, retrieving the web pages associated with the URL. The document parser module 326 is coupled to receive source files 310 and provides its output to the document matching module 226. Although only shown as being coupled to the document matching module 226 of the capture device, the output of document parser module 326 could be coupled to all or any number of document matching modules 226 wherever they are located. Furthermore, the output of the document parser module 326 could also be stored in the document database 320 for later use.

The MM clips browser/editor module 328 is a software application that provides an authoring function. The MM clips browser/editor module 328 is a standalone software application or, alternatively, a plug-in running on a document browser (represented by dashed line to second SD browser 314). The MM clips browser/editor module 328 displays multimedia files to the user and is coupled to the networked media server to receive multimedia files 336. Additionally, when MMR user 110 is authoring a document (e.g., attaching multimedia clips to a paper document), the MM clips browser/editor module 328 is a support tool for this function. The MM clips browser/editor module 328 is the application that shows the metadata, such as the information parsed from documents that are printed near the time when the multimedia was captured.

The printer driver for MM 330 provides the ability to author MMR documents. For example, MMR user 110 may highlight text in a UI generated by the printer driver for MM 330 and add actions to the text that include retrieving multimedia data or executing some other process on network 128 or on MMR computer 112. The combination of printer driver for MM 330 and DVP printing system 332 provides an alternative output format that uses barcodes. This format does not necessarily require a content-based retrieval technology. The printer driver for MM 330 is a printer driver for supporting the video paper technology, i.e., video paper 334. The printer driver for MM 330 creates a paper representation that includes barcodes as a way to access the multimedia. By contrast, printer driver 316 creates a paper representation that includes MMR technology as a way to access the multimedia. The authoring technology embodied in the combination of MM clips browser/editor 328 and SD browser 314 can create the same output format as SD browser 312 thus enabling the creation of MMR documents ready for content-based retrieval. The DVP printing system 332 performs the linking operation of any data in document database 320 that is associated with a document to its printed representation, either with explicit or implicit bar codes. Implicit bar codes refer to the pattern of text features used like a bar code.

Video paper 334 is a technology for presenting audio-visual information on a printable medium, such as paper. In video paper, bar codes are used as indices to electronic content stored or accessible in a computer. The user scans the bar code and a video clip or other multimedia content related to the text is output by the system. There exist systems for printing audio or video paper, and these systems in essence provide a paper-based interface for multimedia information.

MM files 336 of the networked media server 114 are representative of a collection of any of a variety of file types and file formats. For example, MM files 336 are text source files, web pages, audio files, video files, audio/video files, and image files (e.g., still photos).

As described in FIG. 1B, the document scanner 127 is used in the conversion of existing printed documents into MMR-ready documents. However, with continuing reference to FIG. 3, the document scanner 127 is used to MMR-enable existing documents by applying the feature extraction operation of the document matching module 226' to every page of a document that is scanned. Subsequently, index 322 is populated with the results of the scanning and feature extraction operation, and thus, an electronic representation of the scanned document is stored in the document database 320. The information in the index 322 can then be used to author MMR documents.

With continuing reference to FIG. 3, note that the software functions of MMR computer 112 are not limited to MMR computer 112 only. Alternatively, the software functions shown in FIG. 3 may be distributed in any user-defined configuration between MMR computer 112, networked media server 114, service provider server 122 and capture device 106 of MMR system 100*b*. For example, source files 310, SD browser 312, SD browser 314, printer driver 316, PD capture module 318, document database 320, index 322, event capture module 324, document parser module 326, MM clips browser/editor module 328, printer driver for MM 330, and DVP printing system 332, may reside fully within capture device 106, and thereby, provide enhanced functionality to capture device 106.

MMR Software Suite

Figure 4:
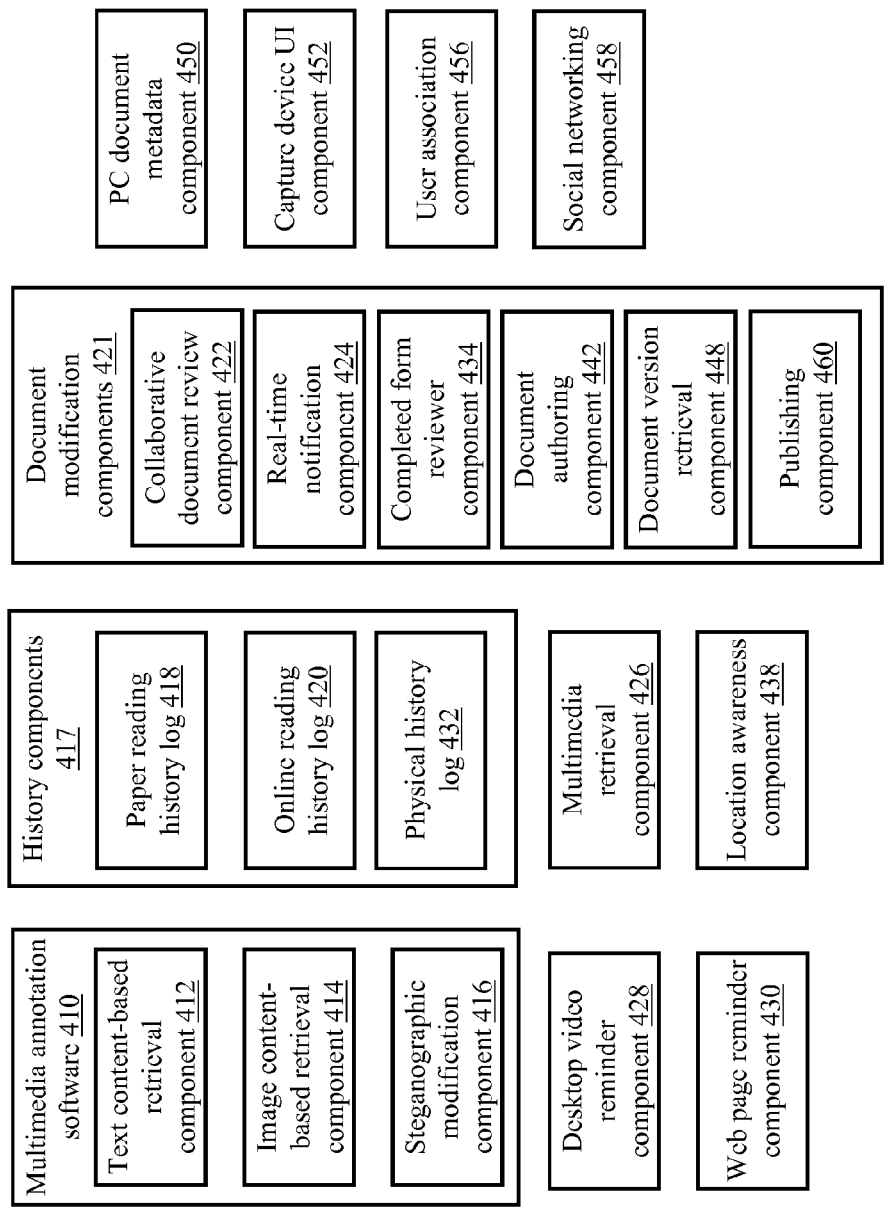
FIG. 4 illustrates a set of software components included in an MMR software suite configured in accordance with an embodiment of the present invention.

FIG. 4 illustrates a set of software components that are included in the MMR software suite 222 in accordance with one embodiment of the present invention. It should be understood that all or some of the MMR software suite 222 may be included in the MMR computer 112, the capture device 106, the networked media server 114 and other servers. In addition, other embodiments of MMR software suite 222 could have any number of the illustrated components from one to all of them. The MMR software suite 222 of this example includes: multimedia annotation software 410 that includes a text content-based retrieval component 412, an image content-based retrieval component 414, and a steganographic modification component 416; history components 417 that includes a paper reading history log 418, an online reading history log 420, and a physical history log 432; document modification components 421 that includes a collaborative document review component 422, a real-time notification component 424, a completed form reviewer component 434, a document authoring component 442, a document version retrieval component 448, and a publishing component 460; a desktop video reminder component 428; a web page reminder component 430; a multimedia retrieval component 426; a location awareness component 438; an unconscious upload component 446; a PC document metadata component 450; a capture device UI component 452; a user association component 456; and a networking component 458.

The multimedia annotation software 410 in combination with the organization of document database 320 form the basic technologies of MMR system 100*b*, in accordance with one particular embodiment. More specifically, multimedia annotation software 410 is for managing the multimedia annotation for paper documents. For example, MMR user 110 points capture device 106 at any section of a paper document and then uses at least one capture mechanism 230 of capture device 106 to add an annotation to that section. In a specific example, a lawyer dictates notes (create an audio file) about a section of a contract. The multimedia data (the audio file) is attached automatically to the original electronic version of the document. Subsequent printouts of the document optionally include indications of the existence of those annotations.

The text content-based retrieval component 412 is a software application that retrieves content-based information from text. For example, by use of text content-based retrieval component 412, content is retrieved from a patch of text, the original document and section within document is identified, or other information linked to that patch is identified. The text content-based retrieval component 412 may utilize OCR-based techniques. Alternatively, non-OCR-based techniques for performing the content-based retrieval from text operation include the two-dimensional arrangement of word lengths in a patch of text. One example of text content-based retrieval component 412 is an algorithm that combines horizontal and vertical features that are extracted from an image of a fragment of text, to identify the document and the section within the document from which it was extracted. The horizontal and vertical features can be used serially, in parallel, or otherwise simultaneously. Such a non-OCR-based feature set is used that provides a high-speed implementation and robustness in the presence of noise.

The image content-based retrieval component 414 is a software application that retrieves content-based information from images. The image content-based retrieval component 414 performs image comparison between captured data and images in the database 320 to generate a list of possible image matches and associated levels of confidence. Additionally, each image match may have associated data or actions that are performed in response to user input. In one example, the image content-based retrieval component 414 retrieves content based on, for example, raster images (e.g., maps) by converting the image to a vector representation that can be used to query an image database for images with the same arrangement of features. Alternative embodiments use the color content of an image or the geometric arrangement of objects within an image to look up matching images in a database.

Steganographic modification component 416 is a software application that performs steganographic modifications prior to printing. In order to better enable MMR applications, digital information is added to text and images before they are printed. In an alternate embodiment, the steganographic modification component 416 generates and stores an MMR document that includes: 1) original base content such as text, audio, or video information; 2) additional content in any form such as text, audio, video, applets, hypertext links, etc. Steganographic modifications can include the embedding of a watermark in color or grayscale images, the printing of a dot pattern on the background of a document, or the subtle modification of the outline of printed characters to encode digital information.

History components 417 log various aspects of the viewing history and physical proximity of paper and electronic documents. The history components 417 can be searched by MMR user 110 to locate various information contained in the logs. History components include a paper reading history log 418, an online reading history log 420, and a physical history log 432.

Paper reading history log 418 is the reading history log of paper documents. Paper reading history log 418 resides, for example, in document database 320. Paper reading history log 418 is based on a document identification-from-video technology developed by Ricoh Innovations, which is used to produce a history of the documents read by MMR user 110. Paper reading history log 418 is useful, for example, for reminding MMR user 110 of documents read and/or of any associated events.

Online reading history log 420 is the reading history log of online documents. Online reading history log 420 is based on an analysis of operating system events, and resides, for example, in document database 320. Online reading history log 420 is a record of the online documents that were read by MMR user 110 and of which parts of the documents were read. Entries in online reading history log 420 may be printed onto any subsequent printouts in many ways, such as by providing a note at the bottom of each page or by highlighting text with different colors that are based on the amount of time spent reading each passage. Additionally, multimedia annotation software 410 may index this data in index 322. Optionally, online reading history log 420 may be aided by a MMR computer 112 that is instrumented with devices, such as a face detection system that monitors MMR computer 112.

The physical history log 432 resides, for example, in document database 320. The physical history log 432 is the physical history log of paper documents. For example, MMR user 110 points his/her capture device 106 at a paper document, and by use of information stored in physical history log 432, other documents that were adjacent to the document of interest at some time in the past are determined. This operation is facilitated by, for example, an RFID-like tracking system. In this case, capture device 106 includes an RFID reader 244.

Document modification components 421 allow for various document modifications such as authoring, annotation, editing, translating, and version retrieval. The document modification components 421 include a collaborative review component 422, a real-time notification component 424, completed form reviewer component 434, document authoring component 442, document version retrieval component 448, and publishing component 460.

The collaborative document review component 422 is a software application that allows more than one reader of different versions of the same paper document to review comments, edits, or annotations applied by other readers by pointing his/her capture device 106 at any section of the document. For example, the comments, edits, or annotations may be displayed on capture device 106 as overlays on top of a document thumbnail. The collaborative document review component 422 may be implemented with or otherwise cooperate with any type of existing collaboration software.

The real-time notification component 424 is a software application that performs a real-time notification of a document being read. For example, while MMR user 110 reads a document, his/her reading trace is posted on a blog or on an online bulletin board. As a result, other people interested in the same topic may drop-in and chat about the document.

The completed form reviewer component 434 is a software application that retrieves previously acquired information used for completing a form. For example, MMR user 110 points his/her capture device 106 at a blank form (e.g., a medical claim form printed from a website) and is provided a history of previously entered information. Subsequently, the form is filled in automatically with this previously entered information by the completed form reviewer component 434.

The document authoring component 442 is a software application that performs an authoring operation for existing documents. The document authoring component 442 can be implemented, for example, either as a personal edition or as an enterprise edition. In a personal edition, MMR user 110 scans documents and adds them to an MMR document database (e.g., the document database 320). In an enterprise edition, a publisher (or a third party) creates MMR documents from the original electronic source (or electronic galley proofs). This functionality may be embedded in high-end publishing packages (e.g., Adobe Reader) and linked with a backend service provided by another entity. The document authoring component 442 is responsible for receiving modification and/or annotations to a document from an MMR user 110 and associating them with an image and/or a document, as well as making modified and/or annotated images and/or documents available to other users capturing similar images and documents.

The authoring may take place on a device such as MMR computer 112, or directly on capture device 106. The component 442 may be supplied as plug-ins for existing authoring applications, such as Microsoft Word, PowerPoint, and web page authoring packages. The document authoring component 442 allows MMR user 110 to prepare paper documents that have links to events from his/her MMR computer 112 or to events in his/her environment; allows paper documents that have links to be generated automatically, such as printed document 118 being linked automatically to the Word file from which it was generated; or allows MMR user 110 to retrieve a Word file and give it to someone else. Paper documents that have links are heretofore referred to as MMR documents. Using a version on a capture device 106, the MMR user 110 extracts key phrases from the paper documents in his/her hands and stores the key phrases along with additional content captured on-the-fly to create a temporary MMR document. Additionally, by use of on the capture device 106, the MMR user 110 may return to his/her MMR computer 112 and download the temporary MMR document that he/she created into an existing document application, such as PowerPoint, then edit it to a final version of an MMR document or other standard type of document for another application. In doing so, images and text are inserted automatically in the pages of the existing document, such as into the pages of a PowerPoint document.

The document version retrieval component 448 is a software application that retrieves past and future versions of a given source file 310 or document, and retrieves and displays a list of events that are associated with those versions. For example, the MMR user 110 points capture device 106 at a printed document and then the document version retrieval component 448 locates the current source file 310 (e.g., a Word file) and other past and future versions of source file 310. In one particular embodiment, this operation uses Windows file tracking software that keeps track of the locations to which source files 310 are copied and moved. Other such file tracking software can be used here as well. For example, Google Desktop Search or the Microsoft Windows Search Companion can find the current version of a file with queries composed from words chosen from source file 310. This operation compensates for the fact that the printed document in hand may have been generated from a version of the document that was created months after the most significant external events (e.g., discussions or meetings) associated therewith.

Document publishing component 460 is a software application that allows for publishing of annotated documents. For example, interestingness scores or other document annotations associated with a document by an MMR user 110 may be published on a website, and the website can provide search functionality based on the annotation or score, the number of annotations and scores, along with traditional search parameters for the document or portion such as title and keyword. Subsequent MMR users 110 then could view the annotations or scores by capturing the document or portion. For documents with no score, an approximate score could be calculated using similar documents or nearby portions of the document. In addition, an MMR user 110 also could search for documents or portions marked interesting by another MMR user 110, e.g., if the MMR user 110 liked another's comments about the document.

The desktop video reminder component 428 is a software application that reminds the MMR user 110 of events that occur on MMR computer 112. For example, by pointing capture device 106 at a section of a paper document, the MMR user 110 may see video clips that show changes in the desktop of MMR computer 112 that occurred while that section was visible. Additionally, the desktop video reminder component 428 may be used to retrieve other multimedia recorded by MMR computer 112, such as audio that is present in the vicinity of MMR computer 112.

The web page reminder component 430 is a software application that reminds the MMR user 110 of web pages viewed on his/her MMR computer 112. For example, by panning capture device 106 over a paper document, the MMR user 110 may see a trace of the web pages that were viewed while the corresponding section of the document was shown on the desktop of MMR computer 112. The web pages may be shown in a browser, such as SD browser 312, 314, or on display 212 of capture device 106. Alternatively, the web pages are presented as raw URLs on display 212 of capture device 106 or on the MMR computer 112.

Multimedia retrieval component 426 is a software application that retrieves multimedia from an arbitrary paper document. For example, MMR user 110 may retrieve all the conversations that took place while an arbitrary paper document was present on the desk of MMR user 110 by pointing capture device 106 at the document. This assumes the existence of office portal 120 in the office of MMR user 110 (or other suitable mechanism) that captures multimedia data.

The location awareness component 438 is a software application that manages location-aware paper documents. The management of location-aware paper documents is facilitated by, for example, an RFID-like tracking system. For example, capture device 106 captures a trace of the geographic location of MMR user 110 throughout the day and scans the RFID tags attached to documents or folders that contain documents. The RFID scanning operation is performed by an RFID reader 244 of capture device 106, to detect any RFID tags within its range. The geographic location of MMR user 110 may be tracked by the identification numbers of each cell tower within cellular infrastructure 132 or, alternatively, via a GPS device 242 of capture device 106, in combination with geo location mechanism 142. Alternatively, document identification may be accomplished with "always-on video" or a video camera 232 of capture device 106. The location data provides "geo-referenced" documents, which enables a map-based interface that shows, throughout the day, where documents are located. An application would be a lawyer who carries files on visits to remote clients. In an alternate embodiment, the document 118 includes a sensing mechanism attached thereto that can sense when the document is moved and perform some rudimentary face detection operation. The sensing function is via a set of gyroscopes or similar device that is attached to paper documents. Based on position information, the MMR system 100*b* indicates when to "call" the owner's cellular phone to tell him/her that the document is moving. The cellular phone may add that document to its virtual brief case. Additionally, this is the concept of an "invisible" barcode, which is a machine-readable marking that is visible to a video camera 232 or still camera 234 of capture device 106, but that is invisible or very faint to humans. Various inks and steganography or, a printed-image watermarking technique that may be decoded on capture device 106, may be considered to determine position.

Unconscious upload component 446 is a software application that uploads unconsciously (automatically, without user intervention) printed documents to capture device 106. Because capture device 106 is in the possession of the MMR user 110 at most times, including when the MMR user 110 is at his/her MMR computer 112, the printer driver 316 in addition to sending documents to the printer 116, may also push those same documents to a storage device 216 of capture device 106 via a wireless communications link 218 of capture device 106, in combination with Wi-Fi technology 134 or Bluetooth technology 136, or by wired connection if the capture device 106 is coupled to/docked with the MMR computer 112. In this way, the MMR user 110 never forgets to pick up a document after it is printed because it is automatically uploaded to the capture device 106.

The PC document metadata component 450 is a software application that retrieves metadata of a document. For example, the MMR user 110 points capture device 106 at a printed document, and the PC document metadata component 450 determines who printed the document, when the document was printed, where the document was printed, and the file path for a given source file 310 at the time of printing.

The capture device UI component 452 is a software application that manages the operation of UI of capture device 106, which allows the MMR user 110 to interact with paper documents. A combination of capture device UI component 452 and capture device UI 224 allow the MMR user 110 to read data from existing documents and write data into existing documents, view and interact with the augmented reality associated with those documents (i.e., via capture device 106, the MMR user 110 is able to view what happened when the document was created or while it was edited), and view and interact with the augmented reality that is associated with documents displayed on his/her capture device 106.

User association component 456 is a software component for creating associations between MMR users 110. For example, ad hoc associations are created between a first MMR users 110 capturing documents having similar or identical document recognition features, including content-based features or format-based features. The ad hoc associations may assist in forming ad hoc social networks, or may link MMR users 110 to existing social networks in conjunction with networking component 458. The user association component 456 also is responsible for associating a captured digital image with a recognized document, e.g., from document database 320.

Networking component 458 is a software component for modifying network ties between MMR users 110 in existing networks. For example, MMR users 110 tied within an existing network, e.g., a social network, capturing documents having similar or identical document recognition features form strengthened links based on documents captured. The networking component 458 identifies to members other members who have captured the similar or identical documents. Thus, the networking component 458 ties into existing third-party networks and adds on to them.

With continuing reference to FIGS. 3 and 4, note that the software components of MMR software suite 222 may reside fully or in part on one or more MMR computers 112, networked servers 114, service provider servers 122, and capture devices 106 of MMR system 100*b*. In other words, the operations of MMR system 100*b*, such as any performed by MMR software suite 222, may be distributed in any user-defined configuration between MMR computer 112, networked server 114, service provider server 122, and capture device 106 (or other such processing environments included in the MMR system 100*b*).

In will be apparent in light of this disclosure that the base functionality of the MMR system 100*a*/100*b* can be performed with certain combinations of software components of the MMR software suite 222. For example, the base functionality of one embodiment of the MMR system 100*a*/100*b* includes:

creating or adding to an MMR document that includes a first media portion and a second media portion;

use of the first media portion (e.g., a paper document) of the MMR document to access information in the second media portion;

use of the first media portion (e.g., a paper document) of the MMR document to trigger or initiate a process in the electronic domain;

use of the first media portion (e.g., a paper document) of the MMR document to create or add to the second media portion;

use of the second media portion of the MMR document to create or add to the first media portion;

use of the second media portion of the MMR document to trigger or initiate a process in the electronic domain or related to the first media portion.

MMR Document

Figure 5:
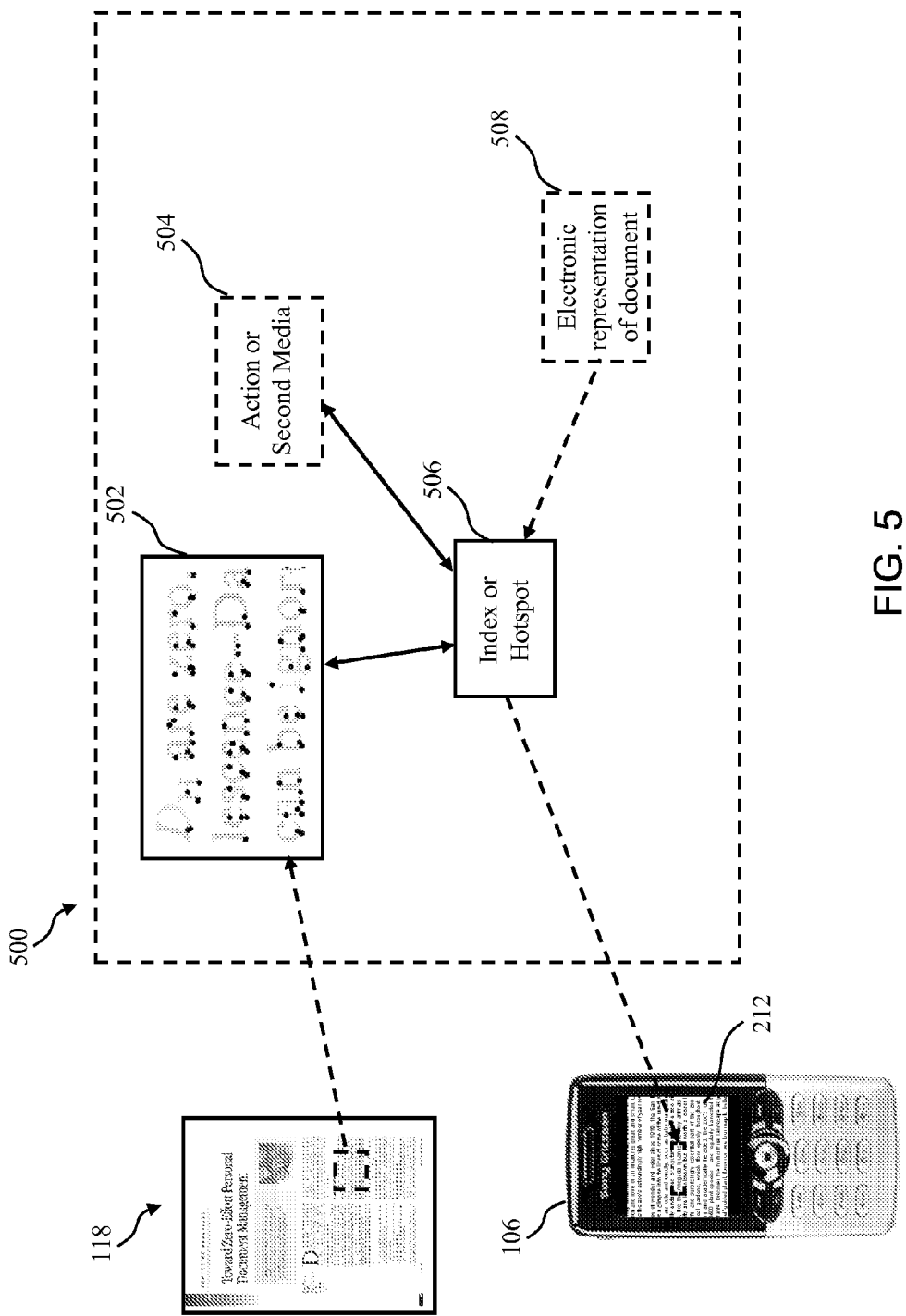
FIG. 5 illustrates a diagram representing an embodiment of an MMR document configured in accordance with an embodiment of the present invention.

FIG. 5 illustrates a diagram of an MMR document 500 in accordance with one embodiment of the present invention. More specifically, FIG. 5 shows an MMR document 500 including a representation 502 of a portion of the printed document 118, an action or second media 504, an index or hotspot 506, and an electronic representation 508 of the entire document 118. While the MMR document 500 typically is stored at the document database 320, it could also be stored in the capture device or any other devices coupled to the network 128. In one embodiment, multiple MMR documents may correspond to a printed document. In another embodiment, the structure shown in FIG. 5 is replicated to create multiple hotspots 506 in a single printed document. In one particular embodiment, the MMR document 500 includes the representation 502 and hotspot 506 with page and location within a page; the second media 504 and the electronic representation 508 are optional and delineated as such by dashed lines. Note that the second media 504 and the electronic representation 508 could be added later after the MMR document has been created, if so desired. This basic embodiment can be used to locate a document or particular location in a document that correspond to the representation.

The representation 502 of a portion of the printed document 118 can be in any form (images, vectors, pixels, text, codes, etc.) usable for pattern matching and that identifies at least one location in the document. It is preferable that the representation 502 uniquely identify a location in the printed document. In one embodiment, the representation 502 is a text fingerprint as shown in FIG. 5. The text fingerprint 502 is captured automatically via PD capture module 318 and stored in index 322 during a print operation. Alternatively, the text fingerprint 502 is captured automatically via document matching module 226' of document scanner 127 and stored in PD index 322*a* during a scan operation. The representation 502 could alternatively be the entire document, a patch of text, a single word if it is a unique instance in the document, a section of an image, a unique attribute or any other representation of a matchable portion of a document.

The action or second media 504 is preferably a digital file or data structure of any type. The second media 504 in the most basic embodiment may be text to be presented or one or more commands to be executed. The second media type 504 more typically is a text file, audio file, or video file related to the portion of the document identified by the representation 502. The second media type 504 could be a data structure or file referencing or including multiple different media types, and multiple files of the same type. For example, the second media 504 can be text, a command, an image, a PDF file, a video file, an audio file, an application file (e.g. spreadsheet or word processing document), etc.

The index or hotspot 506 is a link between the representation 502 and the action or second media 504. The hotspot 506 associates the representation 502 and the second media 504. In one embodiment, the index or hotspot 506 includes position information such as x and y coordinates within the document. The hotspot 506 maybe a point, an area or even the entire document. In one embodiment, the hotspot is a data structure with a pointer to the representation 502, a pointer to the second media 504, and a location within the document. It should be understood that the MMR document 500 could have multiple hotspots 506, and in such a case the data structure creates links between multiple representations, multiple second media files, and multiple locations within the printed document 118.

In an alternate embodiment, the MMR document 500 includes an electronic representation 508 of the entire document 118. This electronic representation can be used in determining position of the hotspot 506 and also by the user interface for displaying the document on capture device 106 or the MMR computer 112.

Example use of the MMR document 500 is as follows. By analyzing representation 502 (text fingerprint, document features), a captured image patch is identified via document matching module 226 of capture device 106. Alternatively, an electronic representation can be captured of an entire document. For example, MMR user 110 points a video camera 232 or still camera 234 of his/her capture device 106 at printed document 118 and captures an image. Subsequently, document matching module 226 performs its analysis upon the captured image, to determine whether an associated entry exists within the index 322. If a match is found, the existence of a hot spot 506 is highlighted to MMR user 110 on the display 212 of his/her capture device 106. For example, a word or phrase is highlighted, as shown in FIG. 5. Each hot spot 506 within printed document 118 serves as a link to other user-defined or predetermined data, such as one of MM files 336 that reside upon networked media server 114. Access to representations 502 that are stored in index 322 allows electronic data to be added to any MMR document 500 or any hotspot 506 within a document. As described with reference to FIG. 4, a paper document that includes at least one hot spot 506 (e.g., link) is referred to as an MMR document 500.

Exemplary Alternate Embodiments

The MMR system 100 (100a or 100b) is not limited to the configurations shown in FIGS. 1A-1B, 2A-2D, and 3-5. The MMR Software may be distributed in whole or in part between the capture device 106 and the MMR computer 112, and significantly fewer than all the modules described above with reference to FIGS. 3 and 4 are required. Multiple configurations are possible including the following:

A first alternate embodiment of the MMR system 100 includes the capture device 106 and capture device software. The capture device software is the capture device UI 224 and the document matching module 226 (e.g., shown in FIG. 3). The capture device software is executed on capture device 106, or alternatively, on an external server, such as networked media server 114 or service provider server 122, that is accessible to capture device 106. In this embodiment, a networked service is available that supplies the data that is linked to the publications. A hierarchical recognition scheme may be used, in which a publication is first identified and then the page and section within the publication are identified.

A second alternate embodiment of the MMR system 100 includes capture device 106, capture device software and document use software. The second alternate embodiment includes software, such as is shown and described with reference to FIG. 4, that captures and indexes printed documents and links basic document events, such as the edit history of a document. This allows MMR user 110 to point his/her capture device 106 at any printed document and determine the name and location of the source file 310 that generated the document, as well as determine the time and place of printing.

A third alternate embodiment of the MMR system 100 includes capture device 106, capture device software, document use software, and event capture module 324. The event capture module 324 is added to MMR computer 112 that captures events that are associated with documents, such as the times when they were visible on the desktop of MMR computer 112 (determined by monitoring the GDI character generator), URLs that were accessed while the documents were open, or characters typed on the keyboard while the documents were open.

A fourth alternate embodiment of the MMR system 100 includes capture device 106, capture device software, and the printer 116. In this fourth alternate embodiment the printer 116 is equipped with a Bluetooth transceiver or similar communication link that communicates with capture device 106 of any MMR user 110 that is in close proximity. Whenever any MMR user 110 picks up a document from the printer 116, the printer 116 pushes the MMR data (document layout and multimedia clips) to that user's capture device 106. User printer 116 includes a keypad, by which a user logs in and enters a code, in order to obtain the multimedia data that is associated with a specific document. The document may include a printed representation of a code in its footer, which may be inserted by printer driver 316.

A fifth alternate embodiment of the MMR system 100 includes capture device 106, capture device software, and office portal 120. The office portal device is preferably a personalized version of office portal 120. The office portal 120 captures events in the office, such as conversations, conference/telephone calls, and meetings. The office portal 120 identifies and tracks specific paper documents on the physical desktop. The office portal 120 additionally executes the document identification software (i.e., document matching module 226 and hosts document database 320). This fifth alternate embodiment serves to off-load the computing workload from MMR computer 112 and provides a convenient way to package MMR system 100b as a consumer device (e.g., MMR system 100b is sold as a hardware and software product that is executing on a Mac Mini computer, by Apple Computer, Inc.).

A sixth alternate embodiment of the MMR system 100 includes capture device 106, capture device software, and the networked media server 114. In this embodiment, the multimedia data is resident on the networked media server 114, such as the Comcast Video-on-Demand server. When MMR user 110 scans a patch of document text by use of his/her capture device 106, the resultant lookup command is transmitted either to the set-top box 126 that is associated with cable TV of MMR user 110 (wirelessly, over the Internet, or by calling set-top box 126 on the phone) or to the Comcast server. In both cases, the multimedia is streamed from the Comcast server to set-top box 126. The MMR system 100 knows where to send the data, because MMR user 110 registered previously his/her phone. Thus, the capture device 106 can be used for access and control of the set-top box 126.

A seventh alternate embodiment of the MMR system 100 includes capture device 106, capture device software, the networked media server 114 and a location service. In this embodiment, the location-aware service discriminates between multiple destinations for the output from the Comcast system (or other suitable communication system). This function is performed either by discriminating automatically between cellular phone tower IDs or by a keypad interface that lets MMR user 110 choose the location where the data is to be displayed. Thus, the user can access programming and other cable TV features provided by their cable operator while visiting another location so long as that other location has cable access.

Document Matching ("Image-Based Patch Recognition")

Figure 6:
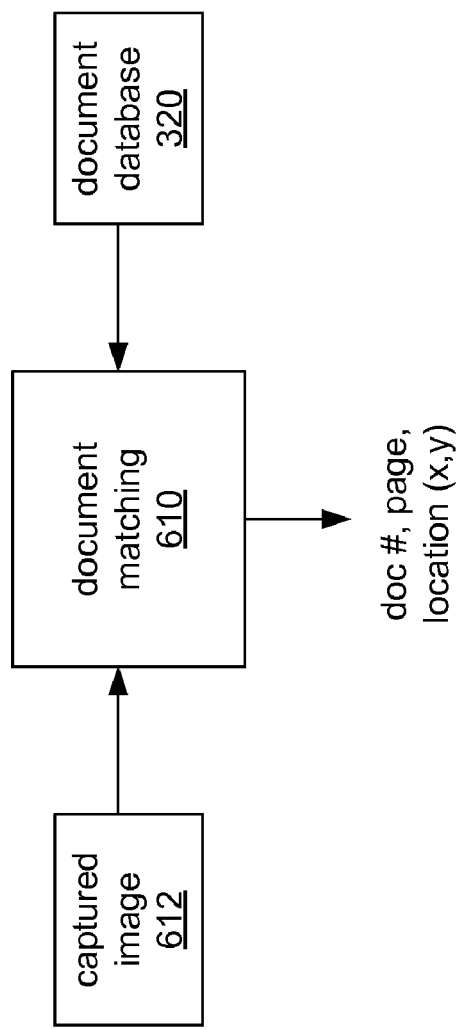
FIG. 6 illustrates a document matching methodology in accordance with an embodiment of the present invention.

As previously described, document matching involves uniquely identifying a portion, or "patch," of an MMR document. Referring to FIG. 6, a document matching module/system 610 receives a captured image 612. The document matching system 610 then queries a collection of pages in a document database 320 and returns a list of the pages and documents that contain them within which the captured image 612 is contained. For content-based features, each result is an x-y location where the captured input image 612 occurs. For format-based features, each result is a matching captured document image. Those skilled in the art will note that the database 320 can be external to the document matching module 610 (e.g., as shown in FIG. 6), but can also be internal to the document matching module 610.

Figure 7:
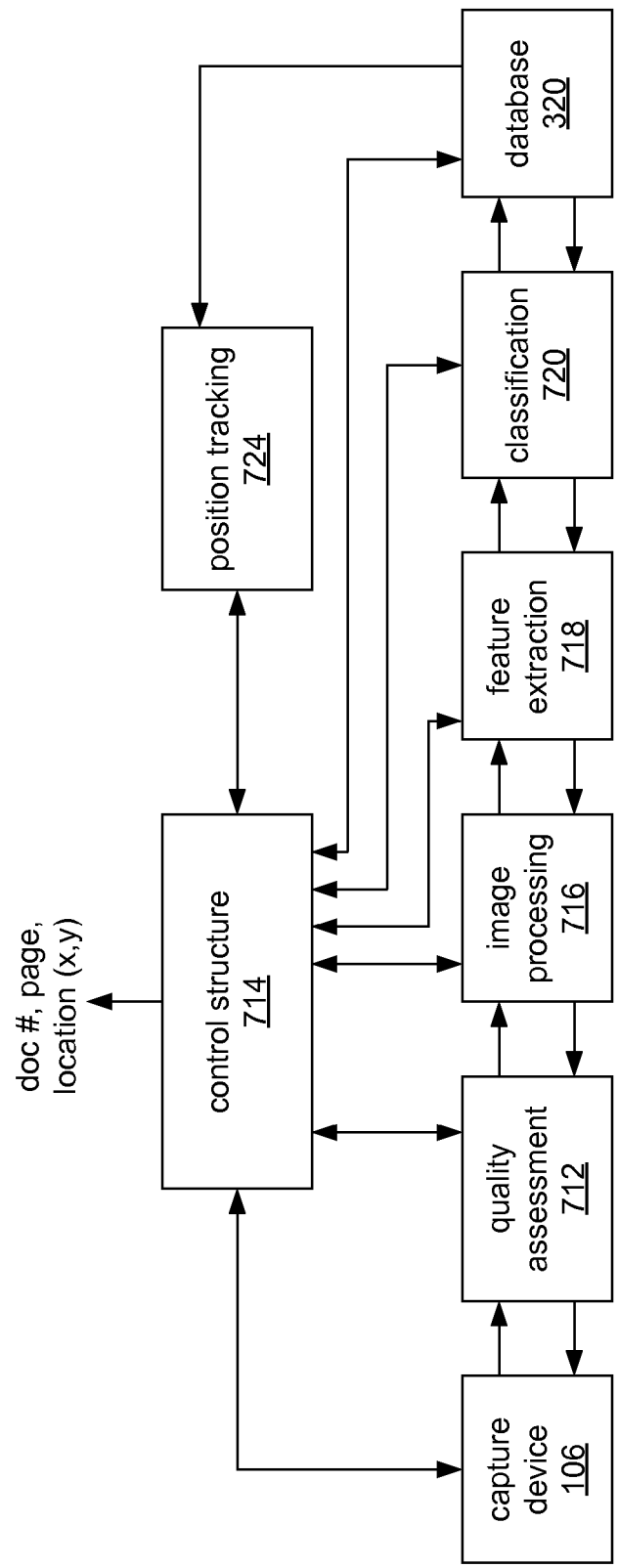
FIG. 7 illustrates a document matching system configured in accordance with an embodiment of the present invention.

FIG. 7 shows a block diagram of a document matching system 610 in accordance with an embodiment of the present invention. A capture device 106 captures an image. The captured image is sent to a quality assessment module 712, which effectively makes a preliminary judgment about the content of the captured image based on the needs and capabilities of downstream processing. For example, if the captured image is of such quality that it cannot be processed downstream in the document fingerprint matching system 610, the quality assessment module 712 causes the capture device 106 to recapture the image at a higher resolution. Further, the quality assessment module 712 may detect many other relevant characteristics of the captured image such as, for example, the sharpness of the text contained in the captured image, which is an indication of whether the captured image is "in focus." Further, the quality assessment module 712 may determine whether the captured image contains something that could be part of a document. For example, an image patch that contains a non-document image (e.g., a desk, an outdoor scene) indicates that the user is transitioning the view of the capture device 106 to a new document.

Further, in one or more embodiments, the quality assessment module 712 may perform text/non-text discrimination so as to pass through only images that are likely to contain recognizable text.

Further, in one or more embodiments, feedback of the quality assessment module 712 to the capture device 106 may be directed to a user interface (UI) of the capture device 106. For example, the feedback may include an indication in the form of a sound or vibration that indicates that the captured image contains something that looks like text but is blurry and that the user should steady the capture device 106. The feedback may also include commands that change parameters of the optics of the capture device 106 to improve the quality of the captured image. For example, the focus, F-stop, and/or exposure time may be adjusted so at to improve the quality of the captured image. For example, a lesser quality may be needed for content-based features than for format-based features such as page reflectance.

Further, the feedback of the quality assessment module 712 to the capture device 106 may be specialized by the needs of the particular feature extraction algorithm being used. As further described below, feature extraction converts an image into a symbolic representation. In a recognition system that computes the length of words, such as for content-based features, it may desirable for the optics of the capture device 106 to blur the captured image. Those skilled in the art will note that such adjustment may produce an image that, although perhaps not recognizable by a human or an optical character recognition (OCR) process, is well suited for the feature extraction technique. The quality assessment module 712 may implement this by feeding back instructions to the capture device 106 causing the capture device 106 to defocus the lens and thereby produce blurry images. In contrast, crisp images may be needed for determination of format-based features such as page reflectance.

The feedback process is modified by a control structure 714. In general, the control structure 714 receives data and symbolic information from the other components in the document matching system 610. The control structure 714 decides the order of execution of the various steps in the document matching system 610 and can optimize the computational load. The control structure 714 identifies the x-y position of received image patches. More particularly, the control structure 714 receives information about the needs of the feature extraction process, the results of the quality assessment module 712, and the capture device 106 parameters, and can change them as appropriate. This can be done dynamically on a frame-by-frame basis. In a system configuration that uses multiple feature extraction methodologies, one might require blurry images of large patches of text and another might need high resolution sharply focused images of paper grain. In such a case, the control structure 714 may send commands to the quality assessment module 712 that instruct it to produce the appropriate image quality when it has text in view. The quality assessment module 712 would interact with the capture device 106 to produce the correct images (e.g., N blurry images of a large patch followed by M images of sharply focused paper grain (high resolution)). The control structure 714 would track the progress of those images through the processing pipeline to ensure that the corresponding feature extraction and classification is applied.

An image processing module 716 modifies the quality of the input images based on the needs of the recognition system. Examples of types of image modification include sharpening, deskewing, and binarization. Such algorithms include many tunable parameters such as mask sizes, expected rotations, and thresholds.

As shown in FIG. 7, the document matching system 610 uses feedback from feature extraction and classification modules 718, 720 (described below) to dynamically modify the parameters of the image processing module 716. This works because the user will typically point their capture device 106 at the same location in a document for several seconds continuously. Given that, for example, the capture device 106 processes 30 frames per second, the results of processing the first few frames in any sequence can affect how the frames captured later are processed.

A feature extraction module 718 converts a captured image into a symbolic representation. In one example, the feature extraction module 718 locates words and computes their bounding boxes. In another example, the feature extraction module 718 locates connected components and calculates descriptors for their shape. In yet another example, feature vectors, for format-based features such as page reflectance, are calculated. Further, in one or more embodiments, the document matching system 610 shares metadata about the results of feature extraction with the control structure 714 and uses that metadata to adjust the parameters of other system components. Those skilled in the art will note that this may significantly reduce computational requirements and improve accuracy by inhibiting the recognition of poor quality data. For example, a feature extraction module 718 that identifies word bounding boxes could tell the control structure 714 the number of lines and "words" it found. If the number of words is too high (indicating, for example, that the input image is fragmented), the control structure 714 could instruct the quality assessment module 712 to produce blurrier images. The quality assessment module 712 would then send the appropriate signal to the capture device 106. Alternatively, the control structure 714 could instruct the image processing module 716 to apply a smoothing filter.

A classification module 720 converts a feature description from the feature extraction module 718 into an identification of one or more pages within a document and the x-y positions within those pages where an input image patch occurs. The identification is made dependent on feedback from a database 320 as described in turn. Further, in one or more embodiments, a confidence value may be associated with each decision. The document matching system 610 may use such decisions to determine parameters of the other components in the system. For example, the control structure 714 may determine that if the confidences of the top two decisions are close to one another, the parameters of the image processing algorithms should be changed. This could result in increasing the range of sizes for a median filter and the carry-through of its results downstream to the rest of the components.

Further, as shown in FIG. 7, there may be feedback between the classification module 720 and a database 320. Further, those skilled in the art will recall that database 320 can be external to the module 610 as shown in FIG. 6. A decision about the identity of a patch can be used to query the database 320 for other patches that have a similar appearance. This would compare the perfect image data of the patch stored in the database 320 to other images in the database 320 rather than comparing the input image patch to the database 320. This may provide an additional level of confirmation for the classification module's 720 decision and may allow some preprocessing of matching data.

The database comparison could also be done on the symbolic representation for the patch rather than only the image data. For example, the best decision might indicate the image patch contains a 12-point Arial font double-spaced. The database comparison could locate patches in other documents with a similar font, spacing, page reflectance, and word layout using only textual metadata rather than image comparisons.

The database 320 may support several types of content-based queries. The classification module 720 can pass the database 320 a feature arrangement and receive a list of documents and x-y locations where that arrangement occurs. For example, features might be trigrams (described below) of word lengths either horizontally or vertically. The database 320 could be organized to return a list of results in response to either type of query. The classification module 720 or the control structure 714 could combine those rankings to generate a single sorted list of decisions.

Further, there may be feedback between the database 320, the classification module 720, and the control structure 714. In addition to storing information sufficient to identify a location from a feature vector, the database 320 may store related information including a pristine image of the document as well as a symbolic representation for its graphical components. This allows the control structure 714 to modify the behavior of other system components on-the-fly. For example, if there are two plausible decisions for a given image patch, the database 320 could indicate that they could be disambiguated by zooming out and inspecting the area to the right for the presence of an image. The control structure 714 could send the appropriate message to the capture device 106 instructing it to zoom out. The feature extraction module 718 and the classification module 720 could inspect the right side of the image for an image printed on the document.

Further, it is noted that the database 320 stores detailed information about the data surrounding an image patch, given that the patch is correctly located in a document. This may be used to trigger further hardware and software image analysis steps that are not anticipated in the prior art. That detailed information is provided in one case by a print capture system that saves a detailed symbolic description of a document. In one or more other embodiments, similar information may be obtained by scanning a document.

Still referring to FIG. 7, a position tracking module 724 receives information about the identity of an image patch from the control structure 714. The position tracking module 724 uses that to retrieve a copy of the entire document page or a data structure describing the document from the database 320. The initial position is an anchor for the beginning of the position tracking process. The position tracking module 724 receives image data from the capture device 106 when the quality assessment module 712 decides the captured image is suitable for tracking. The position tracking module 724 also has information about the time that has elapsed since the last frame was successfully recognized. The position tracking module 724 applies an optical flow technique which allows it to estimate the distance over the document the capture device 106 has been moved between successive frames. Given the sampling rate of the capture device 106, its target can be estimated even though data it sees may not be recognizable. The estimated position of the capture device 106 may be confirmed by comparison of its image data with the corresponding image data derived from the database document. A simple example computes a cross correlation of the captured image with the expected image in the database 320.

Thus, the position tracking module 724 provides for the interactive use of database images to guide the progress of the position tracking algorithm. This allows for the attachment of electronic interactions to non-text objects such as graphics and images. Further, in one or more other embodiments, such attachment may be implemented without the image comparison/confirmation step described above. In other words, by estimating the instant motion of the capture device 106 over the page, the electronic link that should be in view independent of the captured image may be estimated.

Document matching may take various forms. For example, each document patch independently. Features are extracted from an image patch that are used to locate one or more pages and the x-y locations on those pages where the patch occurs. In another example, blur in an input image may first be estimated, distance from the page and point size of the image text calculated, and then template matching may occur based on the image using characteristics of fonts of that point size. Those skilled in the art will note that font estimation (i.e., identification of candidates for the font of the text in the patch) may be done with known techniques. Further, other techniques may be used such as known methods of distance from focus that could be readily adapted to the capture device.

In one or more embodiments, one or more of the various document matching techniques described herein may be used in combination with one or more known matching techniques. In general, a first matching technique is used to locate in a document database a set of pages having specific criteria, and then a second matching technique is used to uniquely identify a patch from among the pages in the set.

Figure 8:
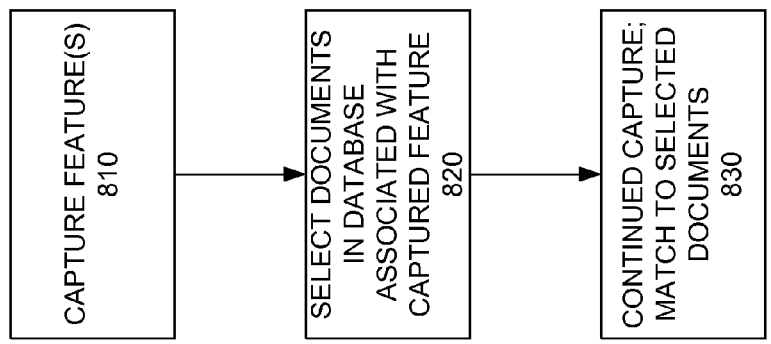
FIG. 8 shows a flow process for multi-tier recognition in accordance with an embodiment of the present invention.

FIG. 8 shows an example of a flow process for multi-tier recognition in accordance with an embodiment of the present invention. Initially, at step 810, a capture device 106 is used to capture one or more features from a document of interest. The feature may be any feature the capture of which effectively results in a selection of a set of documents within a document database. For example, the feature may be a numeric-only bar code (e.g., universal product code (UPC)), an alphanumeric bar code (e.g., code 39, code 93, code 128), or a 2-dimensional bar code (e.g., a QR code, PDF417, DataMatrix, Maxicode). Alternatively, the feature may be, for example, a graphic, an image, a trademark, a logo, a particular color or combination of colors, a keyword, or a phrase. Or, the feature may be any one or more format-based features, such as a type font, font size, and paper reflectance associated with the document of interest. Further, in one or more embodiments, the feature may be limited to features suitable for recognition by the capture device 106.

At step 820, once the distinguishing feature has been captured at step 810, a set of documents and/or pages of documents in a document database are selected based on an association with the captured feature. For example, if the captured feature is a company's logo, all documents in the database indexed as containing that logo are selected. In another example, the database may contain a library of trademarks against which captured images are compared. When there is a "hit" in the library, all documents associated with the hit trademark are selected for subsequent matching as described below. Further, in one or more embodiments, the selection of documents/pages at step 820 may depend on the captured feature and the location of that feature on the scanned document. For example, information associated with the captured feature may specify whether that image is located at the upper right corner of the document as opposed to the lower left corner of the document.

Further, those skilled in the art will note that the determination that a particular captured image contains the distinguishing feature may be made by the capture device 106 or some other component that receives raw image data from the capture device 106. For example, the database itself may determine that a particular captured image sent from the capture device 106 contains the feature, in response to which the database selects a set of documents associated with the captured feature.

At step 830, after a particular set of documents has been selected at step 820, the capture device 106 continues to scan and accordingly capture images of the document of interest. The captured images of the document are then matched 830 against the documents selected at step 820 using one or more of the various document matching techniques described herein. For example, after a set of documents indexed as containing the feature of a shoe graphic is selected at step 820 based on capture of a shoe graphic image on a document of interest at step 810, subsequent captured images of the document of interest may be matched against the set of selected documents using the multiple classifiers technique as previously described.

Thus, e.g., using an implementation of the multi-tier recognition flow process described herein, patch recognition times may be decreased by initially reducing the amount of pages/documents against which subsequent captured images are matched. Further, a user may take advantage of such improved recognition times by first scanning a document over locations where there is an image, a bar code, a graphic, or other type of distinguishing feature. By taking such action, the user may quickly reduce the amount of documents against which subsequent captured images are matched.

Figure 9:
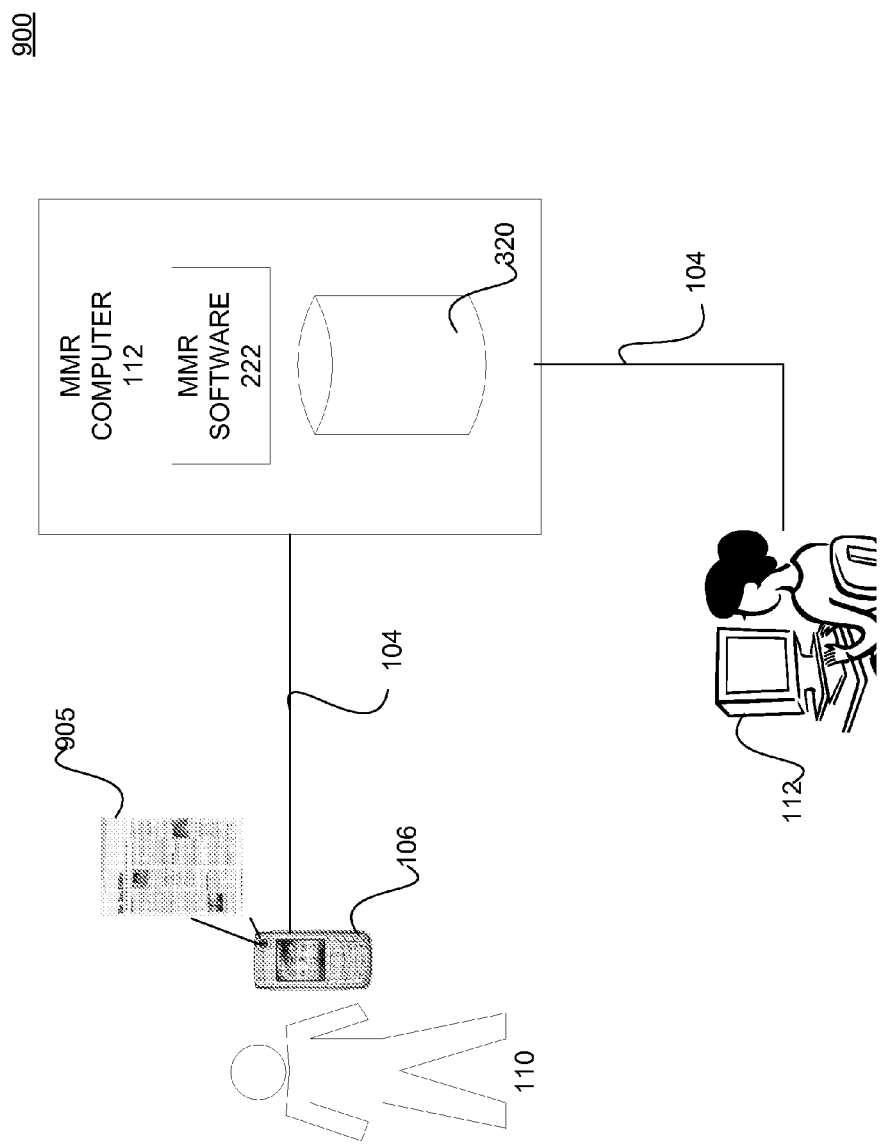
FIG. 9 shows a system according to one embodiment of the present invention.

FIG. 9 shows a system 900 according to one embodiment of the present invention. System 900 includes a document 905, a capture device 106 for capturing by an MMR user 110 a digital image of the document 905, and an MMR computer 112 with MMR software 222 and document database 320 according to one embodiment. The components are connected via communication mechanism 104, as described herein according to one embodiment. Alternatively, an MMR computer 112 may not be a part of the system, and the MMR software 222 and document database 320 may be at other locations such as in capture device 106, and/or on a networked media server 114 (not shown in FIG. 9) according to another embodiment. Alternatively, an MMR user 112 also may use another MMR computer 112 as a capture device. The depicted embodiment shows a capture device 106 such as a mobile phone and capturing the document 905 using a camera associated with the mobile phone. However, in other embodiments, other capture methods and devices may be used, for example, a document may be scanned by a scanner such as 127, or may be captured, e.g., by PD capture module 318 in conjunction with being printed on a printer, e.g., 116.

Figure 10:
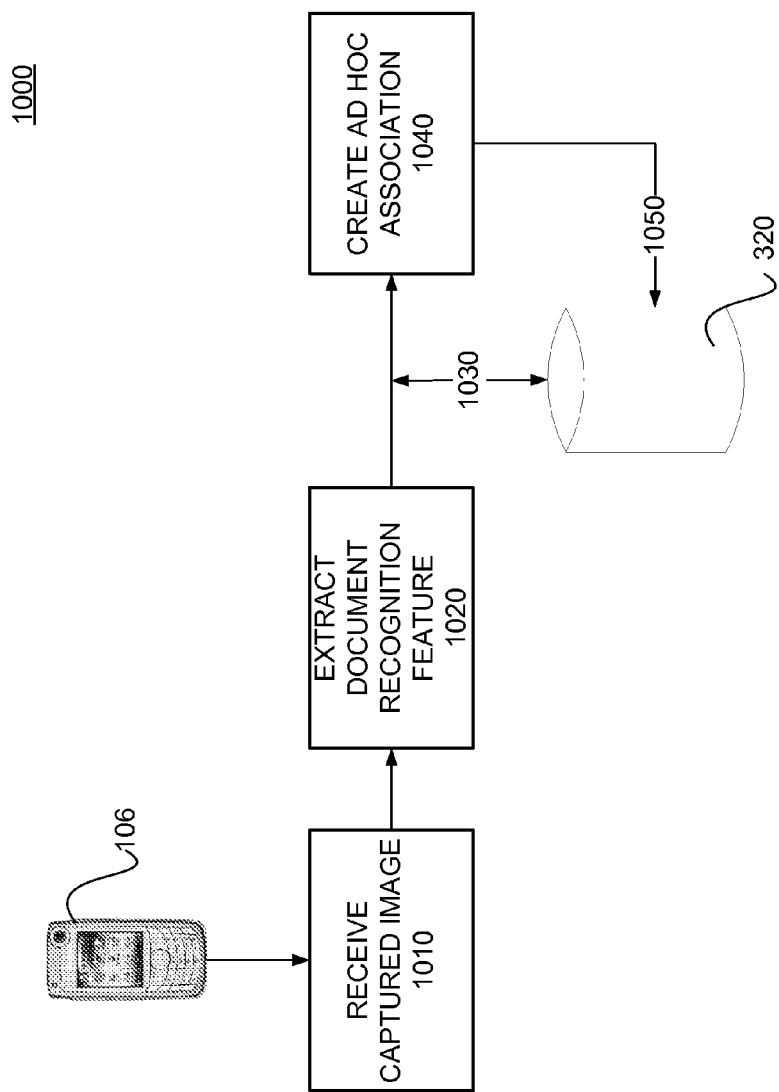
FIG. 10 shows an example of a flow process for creating an ad hoc association between users capturing documents with similar document recognition features in accordance with one embodiment of the present invention.

FIG. 10 shows an example of a flow process 1000 for creating an ad hoc association, or link, between users capturing documents with similar document recognition features in accordance with one embodiment of the present invention. The flow process 1000 can be implemented in software, hardware (e.g., gate-level logic), firmware (e.g., a microcontroller configured with embedded routines for carrying out the method, or some combination thereof.

Initially, a captured digital image is received 1010. The captured digital image is an image of at least a portion of a paper document 905 associated with a MMR user 110. As depicted in FIG. 10, a capture device 106 is used to capture the digital image of the paper document 905, e.g., using a still or video camera of the capture device 106. The captured digital image may be received at the capture device 106, or transmitted by the capture device 105 to an MMR computer 112, or received at any other device or module capable of document matching as described herein.

The paper document 905 may be any document, such as a memo having any number of pages (e.g., work-related, personal letter), a product label (e.g., canned goods, medicine, boxed electronic device), a product specification (e.g., snow blower, computer system, manufacturing system), a product brochure or advertising materials (e.g., automobile, boat, vacation resort), service description materials (e.g., Internet service providers, cleaning services), one or more pages from a book, magazine or other such publication, pages printed from a website, hand-written notes, a business card, notes captured and printed from a white-board, or pages printed from any processing system (e.g., desktop or portable computer, camera, smartphone, remote terminal).

Although a capture device 106 such as a camera phone is used in the description of FIG. 10, the process 1000 also can be used in conjunction with other capture methods and devices, for example, a document may be scanned by a scanner such as 127, or may be captured, e.g., by PD capture module 318 in conjunction with being printed on a printer, e.g., 116.

Next, one or more document recognition features are extracted 1020 from the captured digital image. Document recognition features may include content-based features such as individual words, letters, images, and/or characters within the document 905, along with their x-y locations. Document recognition features may include format-based feature vectors of the document 905 that can be ascertained from the captured digital image, such as a type font, font size, and paper reflectance associated with the document 905.

If other data is required to determine such feature vectors, such as distance of the capture device 106 from the paper document 905, such calculations are made as well. The needs of the document recognition features extraction process can be used to adjust the capture device 106 parameters, e.g., dynamically on a frame-by-frame basis. For example, the capture device 106 might receive a request to produce the corrected images (e.g., N blurry images of a large patch followed by M images of sharply focused paper grain (high resolution)).

The captured digital image(s) and the extracted document recognition features then may be stored 1030, e.g., in document database 320. The document may be identified using the captured digital image(s) and/or extracted document recognition features if the document is known to the document database 320, in which case the captured digital image(s) and extracted document recognition features would be stored with any other data known to be associated with the known document, e.g., an electronic version of the document. For example, the content of the document may be known, and may have associated actions, media types, or hotspots, e.g., as described in conjunction with MMR document 500 described in FIG. 5. However, the document may be unknown to the document database 320 in some cases (i.e., not previously indexed, or "unindexed"), and/or have unknown content. For unknown documents, the captured digital image(s) and extracted document recognition features are stored without any other data. By storing the unknown capture and extracted features, if the unknown document later is indexed, non-indexed images can be marked as matching the now-indexed document.

Next, an ad hoc association, or "link," is created 1040 between the (first) MMR user 110 and one or more other users 110 who have captured documents with the same or similar document recognition features, assuming at least one match is made between the captured document and a stored document, which is associated with another (second) user. It is assumed here and elsewhere herein that the owner of the capture device, e.g., 105, is the user who is doing the capturing. As part of this step 1040, the extracted document recognition features are compared with document recognition features for stored documents, e.g., those stored in the document database 320 or other storage. Alternatively, this step may occur in conjunction with the storage step 1030. The comparison may be made using techniques described herein, or using known comparison techniques.

The comparison is a pairwise comparison according to one embodiment, wherein the extracted document recognition features are compared to the document recognition features for each stored document. The location of the MMR user 110 associated with the captured document 905 and the locations of MMR users 110 associated with the stored documents may be used to produce a distance score for each pair, and the ad hoc association/link may be parameterized by the distance score. In this example, GPS tracking or other known methods may be used to determine user location. For example, only users within a certain distance diameter, e.g., 10 miles, and their documents may come up as a match. Alternatively, distance need not be a consideration.

A timestamp for the time of the document capture by the user and timestamps for other users 110 at the time of capture of the stored documents may be used to produce a timing score for each pair, and the ad hoc association may be parameterized by the timing score. For example, only documents captured within a few hours of each other may come up as a match. Alternatively, timing may not be a consideration.

An additional part of the comparison process can be checking for association with different versions or editions of the same document. That is, after identifying the document in 320 of which user 110 captured an image, the database 320 can provide links to the documents with the same or similar content but that were printed with different formats. This enables the creation of ad hoc associations/links between users that have different versions of the same document or different editions of the same book.

A determination of whether the compared features are the same or similar may be based on calculation of standard metrics, such as a Hamming distance, for the extracted vectors, and may have predetermined threshold parameters. The determination and parameters may vary depending on which features are compared. For example, for a binary feature vector such as type font, an exact match may be required, whereas for a scaled feature vector such as page reflectance, the parameters likely would reflect a range of values. In some cases, the paper document associated with the user may be identical to the document(s) with similar document recognition features, i.e., the document recognition features may be exactly the same.

Figure 13:
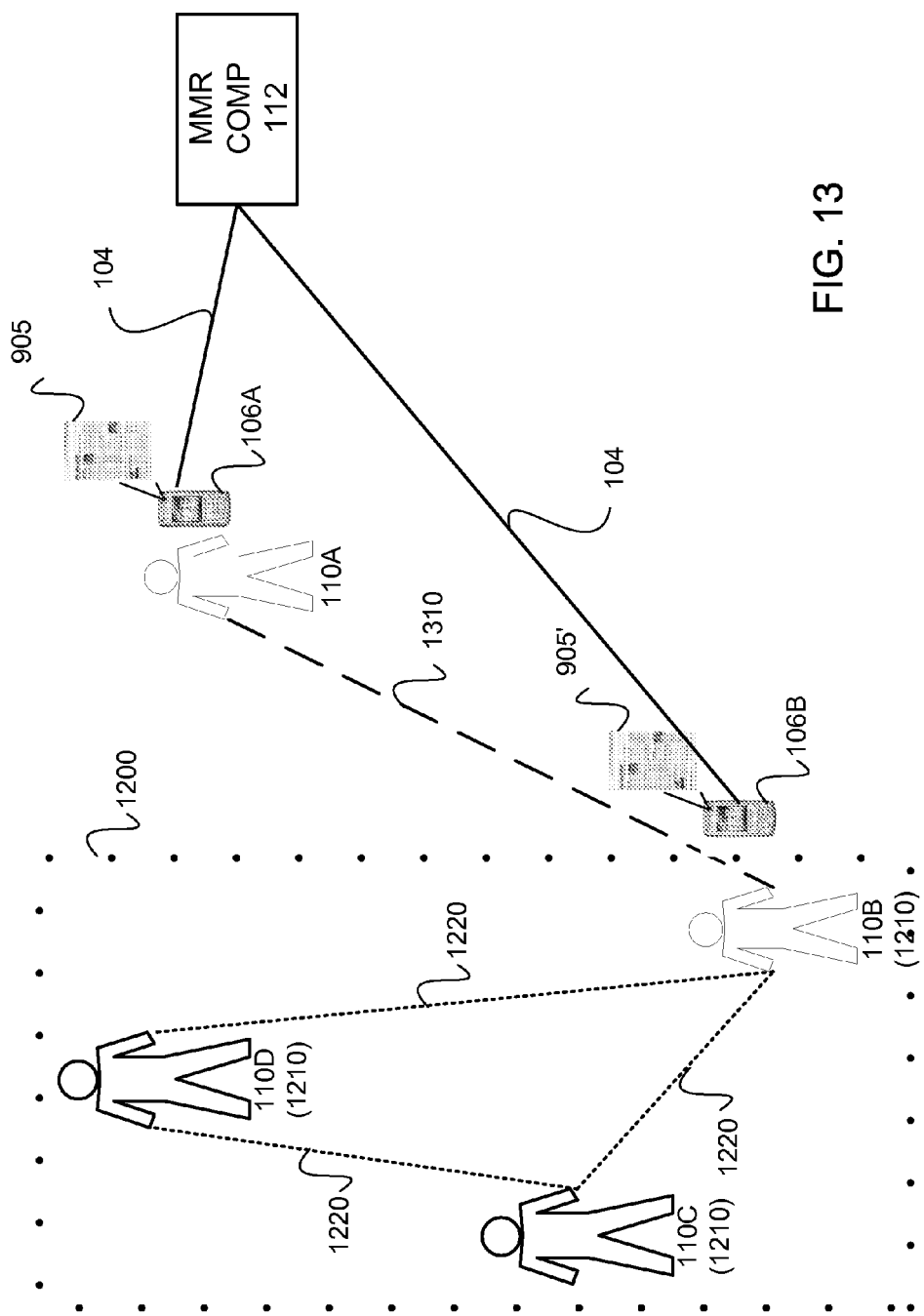
FIG. 13 depicts an example of a usage scenario for the system of FIG. 9 in accordance with one embodiment of the present invention.
Figure 14:
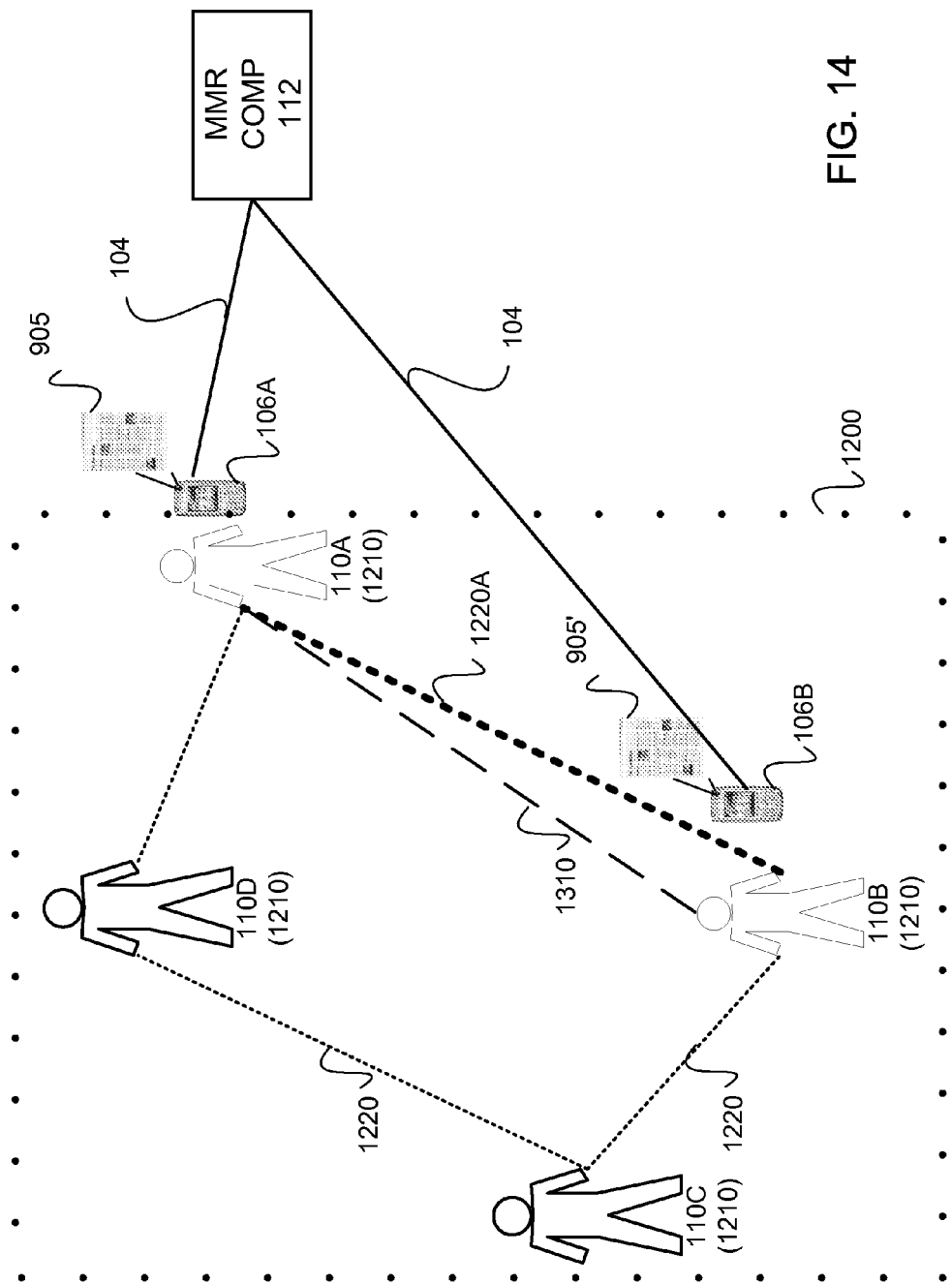
FIG. 14 depicts an example of a usage scenario for the system of FIG. 9 in accordance with another embodiment of the present invention.

The created 1040 ad hoc association, or "link," is the formation of an ad hoc social network, or other network, according to one embodiment, in which a new link is formed between the MMR user 110 one or more other users 110 who have captured documents with the same or similar document recognition features. Using such links, the identity of the one or more other users 110 who have captured documents with the same or similar document recognition features could be shared with the MMR user 110, based on shared interests as expressed by having captured the same or similar documents. The formation of ad hoc social networks using captured document images can be used within an existing social network or independent of one. E.g., if the one or more other users 110 who have captured documents with the same or similar document recognition features are members of an existing social network, the created 1040 ad hoc association thereby associates the MMR user 110A with the existing social network 1200, as depicted in FIG. 13. If the MMR user 110A and the one or more other users 110B who have captured documents with the same or similar document recognition features are members of an existing social or other network 1200 and are connected by existing ties 1220, the created 1040 ad hoc association adds a new link 1310, which strengthens the existing tie 1220A between the network members 110A and 110B, as depicted in FIG. 14. In addition, the ad hoc association may be stored 1050, e.g., in document database 320.

Figure 11:
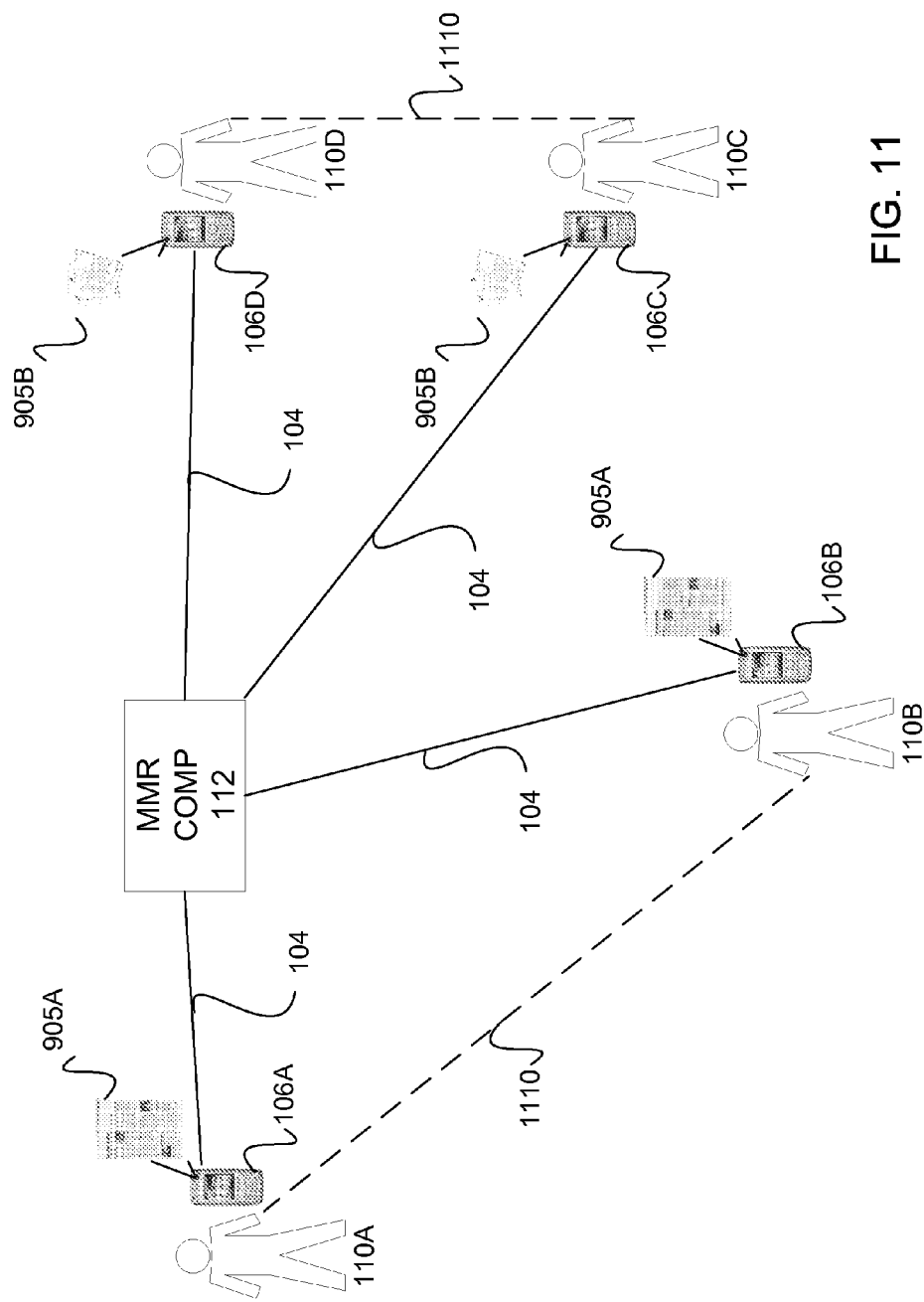
FIG. 11 shows an example of a usage scenario for the system of FIG. 9 in accordance with one embodiment of the present invention.

FIG. 11 shows an example of a usage scenario for the system 900 of FIG. 9 in accordance with one embodiment of the present invention. MMR user 110A and MMR user 110B capture a digital image of the same document 905A. Thus, user 110A ad MMR user 110B now share a tie 1110 between them, resulting from the ad hoc association, based on shared interests expressed by capturing the same article and/or document 905A. Similarly, MMR user 110C and 110D capture a digital image of the same document 905B (but different for document 905A). Thus, user 110C ad MMR user 110D now share a tie 1110 between them, resulting from the ad hoc association, based on shared interests expressed by capturing the same article and/or document 905B.

An example of this usage scenario includes a document 905 that is a portion of a newspaper, magazine, or other document provided via a publisher. MMR user 110A may be someone who captures the document 905A image, e.g., while at a doctor's office in the city of Mountain View, Calif. Alternatively, the document 905 image can be a rendered symbolic document format (e.g., pdf, Word, etc.) displayed on a computer screen and an image patch extracted from the computer frame buffer by selection on the screen, or by capturing an image of the rendered document image with an image capture device 106. The publisher may make a MMR-ready version of the document 905 available that allows the MMR user 110A to download the article at the time of capture, or for later use. At the time of capture, the identification of the MMR user 110A (e.g., via capture device 106A), the location of the MMR user 110A (e.g., via GPS or other technology), and the date and time of the capture may be saved and provided to the publisher, e.g., via third-party software module 228, described in conjunction with FIG. 2E. MMR user 110B may be someone who captures the document 905A image at some other location and time. Using information such as locations, date, and time of capture for the MMR user 110A, 110B, the publisher could share the information with other users 110A, 110B, so that the users 110A, 110B would be aware of others who had captured the same document 905. Limitations could also be placed on this information, such as limiting new link formation to users who already know each other, work together, are nearby geographically, or who captured the document very recently in time, etc. This way, colleagues could send an email, IM, or SMS to other users 110 who captured the same document 905, or could talk to them about it in person (e.g., if they are co-workers who work in the same building).

In addition, or alternatively, MMR user 110A may provide an interestingness score for the document 905, or a portion thereof. The interestingness score can be published on a website, and the website can provide search functionality based on the interestingness score and the number of scores, along with traditional search parameters for the document 905 or portion such as title and keyword. Users 110 also could add annotations in addition to the interestingness scores, e.g., discussion of why the document 905 was interesting, or links to other similar documents or authors, or other arbitrary electronic data. Subsequent users 110 then could view the interestingess score by capturing the document 905 or portion. For documents with no score, an approximate score could be calculated using similar documents or nearby portions of the document. For example, if three documents about a topic "laser printing technology" were given a string interestingness score by User A, but a fourth document with similar text, and on the same topic, was not annotated by User A, the estimates of the three scored documents could be averaged to estimate User A's score of the fourth document. In addition, a MMR user 110 also could search for documents or portions marked interesting by another user 110, e.g., if the MMR user 110 liked another user's comments about the document 905.

For documents 905 that are unknown to the document database 320, the document 905 would not be available for download, but the users 110 could add annotations to the document 905 about parts they liked, other articles like the document 905, etc., that then could be provided to subsequent users 110 capturing the document 905 upon determination that the captured image matches the previously-stored image of the unindexed document. These annotations would be stored with the captured image with which they correspond, even if the underlying document is unknown.

These examples are provided by way of illustration, not limitation. The examples described in conjunction with FIGS. 13 and 14, as well as other examples, may form other usage scenarios for FIG. 11.

Figure 12:
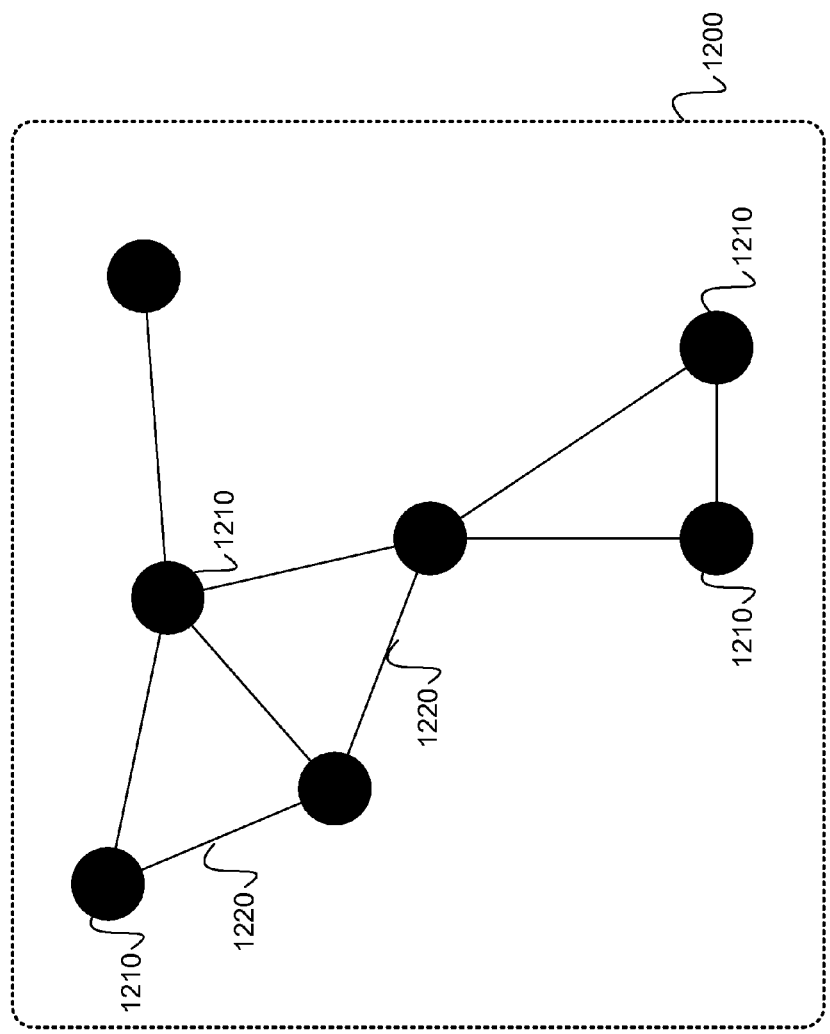
FIG. 12 depicts a standard network in accordance with one embodiment of the present invention.

FIG. 12 depicts a standard social, or other, network 1200 in accordance with one embodiment of the present invention. The network 1200 is a structure made of member nodes (typically individuals or organizations) 1210 that are tied 1220 by one or more specific types of interdependency.

FIG. 13 depicts an example of a usage scenario for the system 900 of FIG. 9 in accordance with one embodiment of the present invention. Two users, 110A and 110B, have captured a document 905 with the same or similar document recognition features. FIG. 13 shows MMR user 110A capturing an image of document 905 and MMR user 110B capturing an image of document 905' (prime notation here indicates that that captured images may be different instances of the same document, e.g., two independent copies of the same article in the same magazine). In this example, MMR user 110B is a member of an existing social network 1200, and MMR user 110A is not. The existing social network 1200 includes MMR user 110B as a member node 1210, as well as member nodes 1210 (users 110C and 110D), connected by ties 1220. When an ad hoc association is created between MMR user 110A and MMR user 110B, such as described in conjunction with FIGS. 10 and 15, it associates user 110A with the existing social network 1200 via new link 1310.

An example of this usage scenario includes a document 905 that is part of a repair technicians' knowledge base about a product. The network 1200 may comprise technicians who previously have worked on the product as member nodes 1210, some of whom may have captured the document 905, as described in conjunction with FIG. 10, and/or modified the document 905, e.g., as will be described in conjunction with FIG. 16, or have worked with some other aspect of the repair technicians' knowledgebase with respect to this product. MMR user 110A may be a new technician working with the product, or capturing or otherwise working with the document 905 for the first time. New technician 110A captures the document 905 and thereby is associated with a member 110B (node 1210) of the existing network 1200 who also has captured the document (905'), via new link 1310. Using the new link 1310, the identity of the one or more other users 110C, 110D who have captured documents 905, or otherwise are associated with user 110B/member 1210 with the same or similar document recognition features could be shared with the MMR user 110A, based on shared interests as expressed by having captured the same or similar documents 905, in this case, working on the same product.

Another example of this usage scenario includes capturing an image of a business card as the document 905. The MMR user 110A who captures the business card (document 905) also may annotate the card with various notes or multimedia annotations such as slides presented by the person whom the card is from, etc. Capturing the card (document 905) links the MMR user 110A to the network 1200 of that person. That is, after recognizing the person whose node 1210 corresponds to a business card, an invitation can be sent to MMR user 110A asking the MMR user 110A to join the 1200 network of member node 1210, e.g., by a third-party social networking application.

These examples are provided by way of illustration, not limitation. The examples described in conjunction with FIGS. 11 and 14, as well as other examples, may form other usage scenarios for FIG. 13.

FIG. 14 depicts an example of a usage scenario for the system 900 of FIG. 9 in accordance with another embodiment of the present invention. FIG. 14 is similar to FIG. 13, except that all users 110A-D are member nodes 1210 of an existing social network 1200 connected by existing ties 1220. Thus, when users 110A and 110B captured a document 905 with the same or similar document recognition features, an ad hoc association, or "link" is created between MMR user 110A and MMR user 110B, which associates user 110A with MMR user 110B via new link 1310. However, since users 110A and 110B already are both member nodes 1210 of an existing social network 1200 and are connected by a tie 1220A, the ad hoc association thereby strengthens the tie 1220A, depicted in FIG. 14 as bold tie 1220A. For example, using the new link 1310 information associated with the matching or similar documents 905, and overlaying that information on the existing social network node 1210 and tie 1220 structure, the above-described process follow works as an add-on to an existing social network 1200 and its associated software application(s).

An example of this usage scenario includes a document 905 that is part, e.g., a page, of a textbook for a college course. The network 1200 may comprise students (member nodes) 1210 enrolled in the college course. MMR user 110A may be a student (member node) 1210 who has a question about the content of the document 905, and thus has captured an image of the document 905. MMR user 110B may be a student (member node) 1210 who has particular knowledge about the document 905, e.g., as gained during a visit to the course professor's office hours, and thus also has captured an image of the document 905 in an effort to share such information. The particular knowledge can include homework assignments, updated exercises, test questions, answers to exercises, answers to test questions or other information relevant to the document 905, the course, or to other members of the network 1200. The particular knowledge can be stored on the MMR computer 112 as a result of MMR user 110B's interaction with the document. When MMR user 110A captures the document 905 image, which already has been captured by MMR user 110B, a new link 1310 is formed between them based on the shared capture, and the existing tie 1220 between them is strengthened. Thus, MMR user 110A and 110B now share a closer tie based on more specific shared interests within the context of the course as whole, as expressed by having captured the same or similar documents 905, in this case, the same portion of the course text. The new links 1310 or strengthened ties 1220 represent the authorization for user 110A to access the particular knowledge added by user 110B. That is, a result of user 110A's interaction with document 905 can be the retrieval of the particular knowledge added by user 110B from MMR computer 112. A related process flow 1900 is shown in conjunction with FIG. 19.

These examples are provided by way of illustration, not limitation. The examples described in conjunction with FIGS. 11 and 13, as well as other examples, may form other usage scenarios for FIG. 14.

Figure 15:
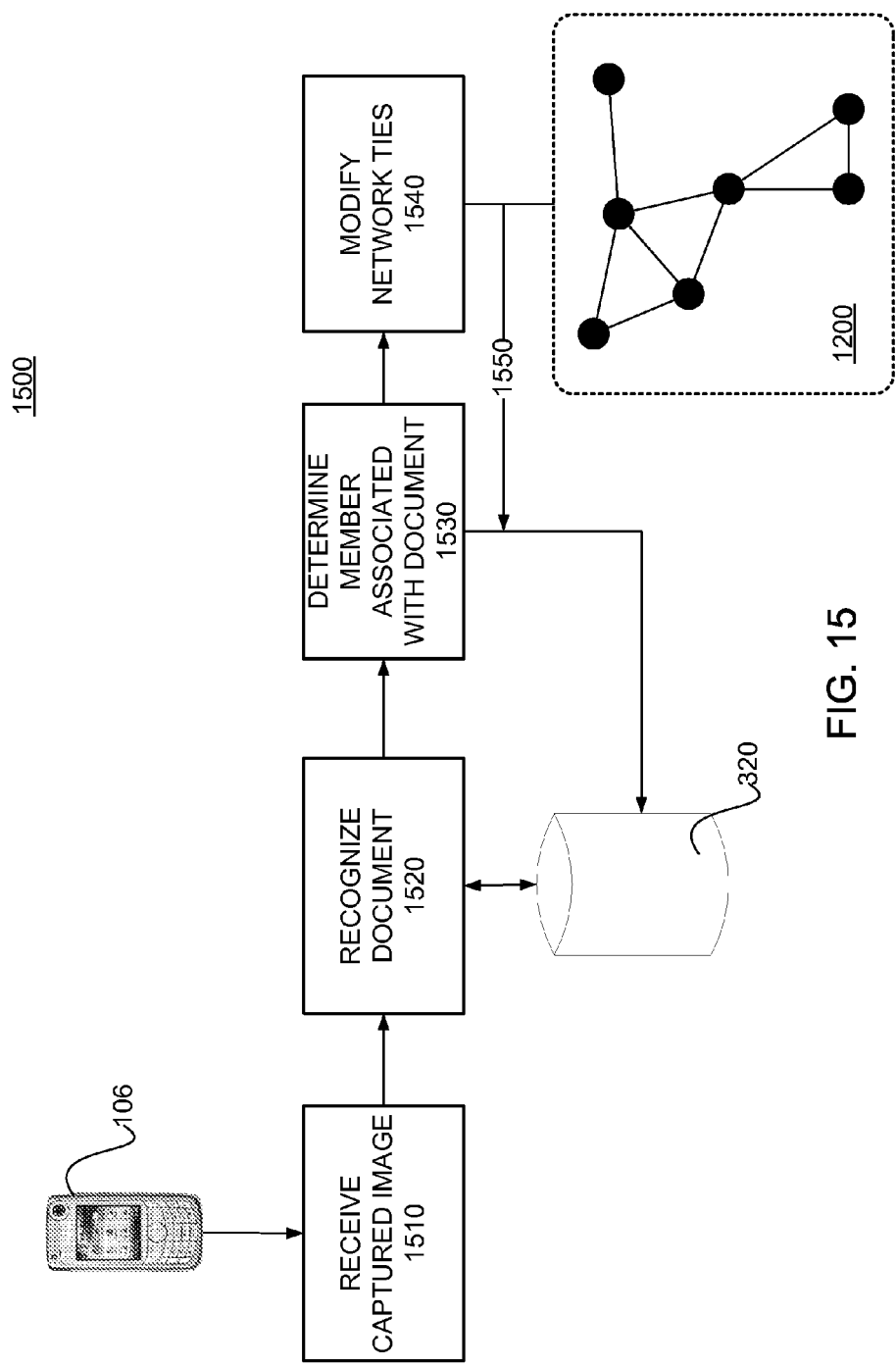
FIG. 15 shows an example of a flow process for modifying tie strength between members of an existing network using captured documents in accordance with one embodiment of the present invention.

FIG. 15 shows an example of a flow process 1500 for modifying tie strength between members of an existing network in accordance with one embodiment of the present invention. The flow process 1500 can be implemented in software, hardware (e.g., gate-level logic), firmware (e.g., a microcontroller configured with embedded routines for carrying out the method, or some combination thereof.

Initially, a captured digital image is received 1510 of at least a portion of a document 905 captured by a MMR user 110 who is a member (node) 1210 of an existing network 1200 of member nodes 1210 connected by ties 1220. As depicted in FIG. 15, a capture device 106 is used to capture the digital image of the document 905, e.g., using a still or video camera of the capture device 106. The captured digital image may be received at the capture device 106, or transmitted by the capture device 105 and received at an MMR computer 112, or received at any other device or module capable of document matching as described herein. The document 905 may be any document, such as described in conjunction with FIG. 10. The document may be a paper document, or may be an electronic document. In the electronic document example, the captured digital image may be received via a screen capture of a portion of the document 905.

Although a capture device 106 such as a camera phone is used in the description of FIG. 15, the process 1500 also can be used in conjunction with other capture methods and devices, for example, a document may be scanned by a scanner such as 127, or may be captured, e.g., by PD capture module 318 in conjunction with being printed on a printer, e.g., 116. For an electronic document, the capture may be by way of drawing a box on top of the electronic document to capture that portion.

Next, the document 905 is recognized 1520 associated with the MMR user 110 member node 1210 who captured the document. In addition, the location (e.g., text, image, or other image patch portion) of the captured digital image within the document 905 also may be recognized. The recognition step 1520 maybe accomplished using an index of stored documents, e.g., index 322 of document database 320. This step 1520 includes an indexing operation that allows identification of a corresponding electronic representation of the document 905 and associated second media types for input that matches the captured document or portions thereof, e.g., as discussed in conjunction with MMR document 500 of FIG. 5. Example indexing operations include the following: (1) the x-y locations of characters of a document are indexed; (2) the x-y locations of words of a document are indexed; (3) the x-y locations of an image or a portion of an image in a document are indexed; (4) an OCR imaging operation is performed, and the x-y locations of characters and/or words are indexed accordingly; (4) feature extraction from the image of the rendered page is performed, and the x-y locations of the features are indexed; and (5) the feature extraction on the symbolic version of a page are simulated, and the x-y locations of the features are indexed. The indexing operation may include any or all of the above of the above indexing operations depending on the application of the present invention. Thus, the index 322 of database 320 may be accessed several times as part of this step 1520.

The indexing may be performed for each feature of the document. Document recognition features, or simply "features," may include content-based features such as individual words, letters, images, and/or characters within the document 905, along with their x-y locations, and/or format-based feature vectors of the document 905 that can be ascertained from the captured digital image, such as a type font, font size, and paper reflectance associated with the document 905. The captured digital image also may be associated with the recognized document within the index as a result.

Next, another, or second, member of the network is determined 1530 to be associated with the document. The second member may be associated with the document because s/he has captured the document as well, or because s/he has captured a similar document. As part of this step 1530, the index 322 may be queried for a subset of members of the network who have captured a digital image of a document that is the same or similar to the document associated with the first member, including document or pattern matching between the document associated with the first user and the documents captured by the subset of members. In one embodiment, this is done by performing document matching, e.g., using document matching module 226, between the two documents. The matching may be made using techniques described herein, or using known comparison techniques. The matching is a pairwise comparison according to one embodiment, wherein extracted features are compared to the document features for each similar document. An example of document matching is extracting features from the captured image, composing descriptors from those features, and looking up the document and location within the document that contains a percentage of those descriptors. It should be understood that this pattern matching step may be performed a plurality of times, once for each document where the database stores numerous documents to determine if any documents in a library or database match the captured document. Alternatively, the indexing the captured document may be added to an index that represents a collection of documents and the pattern matching step is performed once. This step 1530 also may include a look up of the members of the network associated with the matching documents, e.g., using an index 322 of document database 320 that includes member information.

Next, ties between members of the existing network are modified 1540. Once a matching or similar document is found in step 1530, one or more members associated with the document(s) also are identified. Based on those identifications, existing ties between such members of the network are strengthened for members with existing ties and new ties are formed between such members without prior ties. In addition, or alternatively, ties between the first member and all other members of the group may be modified 1540 according to this step. For example, if relatively few members of the network with whom the first member is tied have not captured the same document, the ties to those members may be weakened according to one embodiment. The tie strengthening may be parameterized by distance and/or timing, as described in conjunction with FIG. 10. In addition, the modified network tie information may be stored 1550, e.g., in document database 320. Using such modified ties, the identity of the subset of members of the network who have captured a digital image of a document similar to the document associated with the first member, based on shared interests as expressed by having captured the same or similar documents. An example usage scenario for this process flow is shown in FIG. 14, described above.

Figure 16:
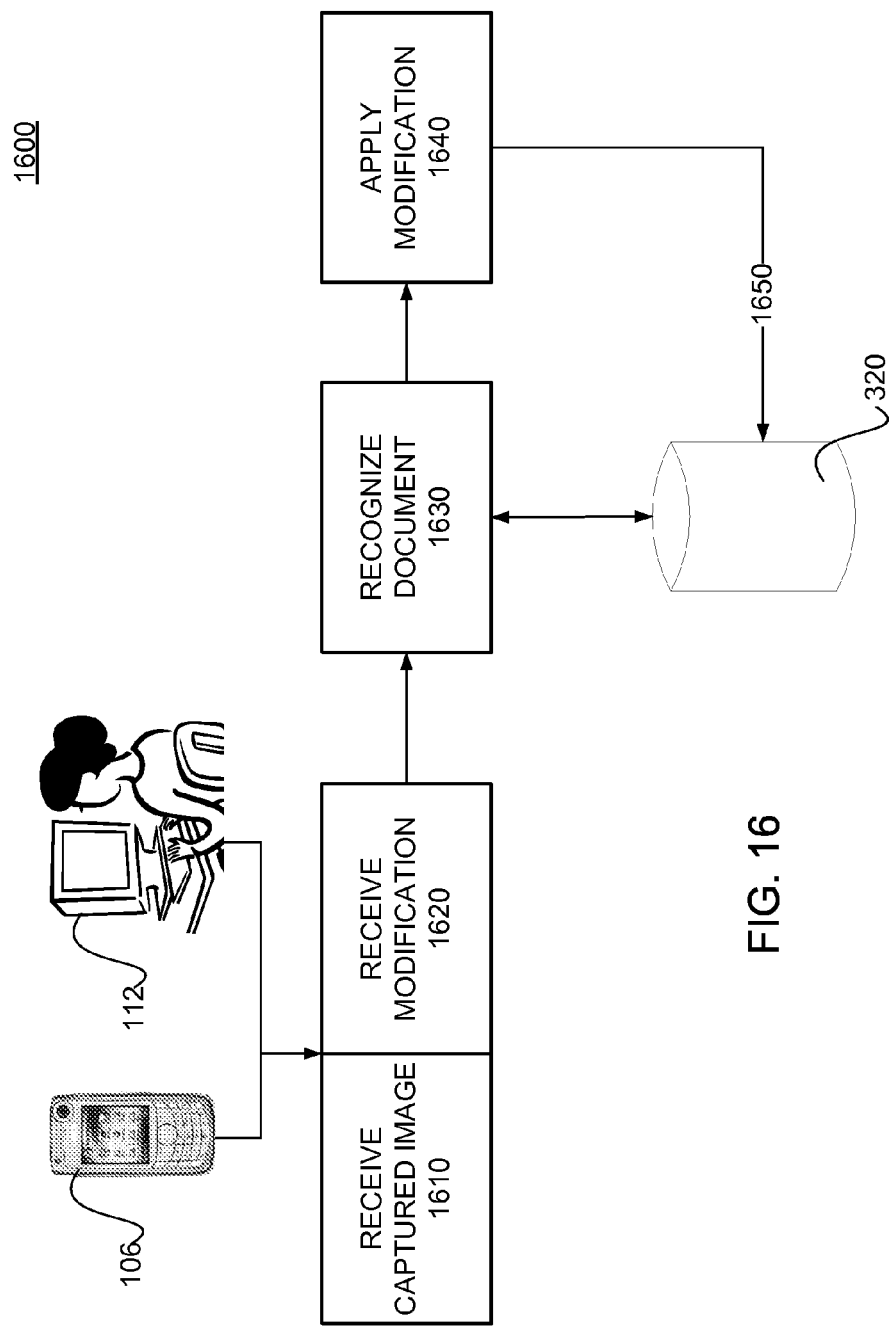
FIG. 16 shows an example of a flow process for modifying a document for shared use in accordance with one embodiment of the present invention.

FIG. 16 shows an example of a flow process 1600 for modifying a document for shared use in accordance with one embodiment of the present invention. The flow process 1600 can be implemented in software, hardware (e.g., gate-level logic), firmware (e.g., a microcontroller configured with embedded routines for carrying out the method, or some combination thereof.

Initially, a captured digital image is received 1610 of at least a portion of a document 905 captured by a MMR user 110. As depicted in FIG. 16, a capture device 106 is used to capture the digital image of the document 905, e.g., using a still or video camera of the capture device 106, according to one embodiment. The captured digital image may be received at the capture device 106, or transmitted from capture device 105 to at an MMR computer 112, or received at any other device or module capable of document matching as described herein.

The document 905 may be any document, such as described in conjunction with FIG. 10. The may be an electronic document, wherein the captured digital image may be received via a screen capture of a portion of the document 905, e.g., by drawing a box on the electronic document, such as region box 1720 on document 1710 shown in FIG. 17.

Although a capture device 106 such as a camera phone is used in the description of FIG. 16, the process 1600 also can be used in conjunction with other capture methods and devices as described herein.

After capture of the digital image of at least a portion of a document associated with a first user, a modification is received 1620 from the user, the modification associated with the at least a portion of the document. If this is the first capture of the document, the modification received may be the only thing indexed with the captured document. However, if the captured document has been captured and/or modified by others, the above capture step 1610 may be merely a means to identify the document which the user wants to modify. Likewise, a document may be captured by one means (e.g., capture device 105), and modified by another means (e.g., MMR computer 112). This step 1620 also may include identification of a location or region of the document at which to make the modification. Such identification may use technology such as document patch recognition, barcode, or RFID. The modification may take various forms according to the particular application. Exemplary, but non-limiting, modifications include editing, translation, and annotation. Annotations may include data or interactions, including text and/or various media types including video, audio, and still images, used in MMR as discussed herein and/or user-created annotations of various types. A single annotation is used in this example for clarity of description, however multiple annotations are possible. FIG. 17 shows an example of an annotation in the form of a media (audio) clip 1730 added to a document 1710 at a designated location (e.g., region box) 1720 in accordance with one embodiment of the present invention. In one embodiment, the annotation is an interestingness score for the document.

In various embodiments, the modifications received may comprise an annotation that is attached to the captured image but does not affect the underlying document, or may comprise a modification that is an edit to the underlying document itself.

In one embodiment, the document 905 is known to the document database 320. Thus, next the document 905 is recognized 1630. In some embodiments, the location of the captured digital image within the document 905 also is recognized, e.g., using the captured digital image and an index of stored documents, such as index 322 of document database 320.

Next, the received modification is applied 1640 to the document. This step 1640 includes an indexing operation that allows identification of a corresponding electronic representation of the document 905 and associated second media types for input that matches the captured document or portions thereof, as described herein. The indexing may be performed for each feature of the document. The modified document may also be made available to other users.

The modified document is stored 1650 at, and received by retrieval from, an index 322 of stored documents, e.g., within a document database 320, according to one embodiment. Making the modified document available to other users includes displaying the modification when the document is captured by another user according to one embodiment. Any document matching procedure, e.g., as described herein, may be used to locate the modified document. The document as captured by another user may be a different instance or different version of the document. Making the modified document available to other users includes posting the modified document to a web-based interface according to one embodiment. In this example, the web-based interface is configured for searching based upon the modification, and/or any other standard search capability. Examples of such uses include collaborative knowledge/content generation such as collaborative writing, editing, and translation of documents, attaching interestingness scores to documents, and collaborative annotation. In an example translation application, portions of documents in one language can be annotated with translations to another language. Further comments about those annotations can also be applied. These annotations can include multimedia data such as photos of objects mentioned in a document, audio recordings of the pronunciation of words, notes about colloquial usage or slang, etc.

The modified document also may include links to annotations in other portions of the document, and/or to additional documents annotated by the same user. For example, in the interestingness score context, links are provided to other portions of the document marked interesting by the user, and/or to additional documents that the user annotated as interesting. In one embodiment, limits may be placed by the user on who can view the modified document and/or make additional modifications. For example, a team may be collectively working on a document once modifications are made, a subset of the team may only have access ability, whereas others may have full modification ability, e.g., as determined by a document owner or system adminstrator.

FIG. 18 shows an example of a flow process 1800 for annotating an unindexed document for shared use in accordance with one embodiment of the present invention. The flow process 1800 can be implemented in software, hardware (e.g., gate-level logic), firmware (e.g., a microcontroller configured with embedded routines for carrying out the method, or some combination thereof.

Initially, a captured digital image is received 1810 of at least a portion of a document 905 captured by a MMR user 110. The process is similar to that described in conjunction with FIG. 16, except that the document 905 is unknown to the document database 320.

After receipt 1810 of the captured digital image of at least a portion of an unindexed, or "unknown" document associated with a first user (and transmission to MMR computer 112, if necessary), an annotation is received 1820 from the user, the annotation associated with the at least a portion of the unknown document. This step 1820 may include identification of a location or region of the document at which to make the modification. Annotations may include data or interactions, including text and/or various media types including video, audio, and still images, used in MMR as discussed herein and/or user-created annotations of various types, as described herein. Annotations also may include arbitrary electronic data or content. A single annotation is used in this example for clarity of description, however multiple annotations are possible. The annotation can be an interestingness score according to one embodiment.

Since the document is unknown, next features are extracted 1830 from the captured digital image. Document recognition features may include content-based features such as individual words, letters, images, and/or characters within the document 905, along with their x-y locations. Document recognition features may include format-based feature vectors of the document 905 that can be ascertained from the captured digital image, such as a type font, font size, and paper reflectance associated with the document 905.

If other data is required to determine such feature vectors, such as distance of the capture device 106 from the paper document 905, such calculations are made as well. The needs of the document recognition features extraction process can be used to adjust the capture device 106 parameters, e.g., dynamically on a frame-by-frame basis. For example, the capture device 106 might receive a request to produce the corrected images (e.g., N blurry images of a large patch followed by M images of sharply focused paper grain (high resolution)).

The captured digital image, annotations, and extracted document recognition features are associated, and then are stored 1840, e.g., in document database 320. By storing the unknown capture and extracted features, if the unknown document later is indexed, non-indexed images can be marked as matching the now-indexed document. For example, in response to the paper document being indexed, associating the annotated image with the indexed document.

The annotated captured document then can be made available to other users. The annotated document is retrieved from storage in document database 320 according to one embodiment. Making the annotated document available to other users includes displaying the modification when the document is captured by another user according to one embodiment. Any document matching procedure, e.g., as described herein, may be used to locate the annotated document.

FIG. 19 shows an example of a flow process 1900 for collaborative discussion of shared documents in accordance with one embodiment of the present invention. The flow process 1900 can be implemented in software, hardware (e.g., gate-level logic), firmware (e.g., a microcontroller configured with embedded routines for carrying out the method, or some combination thereof.

Initially, a captured digital image is received 1910 of at least a portion of a document 905 captured by a MMR user 110, as described in conjunction with process flow FIGS. 10, 15, 16, and/or 18.

Next, the document is recognized 1920 using any document matching procedure described herein. In addition to the document itself being recognized, a hot spot, e.g., corresponding to a uniform resource locator (URL) associated with the entire document or a portion of the document also is identified. For example, a process such as described in conjunction with MMR document 500 of FIG. 5 may be used.

The MMR user 110 then is authenticated 1930 to the website, e.g., by a client device or server. The authentication may be a standard sign in as known in the art, e.g., comprising a user name and password, or other method of identification. In one embodiment, when a document is captured, the authentication step 1920 is automatic. Other requests to access the website and/or collaborative multimedia repository may also be received 1950, e.g., by a user typing in a URL or otherwise accessing the website, e.g., from a favorites list or a link from another website. Such other requests would require a standard authentication, if they did not capture the document associated with the website. The authentication may have various levels for various user types, for example, some users may have view only access, others may have modification access, etc.

Once authenticated, the MMR user is provided 1940 access to the website and an associated collaborative multimedia repository. The website may include a collection of information, annotations, documents, and discussion (e.g., contributed by other users) about that particular document and/or section, including questions about a paragraph in the textbook, etc. The user can view and edit the discussions. In addition, the collaborative multimedia repository may be contained within a database, e.g., 320, and may correspond to a particular document. Alternatively, a collaborative multimedia repository may correspond to a particular version or release of a published document or text. The collaborative multimedia repository may include annotations and modifications associated with the document, as provided by various MMR users 110.

MMR users 112 can link other URLs, video and audio clips, or other annotations to specific sections of the book, and this can be shared with other users through the website. Users also can use their capture device to retrieve information that other users previously contributed.

An example usage scenario for the process of FIG. 19 includes a document 905 that is a textbook. An MMR user 112 points a capture device, e.g, 105, at the textbook. An application running on the client device or at the server receives the captured digital image images and performs document recognition. The document and/or particular section has a URL associated with it, which was defined as a hot spot. The client or server initiates opening of the website associated with the URL. The website is a collection of information and discussion about that particular textbook/section accessible by the user. The textbook "owner" (e.g., professor, publisher, etc.) can control what users can do via the website. For example, if a user does not own the textbook and got to the URL by directly typing the URL into a browser, the user could view only the discussion board. If the user owns a copy of the textbook and the URL is invoked by document recognition, however, then the user can post comments. If the user has the teacher's edition of the book, the user can post answers to the discussion board, etc.

The algorithms presented herein are not inherently related to any particular computer or other apparatus. Various general-purpose and/or special purpose systems may be programmed or otherwise configured in accordance with embodiments of the present invention. Numerous programming languages and/or structures can be used to implement a variety of such systems, as will be apparent in light of this disclosure. Moreover, embodiments of the present invention can operate on or work in conjunction with an information system or network. For example, the invention can operate on a stand alone multifunction printer or a networked printer with functionality varying depending on the configuration. The present invention is capable of operating with any information system from those with minimal functionality to those providing all the functionality disclosed herein.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

At least one aspect of one or more embodiments of the present invention provide a computer-readable storage medium (e.g., one or more compact disks, diskettes, servers, memory sticks, or hard drives, ROMs, RAMs, or any type of media suitable for storing electronic instructions) encoded with instructions, that when executed by one or more processors, cause the processor to carry out a process for accessing information in a mixed media document system. This process can be, for example, similar to or a variation of the method described here.

The invention claimed is:

1. A method executable on at least one processor for modifying tie strength between members of an existing network using a digital image of at least a portion of a document, the method comprising:
   receiving the digital image of at least a portion of the document associated with a first member in the existing network;
   recognizing the document associated with the first member based on the received digital image;
   recognizing an x-y location of the received digital image corresponding to the at least portion of the document;
   determining a second member associated with the document based at least in part on the recognized x-y location; and
   modifying with the at least one processor, at least one tie between the members of the existing network with respect to the first member and the second member, wherein modifying comprises creating a tie between the first member and the second member, wherein the first member and the second member previously were not tied within the existing network, wherein modifying parameterizes member information, and wherein the created tie is parameterized by a score based on a context of the received digital image of the at least portion of the document.

2. The method of claim 1, wherein modifying the at least one tie between the members of the existing network with respect to the first member and the second member comprises strengthening the tie between the first member and the second member.

3. The method of claim 1, further comprising providing an interestingness score for the document by the second member.

4. The method of claim 1, wherein recognizing the document further comprises an indexing operation that allows identification of a corresponding electronic representation of the document and associated second media types.

5. The method of claim 1, wherein recognizing the document is accomplished using an index of stored documents corresponding to digital images supplied by the members of the existing network.

6. The method of claim 5, wherein determining the second member associated with the document further comprises querying the index for a subset of the members of the existing network who have supplied a digital image of a document similar to the document associated with the first member.

7. The method of claim 6, wherein querying the index further comprises pattern matching and looking up member information for the subset of members.

8. The method of claim 7, wherein the pattern matching further comprises a pairwise comparison between a pair comprising the first member and at least one member of the subset, using a location of the first member and a location of the at least one member of the subset to produce a distance score for the pair, wherein the at least one tie is parameterized by the distance score for the pair.

9. The method of claim 7, wherein the pattern matching further comprises a pairwise comparison between a pair comprising the first member and at least one member of the subset, using a timestamp for the digital image for the first member and a timestamp for the at least one member of the subset to produce a timing score for the pair, wherein the at least one tie is parameterized by the timing score for the pair.

10. The method of claim 1, wherein determining the second member associated with the document comprises a determination that the second member also has supplied the document.

11. The method of claim 1, wherein determining the second member associated with the document comprises a determination that the second member has supplied a similar document.

12. The method of claim 1, wherein the existing network is a social network.

13. The method of claim 1, further comprising storing information about the members of the existing network who supply documents in an index.

14. The method of claim 1, wherein the document is a paper document.

15. The method of claim 1, further comprising storing information corresponding to the at least one tie.

16. A computer program product for modifying tie strength between members of an existing network using a digital image of at least a portion of a document, the computer program product comprising:

a computer-readable storage medium; and computer program code, coded on the medium and executed by at least one processor, for:

receiving the digital image of at least a portion of the document associated with a first member in the existing network;

recognizing the document associated with the first member based on the received digital image;

recognizing an x-y location of the received digital image corresponding to the at least portion of the document;

determining a second member associated with the document based at least in part on the recognized x-y location; and modifying at least one tie between the members of the existing network with respect to the first member and the second member, wherein modifying comprises creating a tie between the first member and the second member, wherein the first member and the second member previously were not tied within the existing network, wherein modifying parameterizes member information, and wherein the created tie is parameterized by a score based on a context of the received digital image of the at least portion of the document.

17. The computer program product of claim 16, wherein modifying the at least one tie between the members of the existing network with respect to the first member and the second member comprises strengthening the tie between the first member and the second member.

18. The computer program product of claim 16, wherein recognizing the document further comprises an indexing operation that allows identification of a corresponding electronic representation of the document and associated second media types.

19. The computer program product of claim 16, wherein determining the second member associated with the document comprises a determination that the second member also has supplied the document.

20. The computer program product of claim 16, wherein determining the second member associated with the document comprises a determination that the second member has supplied a similar document.

21. A system for modifying tie strength between members of an existing network using a digital image of at least a portion of a captured document, the system comprising:

at least one processor; and a computer-readable storage medium embedded with computer program code executed by the at least one processor, the executed computer program code comprising:

a document matching module for receiving the digital image of at least a portion of the document that is associated with a first member in the existing network, for recognizing the document associated with the first member based on the received digital image and for recognizing an x-y location of the received digital image corresponding to the at least portion of the document;

a user association module for determining a second member associated with the document based at least in part on the recognized x-y location; and a networking module for modifying at least one tie between the members of the existing network with respect to the first member and the second member, wherein modifying comprises creating a tie between the first member and the second member, wherein the first member and the second member previously were not tied within the existing network, wherein modifying parameterizes member information, and wherein the created tie is parameterized by a score based on a context of the at least portion of the document.

22. The system of claim 21, wherein modifying the at least one tie between the members of the existing network with respect to the first member and the second member comprises strengthening the tie between the first member and the second member.

23. The system of claim 21, wherein recognizing the document further comprises an indexing operation that allows identification of a corresponding electronic representation of the document and associated second media types.

24. The system of claim 21, wherein the document is a paper document.

* * * * *